(12) United States Patent
Nagatani et al.

(10) Patent No.: US 8,294,926 B2
(45) Date of Patent: Oct. 23, 2012

(54) IMAGE FORMING APPARATUS, METHOD, AND PROGRAM PRODUCT FOR CONTROLLING OPERATIONS OF IMAGE FORMING APPARATUS THROUGH VARIOUS TYPES OF OPERATION PANELS

(75) Inventors: Kentaro Nagatani, Toyokawa (JP); Tomoyuki Atsumi, Toyohashi (JP); Hiroaki Sugimoto, Toyoake (JP); Hiroyasu Ito, Okazaki (JP); Tatsuro Asano, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 958 days.

(21) Appl. No.: 11/354,196

(22) Filed: Feb. 15, 2006

(65) Prior Publication Data
US 2007/0081185 A1   Apr. 12, 2007

(30) Foreign Application Priority Data

Oct. 11, 2005   (JP) .................... 2005-296078

(51) Int. Cl.
*G06F 3/12* (2006.01)
*G06K 15/00* (2006.01)

(52) U.S. Cl. ............... 358/1.15; 358/1.13; 358/1.16

(58) Field of Classification Search ............... None
See application file for complete search history.

(56) References Cited

U.S. PATENT DOCUMENTS

| | | | | |
|---|---|---|---|---|
| 2002/0041386 A1* | 4/2002 | Suzuki et al. | ........... | 358/1.13 |
| 2003/0011633 A1* | 1/2003 | Conley et al. | ........... | 345/762 |
| 2004/0021909 A1* | 2/2004 | Kikuoka | ........... | 358/402 |
| 2004/0111670 A1* | 6/2004 | Sasakuma et al. | ........... | 715/513 |
| 2004/0161257 A1* | 8/2004 | Ishihara | ........... | 399/81 |
| 2005/0185215 A1* | 8/2005 | Nishizawa et al. | ........... | 358/1.15 |
| 2005/0195436 A1* | 9/2005 | Tanaka et al. | ........... | 358/1.18 |
| 2005/0223323 A1* | 10/2005 | Tanaka et al. | ........... | 715/526 |

FOREIGN PATENT DOCUMENTS

| | | |
|---|---|---|
| JP | 7-131575 | 5/1995 |
| JP | 8-18813 | 1/1996 |
| JP | 2002-202692 | 7/2002 |
| JP | 2003-150971 | 5/2003 |
| JP | 2003-348272 | 12/2003 |

OTHER PUBLICATIONS

Japanese Office Action mailed on May 12, 2009 directed at counterpart application No. 2005-296078; 7 pages.

* cited by examiner

*Primary Examiner* — Fan Zhang
(74) *Attorney, Agent, or Firm* — Morrison & Foerster LLP

(57) ABSTRACT

An image forming apparatus with increased convenience of setting an operation panel includes a touch panel LCD, an LCD controller, a video RAM, a control RAM, a panel CPU performing an operation for realizing the image forming apparatus based on data input from outside, a nonvolatile RAM a backup power supply, a flash ROM, a communication unit, a printer CPU performing communications for realizing image formation processing with the panel CPU through the communication unit, an input/output unit, a control RAM, an image RAM, a flash ROM, and an external I/F controller.

20 Claims, 66 Drawing Sheets

FIG.39

| WINDOW ID IN PANEL OF TYPE A | DATA SPECIFYING KEY INCLUDED IN WINDOW | FUNCTIONS OF IMAGE FORMING APPARATUS |
|---|---|---|
| FIRST WINDOW | KEY NUMBER 101 (CIRCLE-SHAPED KEY) | ENTER |
| FIRST WINDOW | KEY NUMBER 102 (CIRCLE-SHAPED KEY) | CANCEL |
| FIRST WINDOW | KEY NUMBER 103 (CIRCLE-SHAPED KEY) | PAPER SIZE SELECTION |
| FIRST WINDOW | KEY NUMBER 104 (BOX-SHAPED KEY) | MAGNIFICATION SETTING |
| FIRST WINDOW | KEY NUMBER 105 (TRIANGLE-SHAPED KEY) | (DENSITY) HIGHER |
| FIRST WINDOW | KEY NUMBER 106 (TRIANGLE-SHAPED KEY) | (DENSITY) LOWER |
| ... | ... | ... |
| SECOND WINDOW | KEY NUMBER 201 (CIRCLE-SHAPED KEY) | ENTER |
| SECOND WINDOW | KEY NUMBER 202 (CIRCLE-SHAPED KEY) | CANCEL |
| SECOND WINDOW | KEY NUMBER 203 (BOX-SHAPED KEY) | SINGLE-SIDED COPY |
| SECOND WINDOW | KEY NUMBER 204 (BOX-SHAPED KEY) | DOUBLE-SIDED COPY |
| SECOND WINDOW | KEY NUMBER 205 (BOX-SHAPED KEY) | Nin1 MODE |
| ... | ... | ... |
| THIRD WINDOW | KEY NUMBER 301 | ... |

FIG.47

| TYPE | MODEL NAME |
|---|---|
| TYPE 1 | MFP001 |
| TYPE 2 | MFP002 |
| ... | ... |

FIG.59

| ADDITIONAL FUNCTION | SET VALUE | DISPLAY WINDOW DATA |
|---|---|---|
| Nin1 MODE MAXIMUM VALUE | Max=16 | Max16.data |
| FINISH MODE | SORT (ON) / GROUP (OFF) | sort_group.data |
| STAPLE MODE | BACK STAPLE (ON) | staple.data |
| COPY MODE | DOUBLE-SIDED PRINT (ON) | copy.data |
| ... | ... | ... |

| | | | | | | |
|---|---|---|---|---|---|---|
| 5901 | N in 1 MODE | Max:(16) | | | | |
| 5902 | FINISH MODE | SORT: (ON) | GROUP: (OFF) | | | |
| 5903 | STAPLE MODE | BACK STAPLE: (ON) | FRONT STAPLE: (ON) | | | |
| 5904 | ERASE MODE | Max ERASE AMOUNT: (0) | ERASE POSITION, RIGHT: (OFF) | ERASE POSITION, LEFT: (ON) | ERASE POSITION, MIDDLE: (OFF) | ERASE POSITION, FRAME: (OFF) |
| 5905 | EXPOSURE MODE | CHARACTER MODE: (ON) | PHOTOGRAPH MODE: (ON) | CHARACTER/PHOTOGRAPH MODE: (ON) | AUTO MODE: (ON) | |
| 5906 | ZOOM MAGNIFICATION FUNCTION | Max:(x0.5) | Min:(x2.0) | | | |
| 5907 | AUTO-SELECT | PAPER SELECTION: (ON) | MAGNIFICATION SELECTION: (ON) | | | |
| 5908 | COPY MODE | DOUBLE-SIDED PRINT: (ON) | | | | |

| ID | Mode | Setting 1 | Setting 2 | Setting 3 | Setting 4 | Setting 5 |
|---|---|---|---|---|---|---|
| 6001 | Nin1 MODE | Max:(4) | | | | |
| 6002 | FINISH MODE | SORT: (ON) | GROUP: (ON) | | | |
| 6003 | STAPLE MODE | BACK STAPLE: (OFF) | FRONT STAPLE: (OFF) | | | |
| 6004 | ERASE MODE | Max ERASE AMOUNT:(0) | ERASE POSITION, RIGHT: (OFF) | ERASE POSITION, LEFT: (ON) | ERASE POSITION, MIDDLE: (OFF) | ERASE POSITION, FRAME: (OFF) |
| 6005 | EXPOSURE MODE | CHARACTER MODE: (ON) | PHOTOGRAPH MODE: (ON) | CHARACTER/PHOTOGRAPH MODE: (ON) | AUTO MODE: (ON) | |
| 6006 | ZOOM MAGNIFICATION FUNCTION | Max:(x0.5) | Min:(x2.0) | | | |
| 6007 | AUTO-SELECT | PAPER SELECTION: (ON) | MAGNIFICATION SELECTION: (ON) | | | |
| 6008 | COPY MODE | DOUBLE-SIDED PRINT: (OFF) | | | | |

6000 / 208

IMAGE FORMING APPARATUS, METHOD, AND PROGRAM PRODUCT FOR CONTROLLING OPERATIONS OF IMAGE FORMING APPARATUS THROUGH VARIOUS TYPES OF OPERATION PANELS

This application is based on Japanese Patent Application No. 2005-296078 filed with the Japan Patent Office on Oct. 11, 2005, the entire content of which is hereby incorporated by reference.

BACKGROUND OF THE INVENTION

1. Field of the Invention

The present invention relates an image forming apparatus, and more particularly to an image forming apparatus with a selectable operation unit, a method of controlling an image forming apparatus, and a program product for controlling an image forming apparatus.

2. Description of the Related Art

Image forming apparatuses such as copiers, MFP Multi-Function Peripheral), and the like are updated due to model-changes, addition of functions, and the like. In this case, the operation unit of the updated apparatus often differs from that of the original apparatus. The difference between those apparatuses is not limited to the one in operation unit and includes a difference resulting from presence or absence of additional functions. Therefore, it is likely that some users take much time to get accustomed to a new image forming apparatus or make an operating error.

A technique for realizing functions realized by a plurality of apparatuses with one apparatus is disclosed, for example, in Japanese Laid-Open Patent Publication No. 08-018813. Furthermore, a technique for editing the layout of an operation panel to eliminate any inconvenience caused by any change in an operation window is disclosed, for example, in Japanese Laid-Open Patent Publication No. 2003-150971.

According to the technique disclosed in Japanese Laid-Open Patent Publication No. 2003-150971, the layout of an operation panel of an image forming apparatus is editable, so that the user can make the operation panel usable.

However, according to the technique disclosed in Japanese Laid-Open Patent Publication No. 2003-150971, although it is possible to construct a panel for a print function initially included in the image forming apparatus, it is impossible to construct a panel for a print function included in other apparatuses. Therefore, the improvement in convenience for an operation panel is limited.

Moreover, an operation panel of an image forming apparatus is often changed according to addition of functions, so that it is likely that some users take much time to become familiar with a panel of an updated apparatus and make operating errors.

In addition, when an operation panel is constructed for each of different models of image forming apparatuses, the number of design processes and the number of components are increased accordingly, which may increase the production costs of image forming apparatuses.

The present invention is made to solve the aforementioned problems. A first object of the present invention is to provide an image forming apparatus in which the convenience of setting an operation panel can be improved.

A second object of the present invention is to provide an image forming apparatus in which an operating error can be prevented even when a model of an image forming apparatus is changed.

A third object of the present invention is to provide an image forming apparatus in which an increase in production costs is prevented.

A fourth object of the present invention is to provide a method of controlling an image forming apparatus for improving the convenience of setting an operation panel.

A fifth object of the present invention is to provide a program product for controlling an image forming apparatus for improving the convenience of setting an operation panel.

SUMMARY OF THE INVENTION

In summary, an image forming apparatus in accordance with an aspect of the present invention includes: a data processing unit processing input image data; a display unit-displaying a display image in a display area based on an input signal and detecting an operation on the display area; a first storage unit storing data for displaying each of display images of a plurality of operation units; and a control unit controlling an operation of the image forming apparatus based on an input instruction. The control unit includes a selection window display unit causing the display area to display a selection window for selection of a display image of each operation unit based on data stored in the first storage unit, a selection unit receiving any selection of each operation unit based on an instruction from a user, an operation window display unit causing the display area to display a display image of an operation unit selected by the selection unit, a detection unit detecting an operation performed on the display area to a range corresponding to the display image of the operation unit, and an instruction unit causing the data processing unit to execute processing corresponding to the operation to the range detected by the detection unit.

Preferably, the data processing unit includes an image forming unit executing a plurality of processing for forming an image in a medium.

Preferably, a display image of each operation unit is associated with data for specifying a position of the display image in the display area and with the processing. The detection unit detects a range specified by the user in the display area. The instruction unit causes the data processing unit to execute processing associated with the data for specifying a range detected by the detection unit.

Preferably, the image forming apparatus further includes: an input unit receiving an input of data; and an obtaining unit obtaining data displaying a display image of an operation unit from data received by the input unit.

Preferably, the image forming apparatus further includes a second storage unit storing data for displaying a display image of an operation unit selected through the selection unit. The operation window display unit causes the display area to display the display image of the operation unit based on data stored in the second storage unit.

Preferably, the image forming apparatus further includes a display detection unit detecting that display of the selection window is performed. The operation window display unit causes the display area to display a display image of an operation unit selected through the selection unit upon detection of display of the selection window.

Preferably, the image forming apparatus further includes a third storage unit storing a plurality of communication control data for defining a plurality of communication protocols between the control unit and the data processing unit. The control unit further includes a specifying unit specifying the data processing unit connected to the control unit. The image forming apparatus further includes a communication control unit performing communications between the instruction unit and the data processing unit in accordance with the communication control data corresponding to a data processing unit specified by the specifying unit.

Preferably, the communication control unit includes a first conversion unit converting a format of data transmitted from the control unit to the data processing unit into a format corresponding to the data processing unit based on the communication control data, and a second conversion unit converting a format of data transmitted from the data processing unit to the control unit into a format corresponding to the control unit based on the communication control data.

Preferably, the communication control unit communicates control data for controlling processing executed by the data processing unit.

Preferably, the image forming apparatus further includes a fourth storage unit storing functional information representing a first function related to the operation unit selected through the selection unit. The control unit further includes a specifying unit specifying a data processing unit connected to the control unit, and a difference detection unit detecting a difference between the first function and the second function based on the functional information and information representing a second function realized by the data processing unit specified by the specifying unit.

Preferably, the difference detection unit detects a function not included in the first function from the second function. The control unit further includes a display control unit causing the display area to display a window for receiving an input of an operation corresponding to the function not included in the first function based on data stored in the first storage unit.

Preferably, the difference detection unit detects a function not included in the second function from the first function. The control unit further includes a display control unit causing the display area to display a display image of an operation unit from which an image receiving an input of an instruction corresponding to the function not included in the second function is removed based on data stored in said first storage unit.

Preferably, the first storage unit stores first identification data for first display for identifying each operation unit and second identification data for second display for identifying the data processing unit corresponding to each operation unit. The selection window display unit causes the display area to display the first display and the second display based on the first identification data and the second identification data.

Preferably, the selection window display unit causes the display area to display the first display and the second display for an image forming apparatus different from the image forming apparatus.

Preferably, the display unit is a touch-panel type display. The first storage unit stores different types of the display and data for displaying a window corresponding to each type.

Preferably, the first storage unit stores image data for displaying a thumbnail image of a display image displayed on the display area. The selection window display unit displays the thumbnail image based on the image data.

Preferably, the first storage unit stores functional data for displaying description of a function realized by the operation unit represented by the display image. The selection window display unit displays the description of a function based on the functional data.

Preferably, a display image of each of the plurality of operation units includes a plurality of sub-images for receiving inputs of a plurality of operations. The first storage unit stores each first identification data for specifying each of the plurality of operation units, each second identification data for specifying each of the plurality of sub-images included in the operation unit, and each third identification data for specifying a function realized by an operation on each sub-image. Each first identification data, each second identification data, and each third identification data are associated with each other.

In accordance with another aspect of the present invention, a method of controlling an image forming apparatus is provided. The image forming apparatus includes a data processing unit and a display unit. The data processing unit processes input image data. The display unit displays a display image in a display area based on an input signal and detects an operation on the display area. The method includes the steps of: preparing data for displaying each of display images of a plurality of operation units; causing the display area to display a selection window for selection of a display image of each operation unit based on the prepared data; receiving any selection of each operation unit based on an instruction from a user; causing the display area to display a display image of a selected operation unit; detecting an operation performed on the display area to a range corresponding to the display image of the operation unit; and causing the data processing unit to execute processing corresponding to operation to the range as detected.

In accordance with a further aspect of the present invention, a program product for controlling an image forming apparatus is provided. The image forming apparatus includes a data processing unit and a display unit. The data processing unit processes input image data. The display unit displays a display image in a display area based on an input signal and detects an operation on the display area. The program product causes the image forming apparatus to execute the steps of: preparing data for displaying each of display images of a plurality of operation units; causing the display area to display a selection window for selection of a display image of each operation unit based on the prepared data; receiving any selection of each operation unit based on an instruction from a user; causing the display area to display a display image of a selected operation unit; detecting an operation performed on the display area to a range corresponding to the display image of the operation unit; and causing the data processing unit to execute processing corresponding to the operation to the range as detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 38 and 39 are diagrams illustrating exemplary data storage in control RAM 208.

FIG. 47 is a diagram illustrating exemplary data storage in flash ROM 216.

FIG. 59 is a diagram illustrating exemplary storage of data for realizing an additional function in flash ROM 216.

FIG. 61 is a diagram illustrating exemplary storage of functional information of a printer in control RAM 208.

FIG. 62 is a diagram illustrating an exemplary table 6000 storing functional information for a set panel in control RAM 208.

DESCRIPTION OF THE PREFERRED EMBODIMENT

Figure 1:
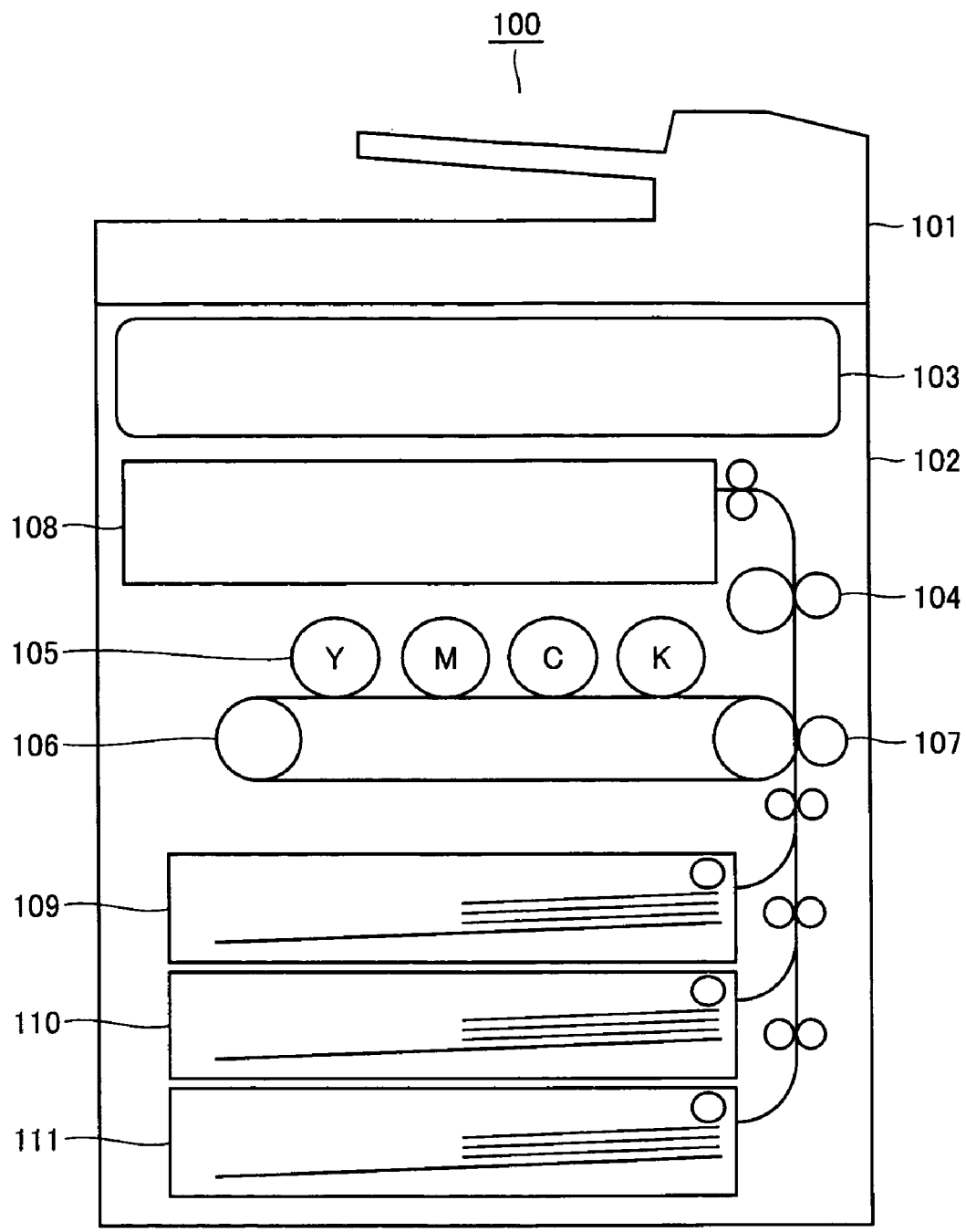
FIGS. 1 and 2 are block diagrams illustrating a hardware configuration of an image forming apparatus 100.

In the following, an embodiment of the present invention will be described with reference to the figures. In the following description, the same components will be denoted with the same reference characters. The designations and functions are also the same. Therefore, the detailed description thereof will not be repeated.

Figure 2:
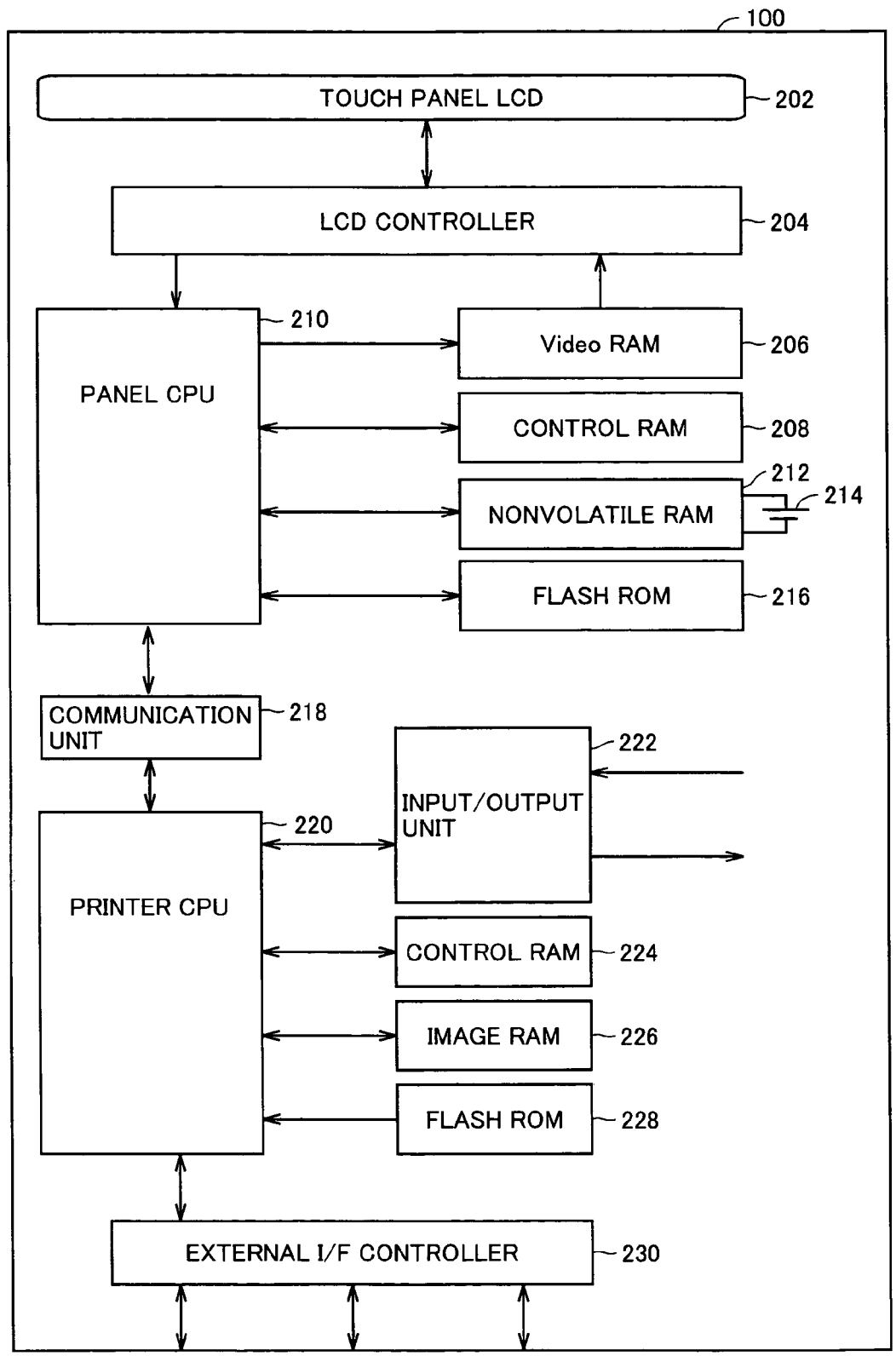

Referring to FIGS. 1 and 2, a general configuration of an image forming apparatus 100 in accordance with an embodiment of the present invention will be described. FIGS. 1 and 2 are block diagrams each illustrating the hardware configuration of image forming apparatus 100. Image forming apparatus 100 is realized, for example, as a copier, a printer, a facsimile transmission/reception machine, MFP, or the like. In the following, image forming apparatus 100 is realized as a copier by way of illustration.

Referring to FIG. 1, image forming apparatus 100 includes an automatic document feeding unit 101 and a print unit 102. Print unit 102 includes a large display unit 103, a fixing unit 104, photoconductor 105 for each color Y/M/C/K, an intermediate transfer unit 106, a secondary transfer roller 107, a paper-ejection tray 108, a first paper cassette 109, a second paper cassette 110, and a third paper cassette 111.

Automatic paper-feeding unit 101 carries a document on the tray having the document placed thereon automatically to an image reading unit in response to a copy instruction. Large display unit 103 displays a panel window based on image data prepared beforehand. Large display unit 103 is realized, for example, by a touch panel LCD (Liquid Crystal Display). The touch-panel detects a position entered by a key on the panel window and outputs a control signal corresponding to the position. Image forming apparatus 100 executes an operation unique to the control signal.

The touch panel LCD includes those arranged under the display unit such as a CRT (Cathode Ray Tube) display to detect a change in pressure and those covering the display with a dedicated transparent screen. The manner of detecting a touch on the display includes a pressure-sensitive type and an electrostatic type. The former allows detection of a change in pressure and the latter allows detection of an electrical signal by static electricity. It is noted that the detailed configuration of the hardware of touch-panel LCD is known, and those skilled in the art readily understand its operation. Therefore, the detailed description of the operation will not be repeated herein.

Fixing unit 104 fixes a toner image transferred onto paper. Photoconductors 105 for Y/M/C/K form Y image, M image, C image, and K image, respectively, necessary for formation of a color image. Each of the photoconductors is configured to reproduce an image of one color.

Four images (Y image/M image/C image/K image) formed on the respective photoconductors are primarily transferred in synchronization with each other on intermediate transfer unit 106 to from one image. The image formed by intermediate transfer unit 106 is secondarily transferred to paper carried by secondary transfer roller 107. The color image transferred on the paper is fixed on the paper while passing through fixing unit 104. The paper is thereafter ejected to paper-ejection tray 108. Paper cassettes 109, 110, 111 each store sheets of paper for image formation. Each cassette stores sheets of paper of a desired size in a predetermined range.

Referring to FIG. 2, image forming apparatus 100 includes a touch panel LCD 202, an LCD controller 204, a video RAM (Random Access Memory) 206, a control RAM 208, a panel CPU (Central Processing Unit) 210, a nonvolatile RAM 212, a back-up power supply 214, a flash ROM (Read Only Memory) 216, and a communication unit 218. These components are connected to each other through data buses.

Panel CPU 210 performs an operation for realizing image forming apparatus 100 based on externally-input data and data stored in control RAM 208 or other memory. The detail of this operation will be described later.

Touch panel LCD 202 detects a key press by the user of image forming apparatus 100, generates a signal representing the detection of the press, and sends the signal to LCD controller 204. LCD controller 204 allows touch panel LCD 202 to display image data written in video RAM 206. On the other hand, LCD controller 204 sends an input signal from touch panel LCD 202 to panel CPU 210.

Video RAM 206 is used when an image is displayed on touch-panel LCD 202. The data for displaying an image is written by panel CPU 210 and read by LCD controller 204. Control RAM 208 temporarily stores data used for computation by panel CPU 210. Control RAM 208 temporarily stores data generated by panel CPU 210. Nonvolatile RAM 212 receives power supply from back-up power supply 214 to hold data that is stored after power-off. Flash ROM 216 stores data prepared beforehand for realizing image forming apparatus 100. This data includes data of an image displayed on touch-panel LCD 202, data for defining an operation in image forming apparatus 100, and the like.

Communication unit 218 communicates with printer CPU 220 described later in accordance with a predetermined communication protocol:

Returning to FIG. 2, image forming apparatus 100 includes a printer CPU 220, an input/output unit 222, a control RAM 224, an image RAM 226, a flash ROM 228, and an external I/F (Interface) controller 230. These components are connected to each other through data buses.

Printer CPU 220 communicates with panel CPU 210 through communication unit 218 for realizing the image forming processing in image forming apparatus 100. Printer CPU 220 executes an operation of image forming apparatus 100 in an operation mode input by touch-panel LCD 202. Printer CPU 220, for example, sends an instruction to read an image from a document to automatic document-feeding unit 101. Printer CPU 220 instructs any one of paper cassettes 109 to 111 to supply a sheets of paper. Printer CPU 220 sends an instruction to form an image to photoconductors 105 for colors Y/M/C/K. Printer CPU 220 instructs intermediate transfer unit 106 and secondary transfer roller 107 to transfer an image on the paper. Printer CPU 220 instructs fixing unit 104 to fix an image transferred on the paper.

Input/output unit 222 inputs/outputs data to/from printer CPU 220 for allowing execution of a specific operation of image forming apparatus 100. Input/output unit 222 outputs an on/off signal to a variety of motors (not shown). Input/output unit 222 outputs an on/off signal to a fixing heater (not shown). Input/output unit 222 outputs an instruction to switch on and off a signal for charging the photoconductor. Input/output unit 222 outputs a signal for switching transfer/not-transfer of an image.

Input/output unit 222 receives an input of a signal representing a state of the paper within image forming apparatus 100 to detect the state of the paper. Input/output unit 222 receives an input of a signal representing a temperature of a fixing heater. Input/output unit 222 detects opening and closing of the door provided for image forming apparatus 100. Input/output unit 222 receives an input of a signal representing a concentration of toner for forming an image on paper. Input/output unit 222 includes an area for temporarily storing data to store each of input signals in a predetermined area.

Printer CPU 220 switches on/off of an output by writing data at an address of input/output unit 222. Printer CPU 220 also reads data from a predetermined address in input/output unit 222 to obtain a value of each sensor of image forming apparatus 100. The state of image forming apparatus 100 is thus detected.

Control RAM 224 temporarily holds data generated by printer CPU 220. Image RAM 226 stores an image of a document read based on a copy instruction. Image RAM 226 accumulates print images input through external I/F controller 230. Printer CPU 220 sends an instruction to form an image to paper based on data stored in image RAM 226.

Flash ROM 228 stores beforehand a program (for example, firmware) executed by printer CPU 220. It is noted that the program stored in flash ROM 228 may be updated to another program, for example, input through external I/F controller 230. Thus, a function of image forming apparatus 100 can be added by updating the program.

External I/F controller 230 performs communications between image forming apparatus 100 and external equipment (for example, a network or an information processor connected to the network). For example, external I/F controller 230 performs printing based on a print instruction or downloading of the above-noted firmware from a PC (Personal Computer) connected to the network. External I/F controller 230 supports, for example, serial communications, parallel communications, and communications in conformity with Ethernet® standards.

Figure 3:
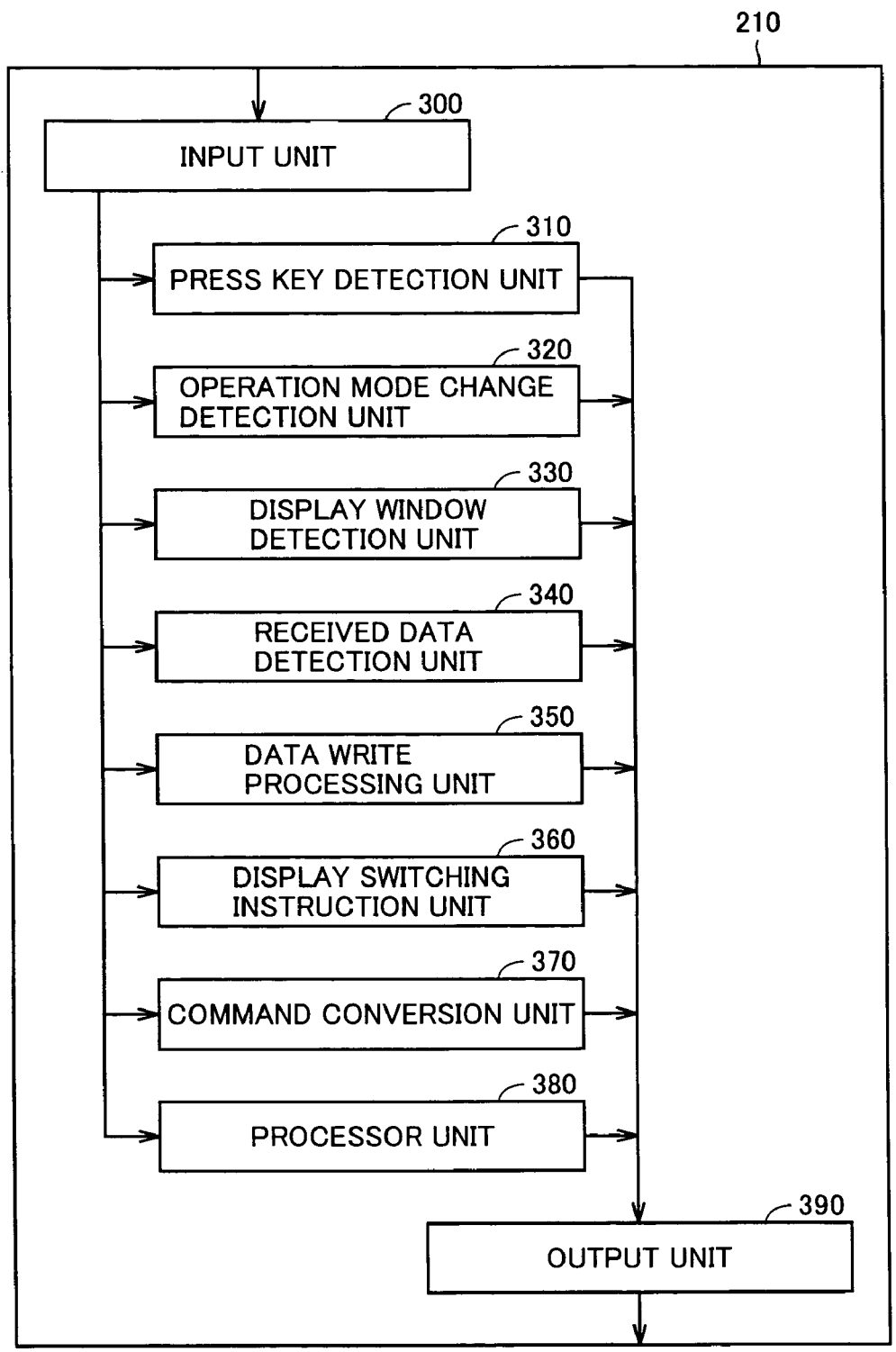
FIG. 3 is a block diagram illustrating a configuration of a function realized by a panel CPU 210.

Referring to FIG. 3, panel CPU 210 realizing image forming apparatus 100 will be described. FIG. 3 is a block diagram illustrating a configuration of a function realized by panel CPU 210.

Panel CPU 210 includes an input unit 300, a press key detection unit 310, an operation mode change detection unit 320, a display window detection unit 330, a received data detection unit 340, a data write processing unit 350, a display switching instruction unit 360, a command conversion unit 370, a processor unit 380, and an output unit 390 outputting data.

Input unit 300 receives an input of a signal. Press key detection unit 310 detects a press on a key in touch-panel LCD 202 based on a signal input through input unit 300. The operation mode change detection unit detects a change of an operation mode of image forming apparatus 100 based on a signal input through input unit 300. Display window detection unit 330 detects a window displayed on touch-panel LCD 202 based on a signal input through input unit 300. When a window has already been selected, display window detection unit 330 also outputs an instruction to display the selected window in response to detection of a window selection instruction.

Received data detection unit 340 detects data items to be used for processing from a signal received through external I/F controller 230. Data write processing unit 350 gives an instruction to write a signal input through input unit 300 or internally-generated data.

Display switching instruction unit 360 outputs an instruction to switch window display in touch-panel LCD 202. Command conversion unit 370 converts a command communicated with printer CPU 220. Processor unit 380 executes a predetermined program for displaying a window in touch-panel LCD 202. Output unit 390 outputs data to printer CPU 220, video RAM 206, and any other memory connected through a data bus.

Figure 4:
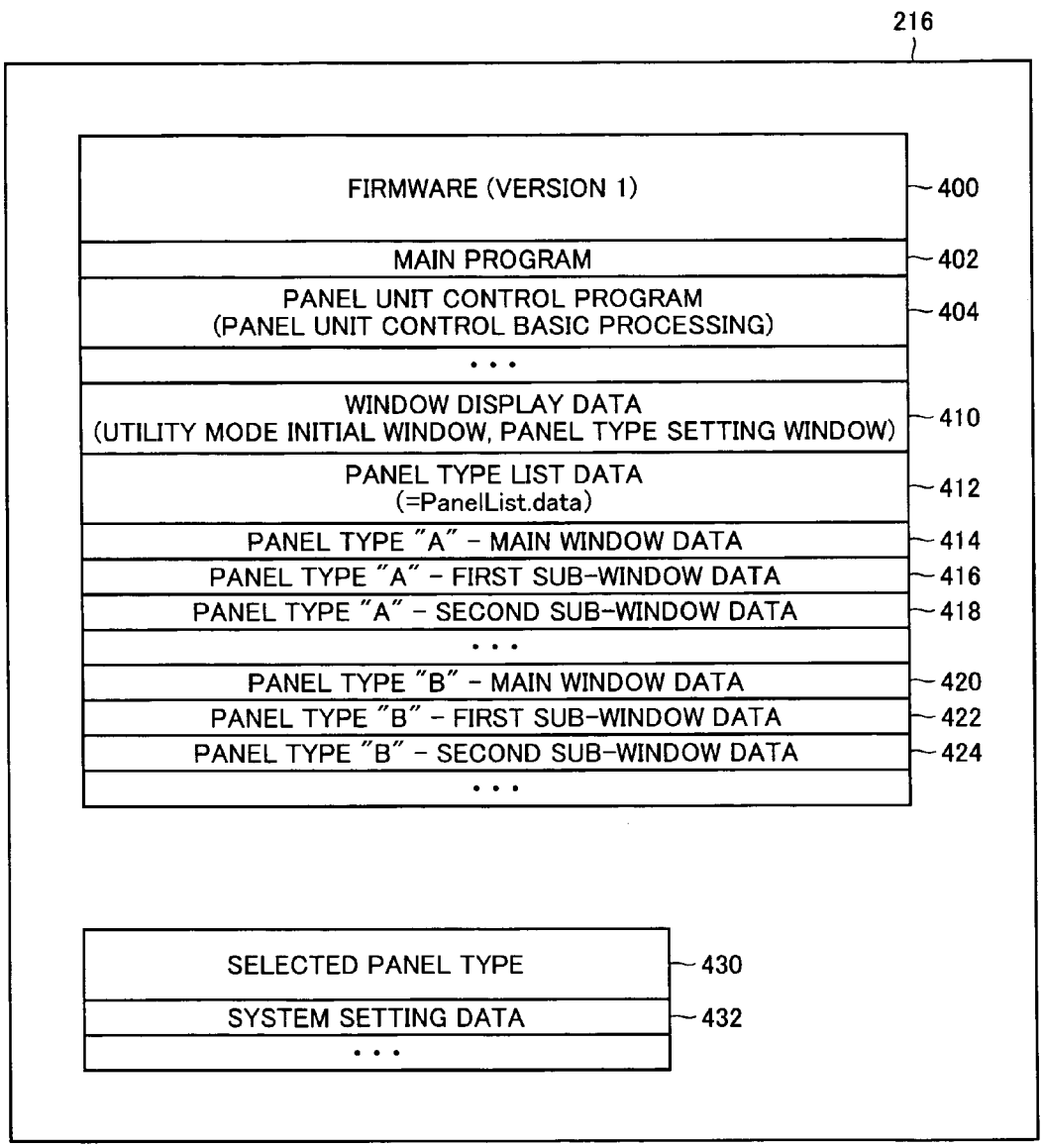
FIG. 4 is a diagram illustrating exemplary data storage in a flash ROM 216.

Referring to FIG. 4, the data structure of image forming apparatus 100 will be described. FIG. 4 is a diagram illustrating exemplary data storage in flash ROM 216. Flash ROM 216 includes areas 400-432 for storing data.

A program (for example, firmware) prepared beforehand for controlling display of the panel in touch-panel LCD 202 is stored in area 400. A main program executed by panel CPU 210 is stored in area 402. A panel unit control program for controlling display of the panel unit as described later is stored in area 404.

It is noted that the manner of configuration or storage of the program is not limited to that shown in FIG. 4. For example, the firmware and the main program may be configured as one program.

Data created beforehand to realize the display of the panel is stored in each of areas 410-424. The data for displaying a window is stored for each panel type. As described later, when each data is referred to, touch-panel LCD 202 displays a window corresponding to that data. The image included in each window, for example, LED display, a circle-shaped key and the like, is displayed using data based on a template prepared beforehand. Data configured in such a format as to allow windows to be displayed using the templates is stored in areas 410-424.

Here, the displayed window is not limited to the window corresponding to each function realized by one image forming apparatus. More specifically, a window for realizing another separate image forming apparatus may be displayed. Therefore, display of multiple windows is realized by one touch-panel LCD 202.

A type selected to display a panel in image forming apparatus 100 is stored in area 430. This type corresponds to any of the panel types stored in the above-noted areas 414-424. Panel CPU 210 refers to data stored in this area and executes display of a window on the panel in touch-panel LCD 202 based on the data. The system setting data preset to define the operation of image forming apparatus 100 is stored in area 432. It is noted that areas 430 and 432 may be communicated.

Figure 5:
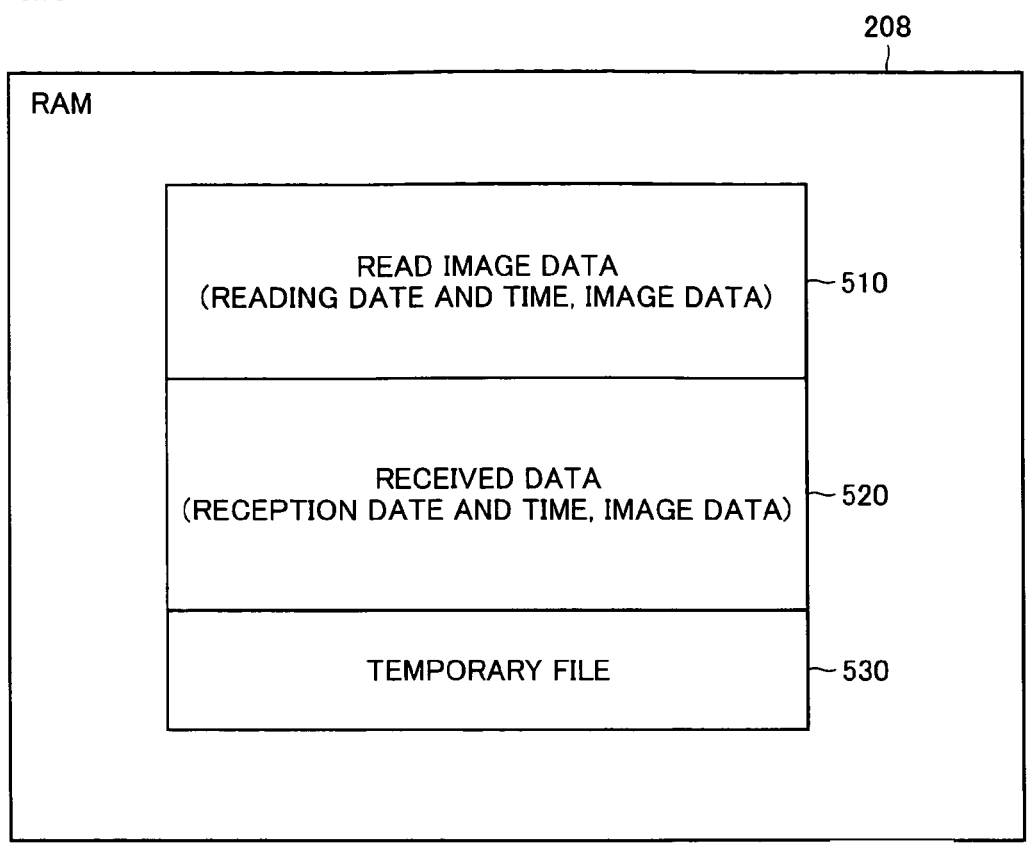
FIG. 5 is a diagram illustrating exemplary data storage in a control RAM 208.

Referring to FIG. 5, the data structure of image forming apparatus 100 will be further described. FIG. 5 is a diagram illustrating exemplary data storage in control RAM 208. Control RAM 208 includes areas 510-530 for storing data.

Control RAM 208 temporarily allocates an area necessary for storing data according to the processing by panel CPU 210. Data used during the operation of image forming apparatus 100 is stored in each area.

For example, image data generated by reading a document is stored in area 510 together with a reading date and time. In another aspect, data received through external I/F controller 230 is stored in area 520 together with a reception date and time. Furthermore, data temporarily generated by operational processing by panel CPU 210 is stored in area 530 as a temporary file.

Figure 6:
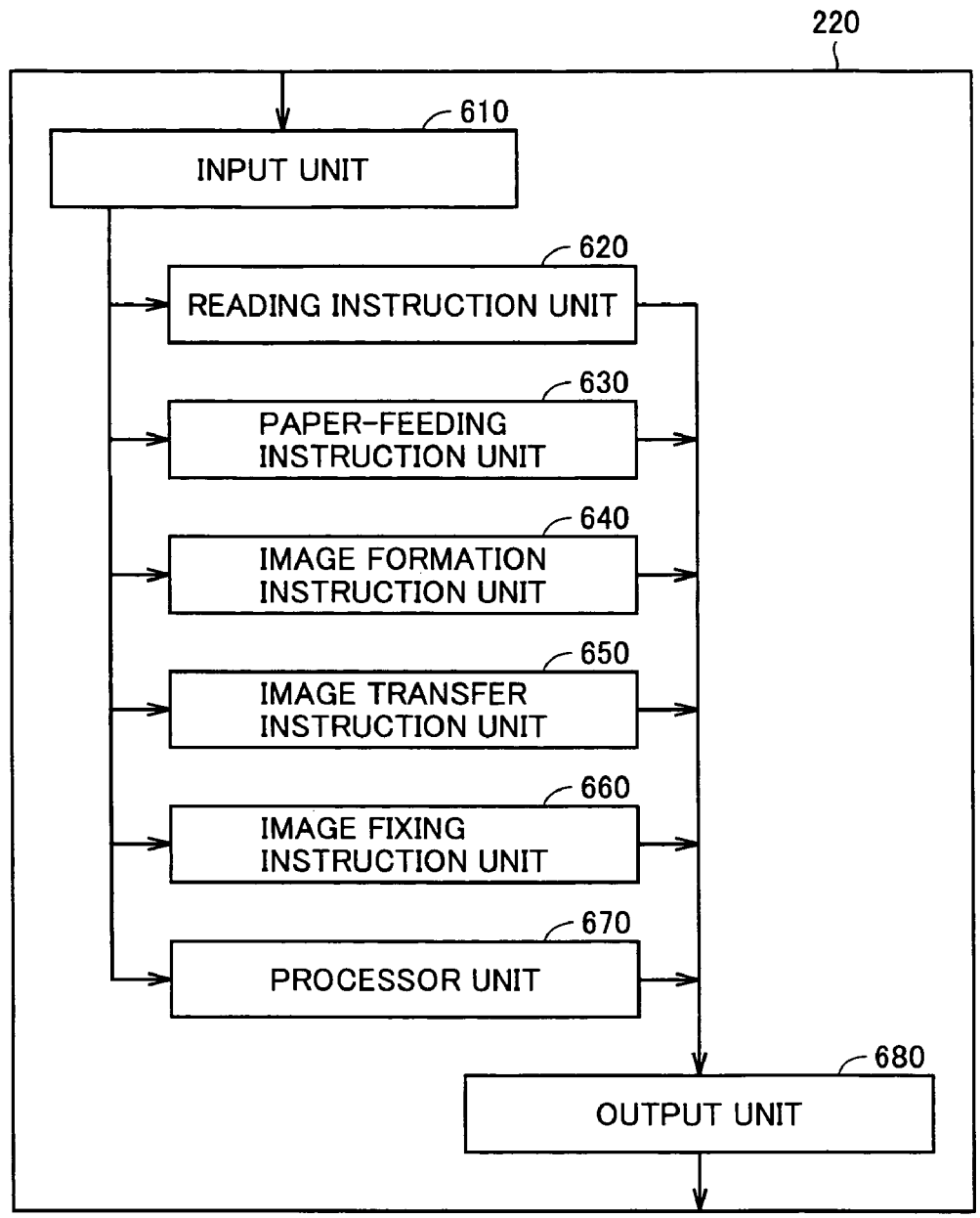
FIG. 6 is a block diagram illustrating a configuration of a function realized by a printer CPU 220.

Referring to FIG. 6, printer CPU 220 realizing image forming apparatus 100 will be described. FIG. 6 is a block diagram illustrating a functional configuration of printer CPU 220. Printer CPU 220 includes an input unit 610, a reading instruction unit 620, a paper-feeding instruction unit 630, an image forming instruction unit 640, an image transfer instruction unit 650, an image fixing instruction unit 660, a processor unit 670, and an output unit 680.

Input unit 610 receives an input of a signal sent from panel CPU 210 through communication unit 218. Input unit 610 also receives an input of data through input/output unit 222, control RAM 224, image RAM 226, flash ROM 228, and external I/F controller 230.

Reading instruction unit 620 gives an instruction to read a document placed on a tray based on a signal representing a key entry which is sent from panel CPU 210. Reading instruction unit 620 sends a signal representing the instruction to input/output unit 222.

Paper-feeding instruction unit 630 instructs one of paper cassettes 109-111 to supply paper according to the instruction described above in response to the key entry described above. Paper-feeding instruction unit 630 writes data for giving an instruction to supply paper at a predetermined address in input/output unit 222. When the data is written, one sheet of paper is removed from any one of paper cassettes to be sent to secondary transfer roller 107.

Image forming instruction unit 640 instructs each color Y/M/C/K photoconductor 105 to form an image for the read document after the instruction by reading instruction unit 620. Photoconductors 105 form the respective Y image/M image/C image/K image necessary for forming a color image based on that instruction.

Image transfer instruction unit 650 detects completion of image formation by each color photoconductor 105 to gives an instruction to transfer the formed image onto intermediate transfer unit 106. In response to this instruction, primary transfer is executed. Image transfer instruction unit 650 detects completion of primary transfer and gives an instruction to transfer the image on paper carried by secondary transfer roller 107. In response to this instruction, secondary transfer is executed. Image fixing instruction unit 660 outputs an instruction to fix a toner image by pressing paper having the image transferred thereon.

Processor unit 670 performs data processing for printer CPU 220 to execute in addtion to the processing described above. Output unit 680 stores each instruction or generated data at a predetermined address. Alternatively, output unit 680 sends data to panel CPU 210 through communication unit 218. In addition, output unit 680 transmits data to an information processor connected to the network through external I/F controller 230.

Figure 7:
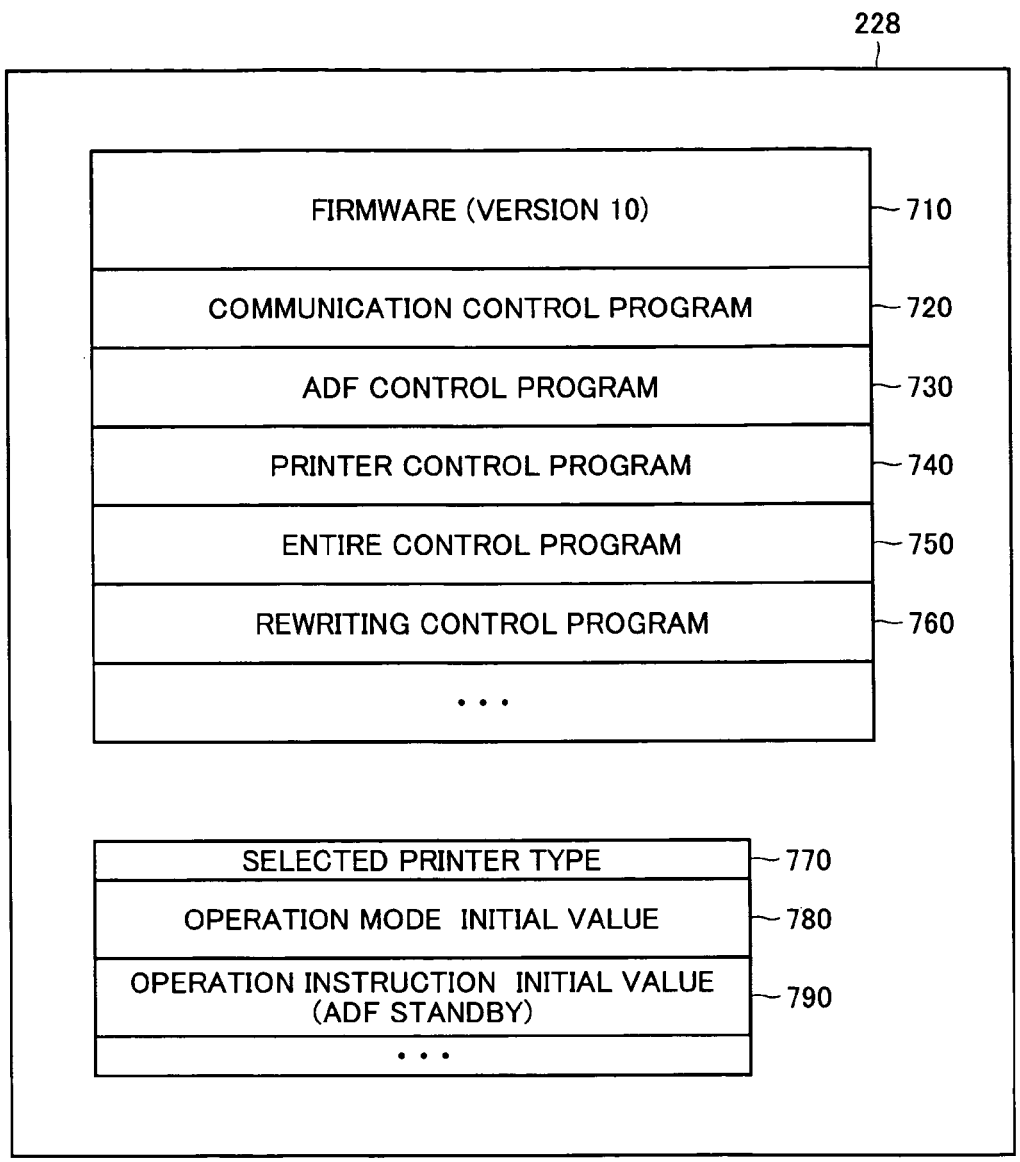
FIG. 7 is a diagram illustrating exemplary data storage in a flash ROM 228.

Referring to FIG. 7, the data structure of image forming apparatus 100 will be further described. FIG. 7 is a diagram illustrating exemplary data storage in flash ROM 228. Flash ROM 228 includes areas 710-760 for storing a program generated beforehand and areas 770-790 for storing data generated or selected during the operation of image forming apparatus 100.

The firmware prepared beforehand to function as a printer is stored in area 710. The communication control program for communication through external I/F controller 230 is stored in area 720. ADF (Auto Document Feed) control program for controlling the operation of automatic document-feeding unit 101 is stored in area 730. The printer control program for controlling the operations of each color photoconductor 105, intermediate transfer unit 106, secondary transfer roller 107, and others is stored in area 740. The entire control program for controlling the entire operation of the printer unit is stored in area 750. The rewriting control program for controlling the updating of data in flash ROM 228 is stored in area 760.

Data representing a selected printer type is stored in area 770. This data is sent from panel CPU 210 through communication unit 218. An initial value preset as an operation mode of the printer is stored in area 780. An initial value defining the initial operation by automatic document-feeding unit 101 is stored in area 790.

Figure 8:
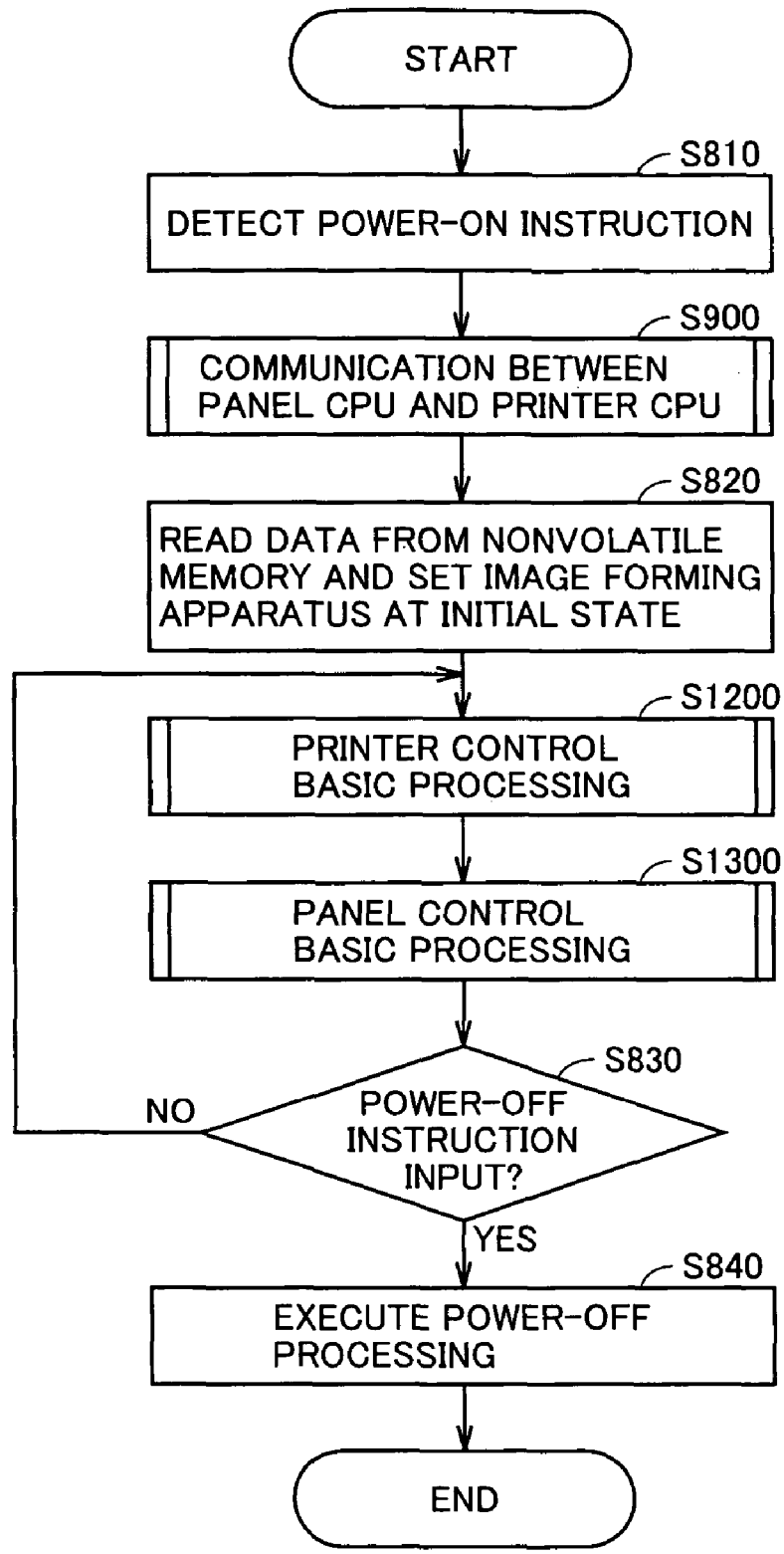
FIGS. 8 and 9 are flowcharts illustrating procedures of processing executed by panel CPU 210 and printer CPU 220.
Figure 9:
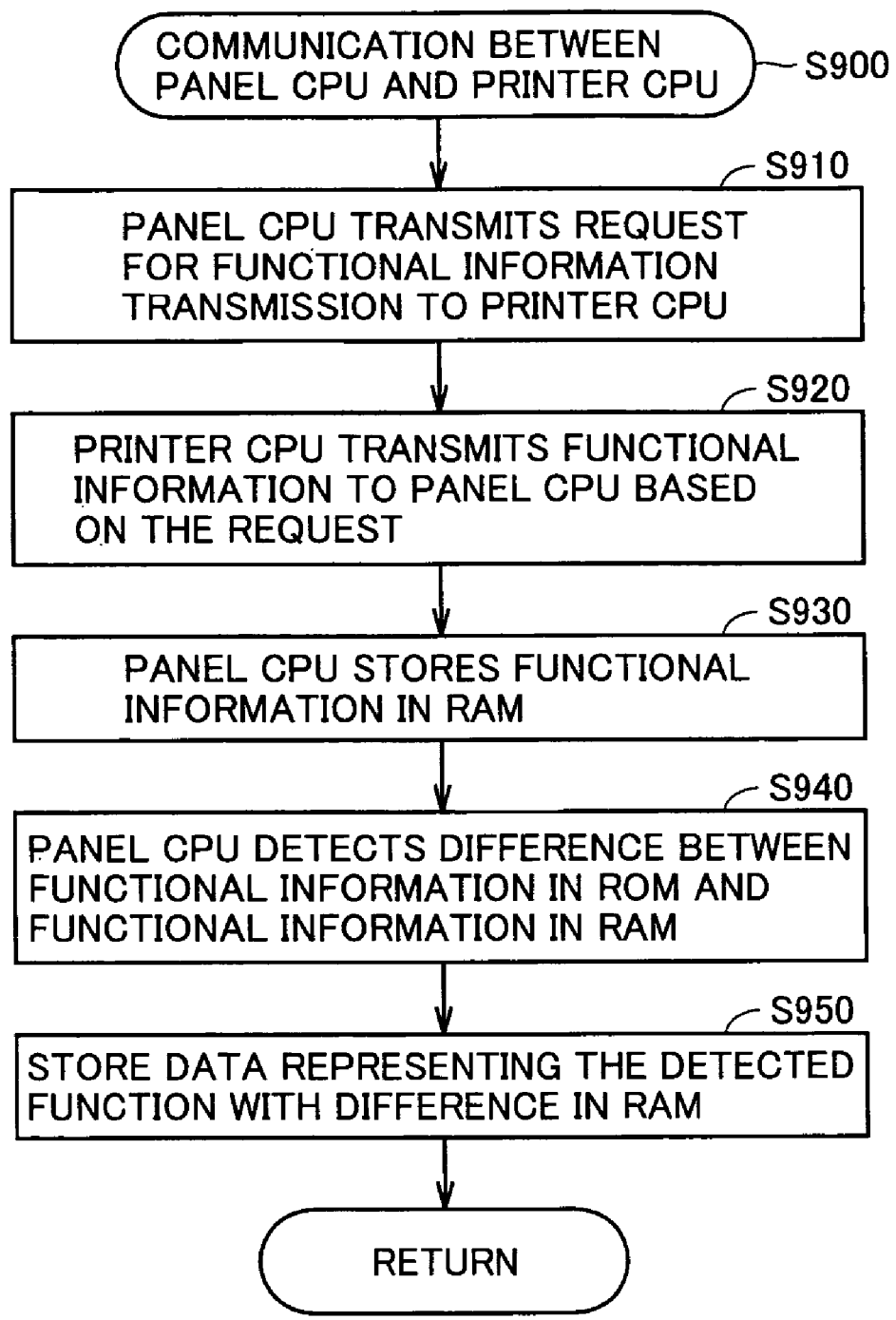

Referring to FIGS. 8 and 9, the control structure of image forming apparatus 100 will be described. FIGS. 8 and 9 are flowcharts illustrating the procedures of the processing executed by panel CPU 210 and printer CPU 220, respectively.

At step S810, panel CPU 210 detects an instruction of power-on of image forming apparatus 100. At step S900, panel CPU 210 and printer CPU 220 execute the communication processing with each other as described later. Upon execution of this processing, a difference between functional information stored in flash ROM 216 and functional information stored in control RAM 208 is detected.

At step S820, panel CPU 210 reads data from nonvolatile RAM 212 to set image forming apparatus 100 to an initial state based on the data. At step S1200, printer CPU 220 executes printer control basic processing as described later. Upon execution of this processing, data communications, paper-feeding, print control, the entire operation of image forming apparatus 100, data updating in flash ROM 228, and the like are realized.

At step S1300, panel CPU 210 executes panel control basic processing as described later. Upon execution of this processing, a panel type is selected, a window is displayed, and a key-entry on the displayed window is detected.

At step S830, panel CPU 210 determines whether or not an instruction of power-off is input. If the instruction of power-off is input (YES at step S830), the process proceeds to step S840. If not (NO at step S830), the process returns to step S1200. At step S840, panel CPU 210 executes predetermined processing for the power-off of image forming apparatus 100.

Referring to FIG. 9, at step S910, panel CPU 210 transmits to printer CPU 220 a request to transmit functional information. At step S920, printer CPU 220 transmits functional information to panel CPU 210 based on the request. This information is stored, for example, in a predetermined area in flash ROM 228.

At step S930, panel CPU 210 stores the functional information transmitted from printer CPU 220 in an area temporarily allocated in control RAM 208. At step S940, panel CPU 210 detects the difference of the functional information based on the functional information stored in control RAM 208 and the information stored in flash ROM 216. The function with a difference is thereby specified. At step S950, panel CPU 210 stores data representing the function detected to have a difference in control RAM 208.

Figure 10:
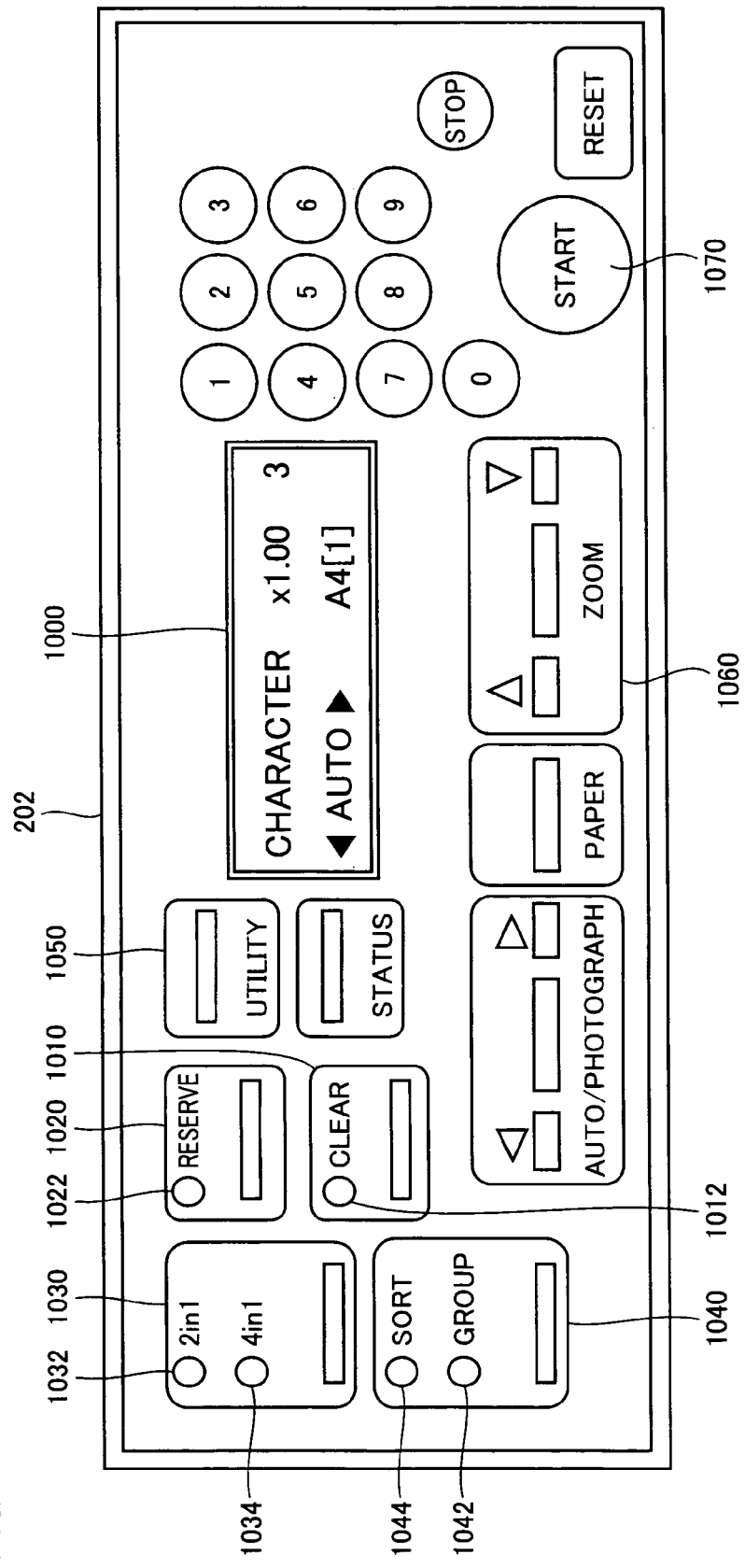
FIGS. 10 and 11 are views illustrating display of windows in a touch-panel LCD 202.
Figure 11:
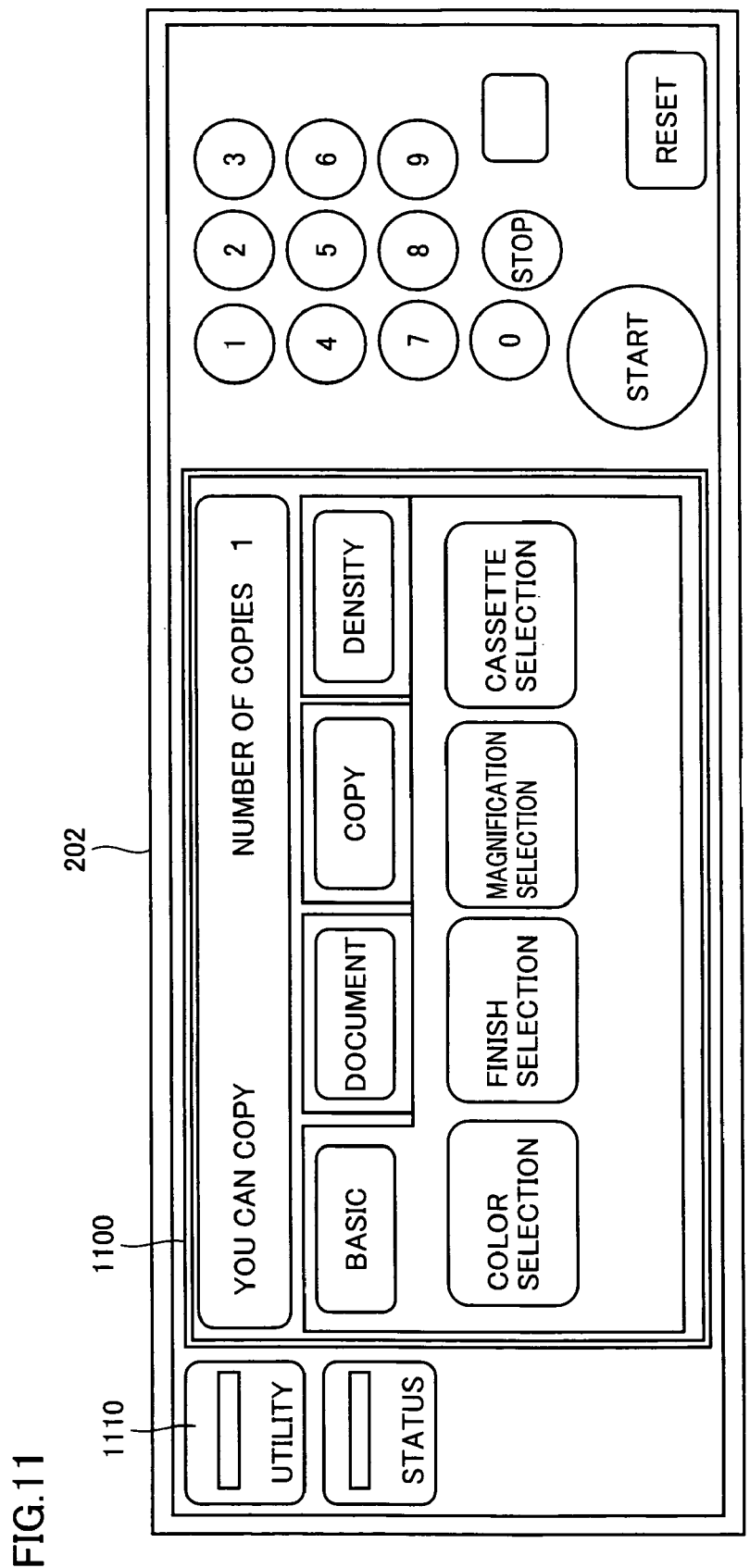

Now, referring to FIGS. 10 and 11, exemplary panel display in image forming apparatus 100 will be described. FIGS. 10 and 11 are views each illustrating window display in touch panel LCD 202.

Referring to FIG. 10, touch panel LCD 202 displays an area 1000 for displaying a character and an image (for example areas 1010-1070) for receiving an instruction input to operate image forming apparatus 100. Touch panel LCD 202 also displays numerical buttons for receiving an input of numerals, buttons defining the start and end of an operation by image forming apparatus 100, and other buttons necessary for generally realizing the image forming apparatus.

For example, area 1010 and area 1020 each represent LED (Light-Emitting Diode). Either LED turns on when predetermined illumination conditions are fulfilled in each display.

Furthermore, area 1030 displays a window for defining the degree of collection in which plural sheets of original document are collectively copied. For example, "2in1" indicates that images on two sheets of original document are copied in one sheet. It is noted that each function corresponding to the display shown in FIG. 10 is well known in the field of copiers as one form of the image forming apparatus and is readily understood by those skilled in the art. Therefore, the detailed description thereof will not be repeated.

Referring to FIG. 11, in accordance with another aspect of an image forming apparatus 100, touch panel LCD 202 displays an area 1100 for receiving an input for defining an operation of image forming apparatus 100. This area 1100 includes data that defines selection of magnifications generally defined in image forming apparatus 100, setting of a cassette, and any other operations of image forming apparatus 100. FIGS. 11 and 10 show windows of different image forming apparatuses. However, touch panel LCD 202 can realize any display based on the data stored in flash ROM 216.

Figure 12:
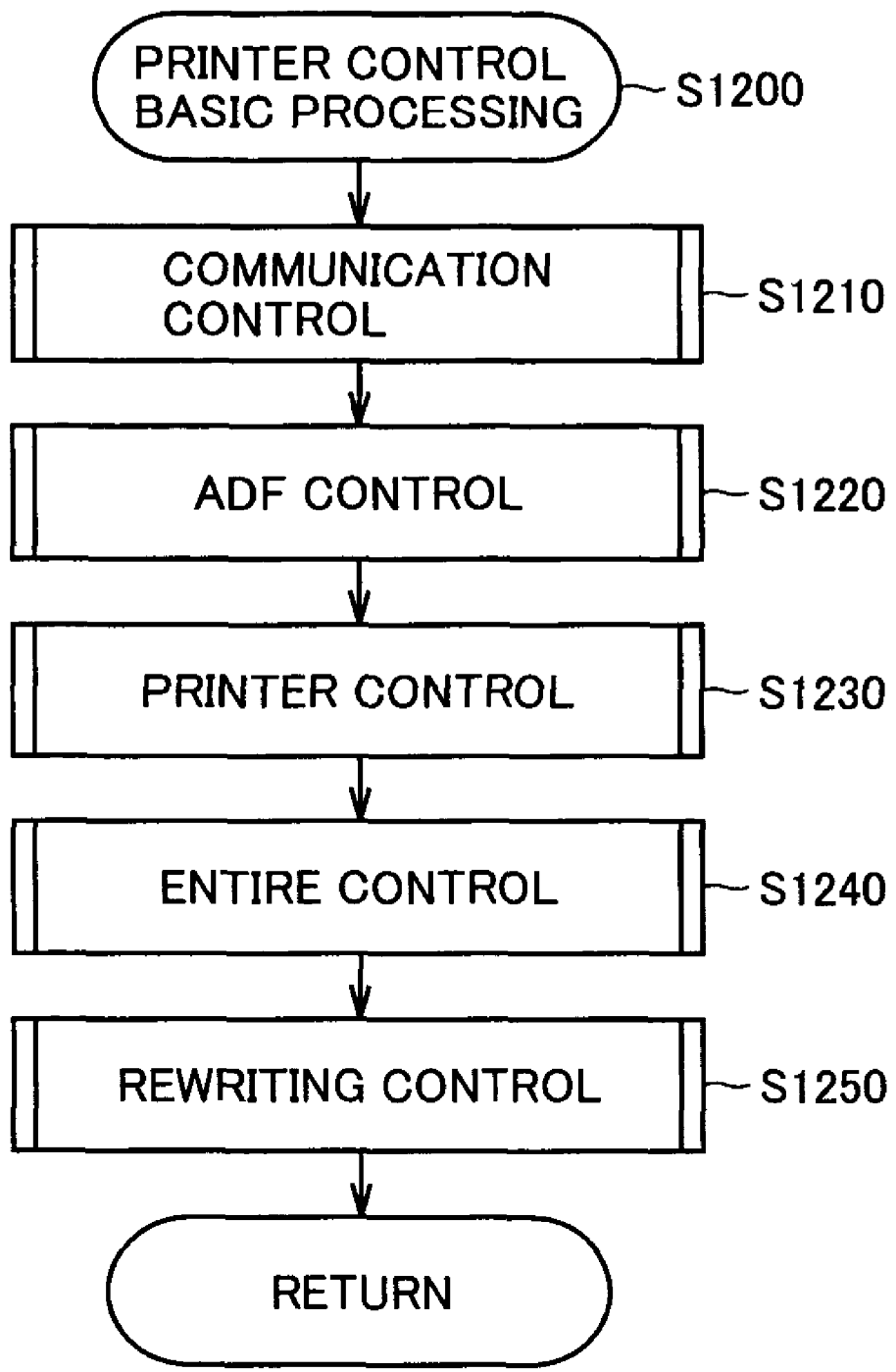
FIG. 12 is a flowchart illustrating a procedure of processing executed by printer CPU 220.
Figure 13:
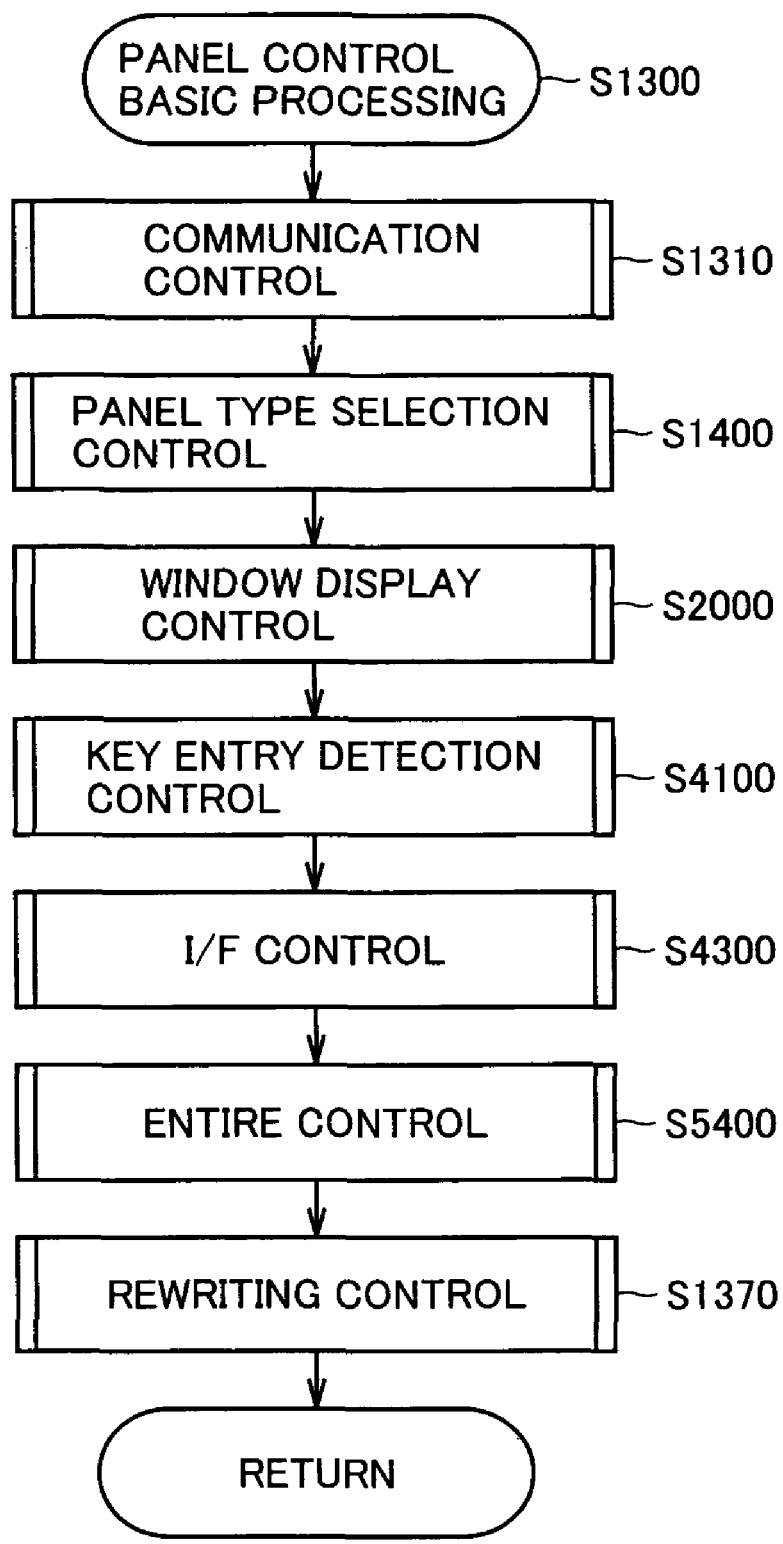
FIG. 13 is a flowchart illustrating a procedure of panel control basic processing (S1300) executed by panel CPU 210.
Figure 14:
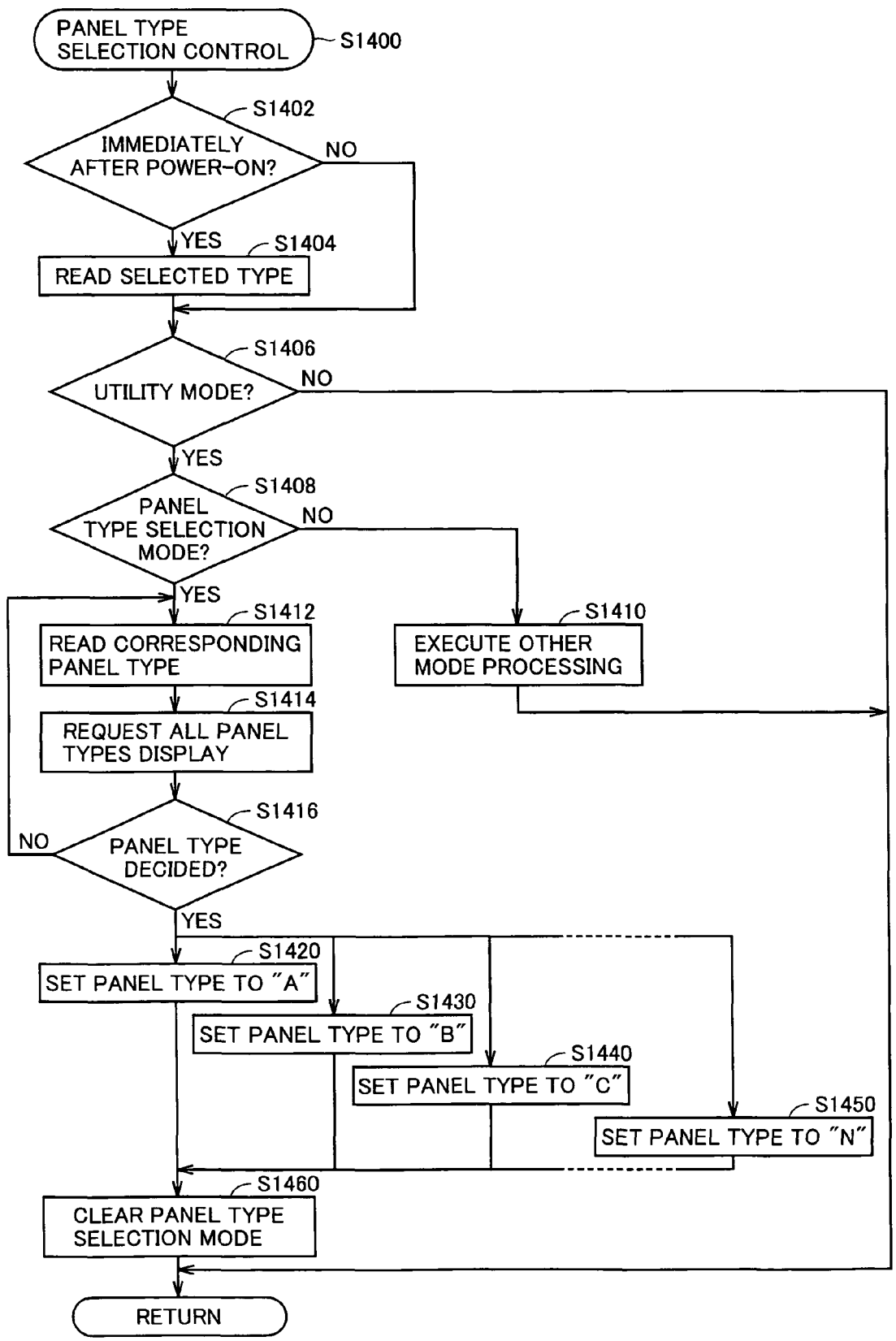
FIG. 14 is a flowchart illustrating a procedure of processing executed by panel CPU 210 for selecting a panel type.

Referring to FIGS. 12-14, the control structure of image forming apparatus 100 will be described in more detail. FIG. 12 is a flowchart illustrating the procedure of the processing executed by printer CPU 220.

At step S1210, printer CPU 220 controls both communications with panel CPU 210 through communication unit 218 and external communications through external I/F controller 230. At step S1220, printer CPU 220 performs detection, carrying, and error detection of a document placed on automatic document-feeding unit 101. At step S1230, printer CPU 220 performs paper-supply, image formation, transfer, fixing, ejection, and error detection. At step S1240, printer CPU 220 controls the entire operation of image forming apparatus 100. This control is carried out based on input information transmitted from panel CPU 210. At step S1250, printer CPU 220 executes rewrite control. In other words, printer CPU 220 rewrites data to flash ROM 228 and transfers data to panel CPU 210 through communication unit 218.

FIG. 13 is a flowchart illustrating the procedure of the panel control basic processing (S1300) executed by panel CPU 210. At step S1310, panel CPU 210 controls the communication with printer CPU 220. Upon control of the communication, data communications are performed to cause image forming apparatus 100 to function as a specific apparatus. At step S1400, panel CPU 210 executes panel-type selection control as described later. Upon execution of this processing, any of the panel types is set.

At step S2000, panel CPU 210 executes display of a window on touch panel LCD 202. Upon execution of this processing, a window corresponding to any of the panel types appears on touch panel LCD 202.

At step S4100, panel CPU 210 executes key-entry detection control as described later. Upon execution of the processing, a key operated according to a panel type is detected.

At step S4300, panel CPU 210 executes I/F control as described later. Upon execution of the processing, the format of information (a variety of commands) handled by panel CPU 210 is converted to the format corresponding to printer CPU 220 to enable data communications between panel CPU 210 and printer CPU 220.

At step S5400, panel CPU 210 executes the entire control as described later. Upon execution of the processing, the entire operation of the operation panel displayed on touch panel LCD 202 is managed. At step S1370, panel CPU 210 executes data rewrite for flash ROM 216.

Referring to FIG. 14, the structure of the panel-type selection control will be described. FIG. 14 is a flowchart illustrating the procedure of the processing executed by panel CPU 210 to select a panel type.

At step S1402, panel CPU 210 determines whether or not image forming apparatus 100 is in a state immediately after power-on. If image forming apparatus 100 is in a state immediately after power-on (YES at step S1402), the process proceeds to step S1404. If not (NO at step S1402), the process proceeds to step S1406.

At step S1404, panel CPU 210 reads data representing a selected type from flash ROM 216 to control RAM 208. Here, the selected type is the one that has already been selected in image forming apparatus 100.

At step S1406, panel CPU 210 determines whether or not a mode of a window displayed on touch panel LCD 202 is a utility mode. If the mode of the window is a utility mode (YES at step S1406), the process proceeds to step S1408. If not (NO at step S1406), the process ends and proceeds to the main processing.

At step S1408, panel CPU 210 determines whether or not a mode of a window on touch panel LCD 202 is a panel-type selection mode. If the mode of the window is a panel-type selection mode (YES at step S1408), the process proceeds to step S1412. If not (NO at step S1408), the process proceeds to step S1410.

At step S1412, panel CPU 210 reads the corresponding panel type. At step S1414, panel CPU 210 requests to display all panel types. At step S1416, panel CPU 210 determines whether or not a panel type is decided. If a panel type is decided (YES at step S1416), the process proceeds to any one of steps S1420-1450 according to the panel type. If not (NO at step S1416), the process returns to step S1412.

At step S1420, panel CPU 210 sets a panel type to "type A" based on data stored in flash ROM 216. Upon execution of this processing, a control structure of touch panel LCD 202 is realized so as to operate according to instructions input from outside (for example, a press on the touch panel).

At step S1430, panel CPU 210 sets a panel type to "type B" based on the data stored in flash ROM 216. Upon execution of this processing, similarly to the case of panel type A, the control structure of touch panel LCD 202 is realized. Specifically, detection of a press on a particular area of touch panel LCD 202, an output of a signal according to the press, a program realizing a specific operation according to the signal, and the like are set in an executable form.

At step S1440, panel CPU 210 sets a panel type to "type C". Upon execution of the processing, similarly to the case of the panel type A, the control structure of touch panel LCD 202 is realized to allow the touch panel to function as the panel type C.

At step S1450, panel CPU 210 sets a panel type to "type N". The control structure of touch panel LCD 202 is realized to allow the touch panel to function as the panel type N. At step S1460, panel CPU 210 clears the panel-type selection mode.

Figure 15:
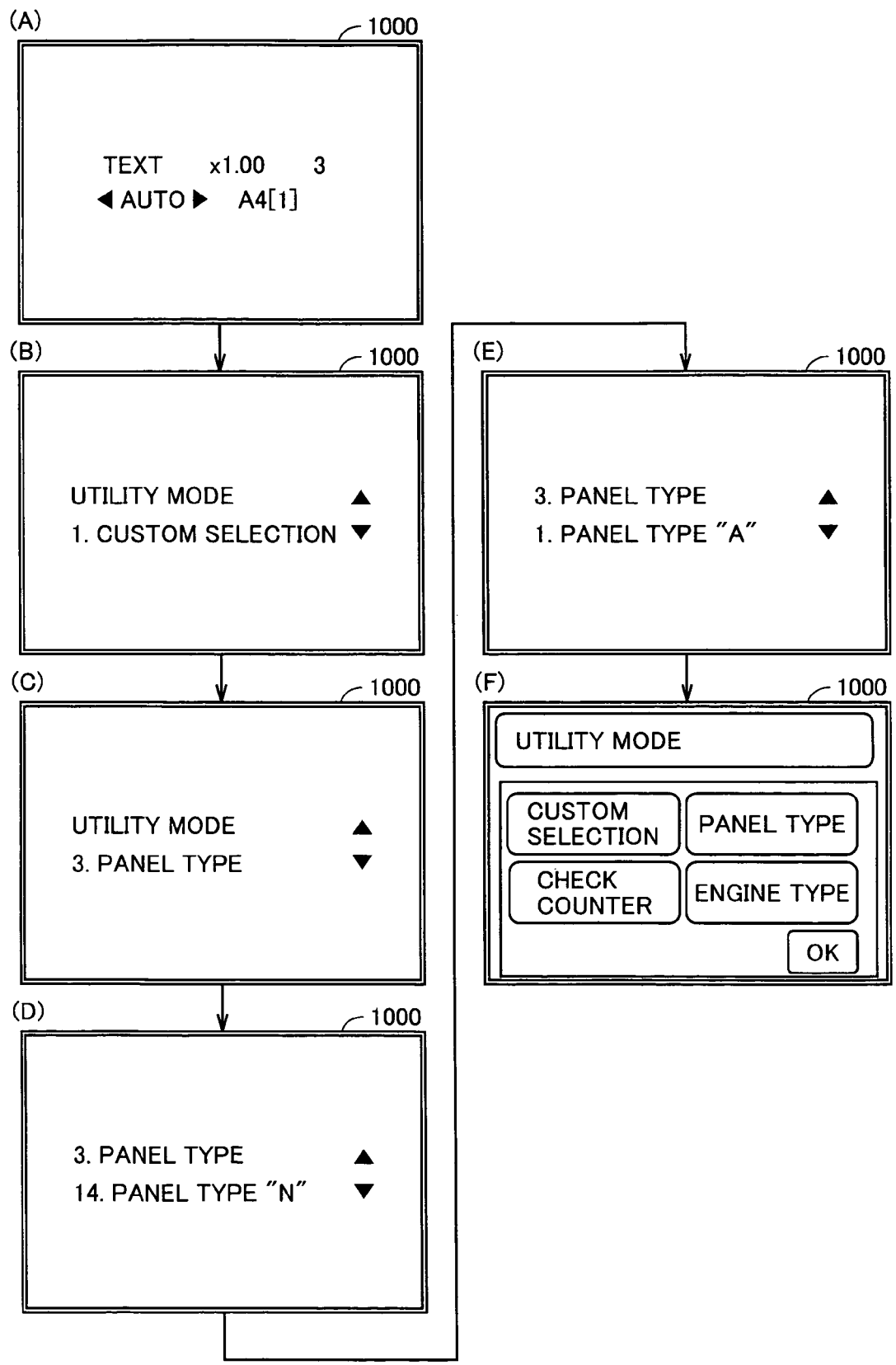
FIGS. 15 and 16 are views illustrating transition of a panel setting window in image forming apparatus 100.

Referring to FIGS. 15-19, a manner of setting the panel in image forming apparatus 100 will be described. FIG. 15 is a diagram illustrating transitions of panel setting windows.

As shown in window A, touch panel LCD 202 shows an area 1000 in which a magnification is displayed. The user of image forming apparatus 100 presses a utility button 1050 (FIG. 10), so that the display of area 1000 is switched to the utility mode as shown in window B.

Here, when the user presses a button 1060 for switching up and down of the display, as shown in window C, display of a submenu included beforehand in the utility mode is switched ("1. custom select"→"3. panel type"). When the user presses an area 1070 corresponding to a start button to confirm the selection, as shown in window D, the display of area 1000 is switched to a detail menu of "3. panel type". The detail menu is a menu previously selected (for example, "14. panel type 'N'").

In this state, the user presses area 1060 to input an instruction to switch the display on the screen up and down, so that the submenu is change according to the instruction, and the panel types are successively switched. For example, as shown in window E, the submenu of "1. panel type A" is displayed. Such a change in display is realized by reading data representing display of a submenu prepared beforehand in the memory according to a signal output in response to a press, and executing the display processing based on the data. The switching of display of other windows is realized similarly.

In this state, the user presses area 1070, so that the selection is confirmed in response to the pressing. The data corresponding to the selection is read from the memory, and the display processing is executed. As a result, as shown in window F, area 1000 displays a window displaying the menu in the utility mode.

Figure 16:
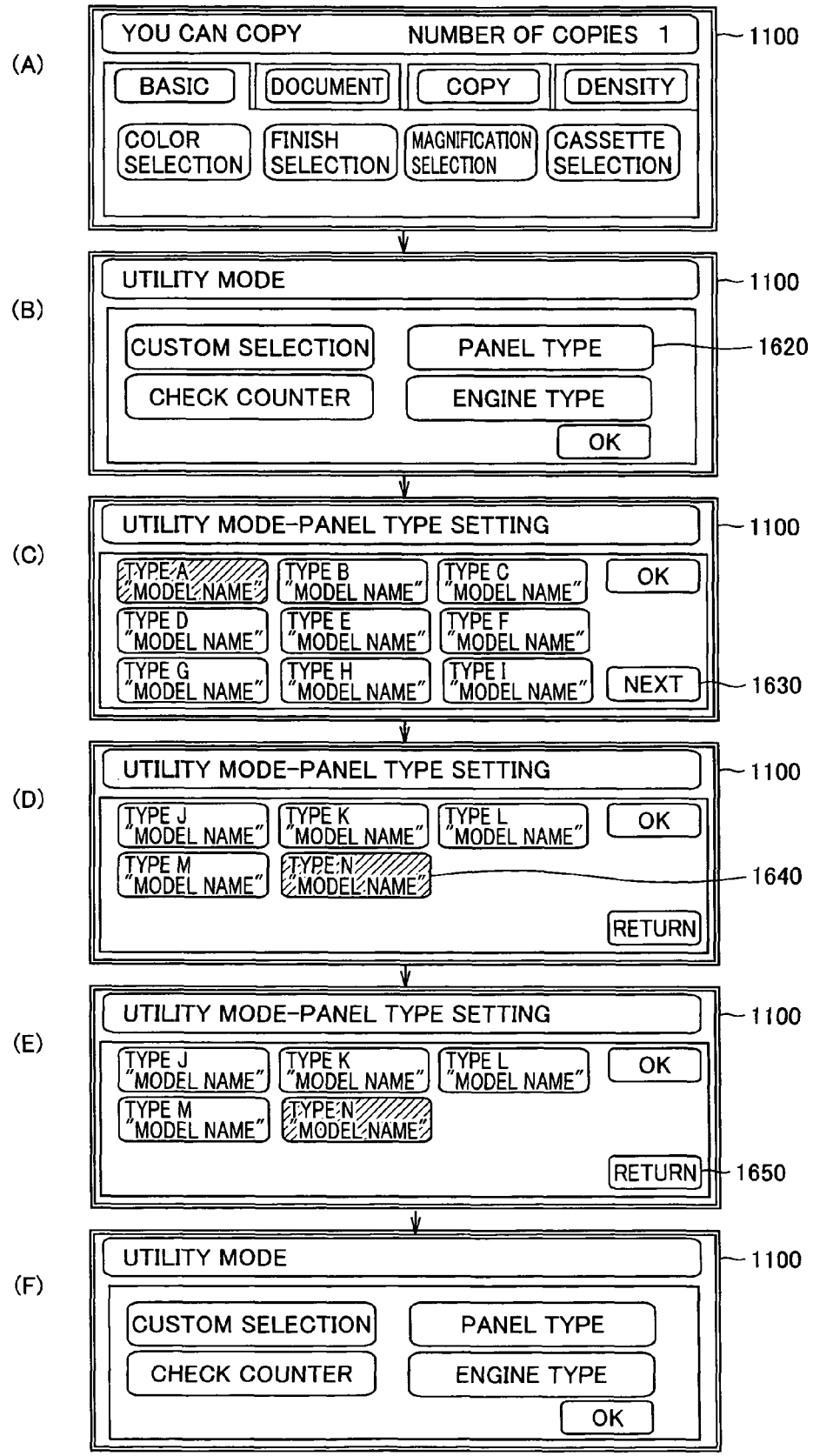

FIG. 16 is a view illustrating exemplary changing windows displayed in area 1100 of the touch panel LCD shown in FIG. 11.

When window A is displayed in area 1100 as an initial window for receiving an input of a copy instruction, the display in area 1100 is switched from window A to window B by the user pressing utility button 1110.

As shown in window B, area 1100 displays a window in which "utility mode" is defined. Specifically, the submenus including custom selection, panel type and the like are displayed in area 1100.

When the user presses an area 1620 indicating "panel type", the display in area 1100 is switched to window C. In this window, small areas for respectively receiving selection of a plurality of panel types prepared beforehand are displayed. When the user presses an area 1630 indicating "next" for switching the display, the display in area 1100 is switched to window D.

In window D, when the user presses an area 1640 indicating type N as a touch panel type, the selection of panel type is confirmed in response to the pressing, and area 1100 displays window E. When the user presses an area 1650 indicating "return", area 1100 displays an initial window of utility mode (window F).

Figure 17:
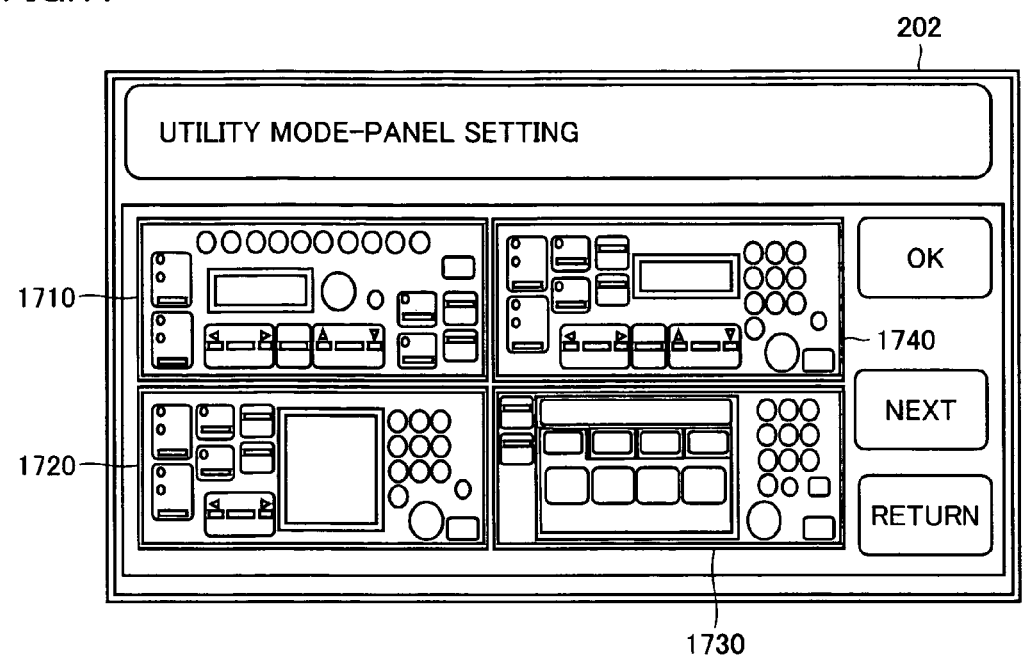
FIG. 17 is a view exemplarily illustrating selection of a panel type in image forming apparatus 100 in accordance with another aspect.

FIG. 17 is a view exemplarily illustrating selection of a panel type in accordance with another aspect. More specifically, the user can recognize the overview of the desired touch panel by allowing touch panel LCD 202 to display the thumbnail image of the touch panel prepared beforehand. This thumbnail image is prepared beforehand for displaying a panel that can be realized by image forming apparatus 100. The data is stored, for example, in flash ROM 216.

Referring to FIG. 17, touch panel LCD 202 displays four thumbnail images 1710-1740 in one window. When the user presses any of the thumbnail images, that thumbnail image is selected, and the data realizing a panel corresponding to the thumbnail image stored in flash ROM 216 is read. The data is retrieved in an executable format for realizing the display in touch panel LCD 202, the display of touch panel LCD 202 is thereafter switched to the same display as the selected thumbnail image. Furthermore, a signal output from each area is associated in an executable format with a program for realizing the function corresponding to each area included in the image so that that function is realized. The panel type is thereby set based on the selection of the thumbnail image.

In this manner, the user can set a panel by intuition, so that, for example, an error in setting detail functions can be prevented.

Figure 18:
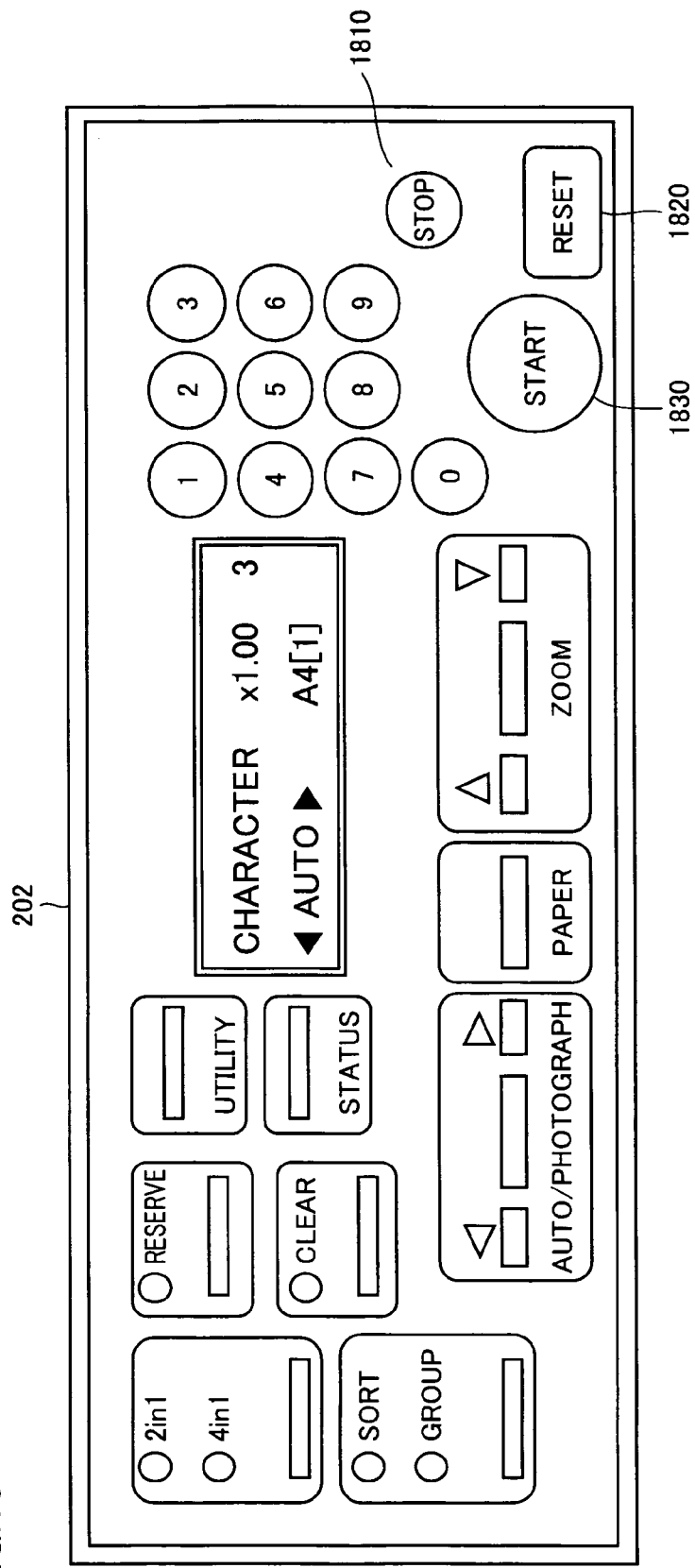
FIGS. 18 and 19 are views illustrating display of panels in image forming apparatus 100 in accordance with another aspect.

FIG. 18 is a view illustrating exemplary display of the panel in accordance with another aspect. Referring to FIG. 18, touch panel LCD 202 realizes full-scale display of a panel in image forming apparatus 100. This display allows the user to easily understand the substantial panel to be selected. In this case, a key that can be included in any panel, for example, a stop button 1810, a reset button 1820, or a start button 1830 may be assigned for a select operation, as a button that is selected to allow image forming apparatus 100 to function.

Figure 19:
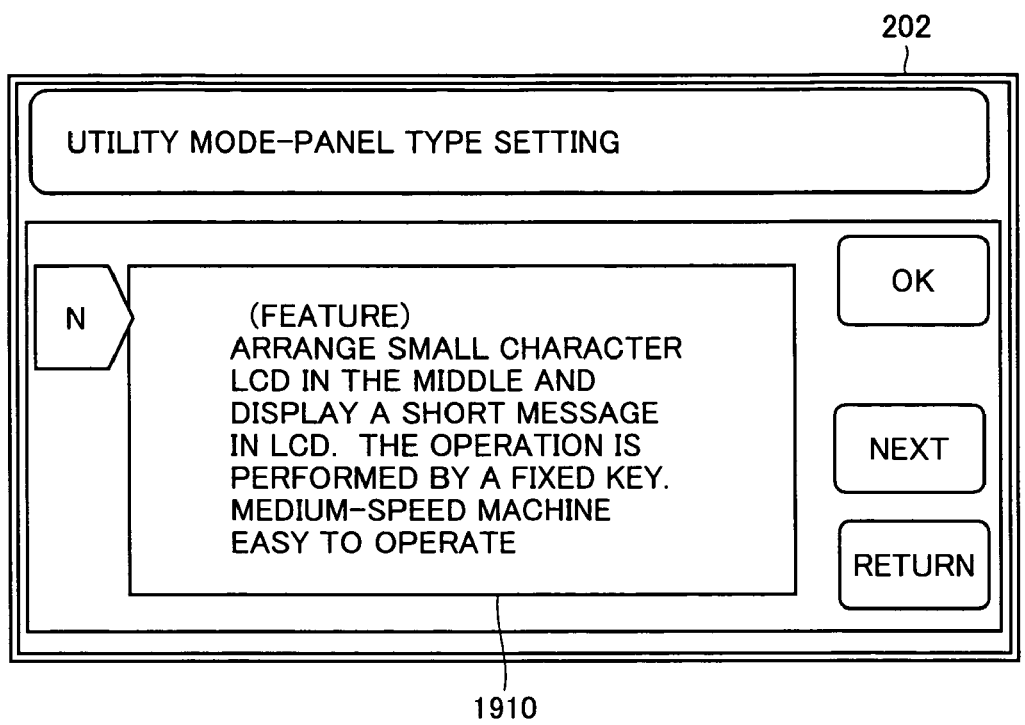

FIG. 19 is a view illustrating exemplary display of a window of touch panel LCD 202 in accordance with yet another aspect. The image forming apparatus in accordance with this aspect may display the feature of an actually-realized function in area 1910 as descriptive text in place of display (icon) representing each function as described above. In this way, the user can select a function based on the descriptive text. As a result, the function realized by image forming apparatus 100 can be recognized accurately by the user, so that erroneous setting can be prevented.

Figure 20:
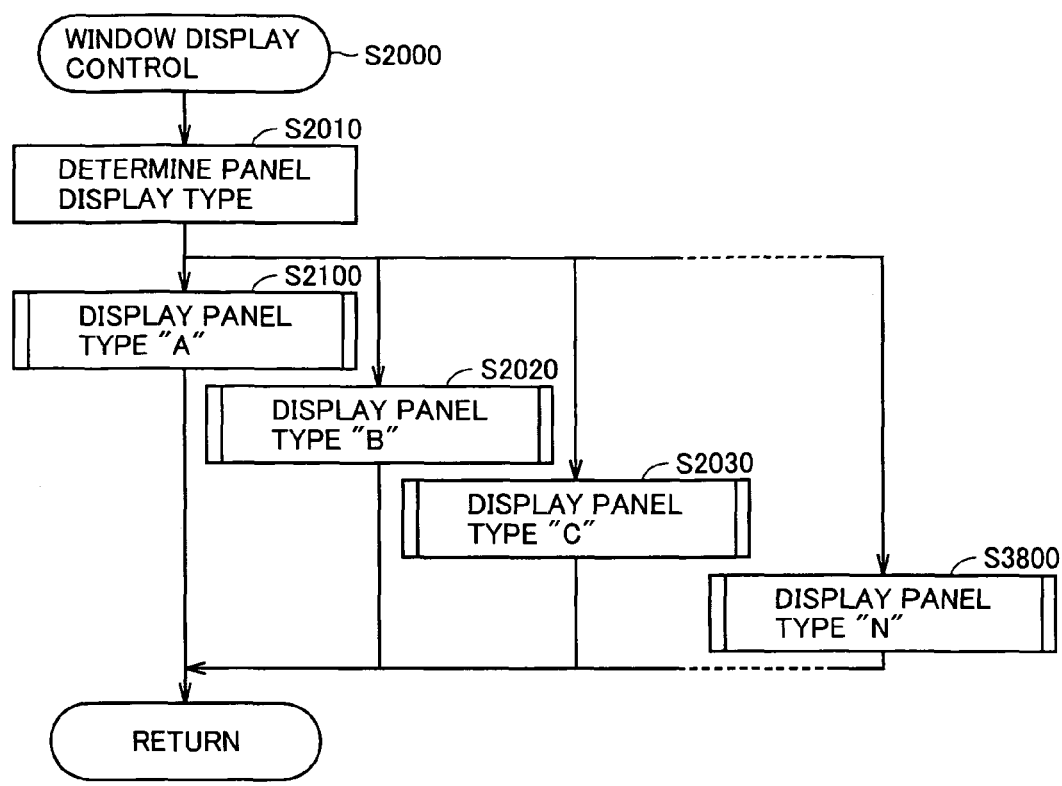
FIG. 20 is a flowchart illustrating a procedure of processing executed by panel CPU 210 for displaying a window.

Referring to FIG. 20, the control structure of image forming apparatus 100 will be further described. FIG. 20 is a flowchart illustrating the procedure of the processing executed by panel CPU 210 for displaying a window.

At step S2010, panel CPU 210 determines a panel type displayed on touch panel LCD 202 based on data input through LCD controller 204. The processing is switched according to the determined panel type. Specifically, when a panel of type A is displayed, the process proceeds to step S2100. When a panel of type B is displayed, the process proceeds to step S2020. When a panel of type C is displayed, the process proceeds to step S2030. When a panel of type N is displayed, the process proceeds to step S3800.

At step S2100, panel CPU 210 executes the panel type A display processing as described later. Upon execution of this processing, a panel of type A is displayed. At step S2020, panel CPU 210 executes the panel type B display processing. Upon execution of this processing, a panel of type B is displayed. At step S2030, panel CPU 210 executes the panel type C display processing. Upon execution of this processing, a panel of type C is displayed. It is noted that in the following description displaying a panel of type A will be described representatively. The display of panels of other types is realized similarly.

At step S3800, panel CPU 210 executes the panel type N display processing as described later. Upon execution of this processing, a panel of type N is displayed.

Figure 21:
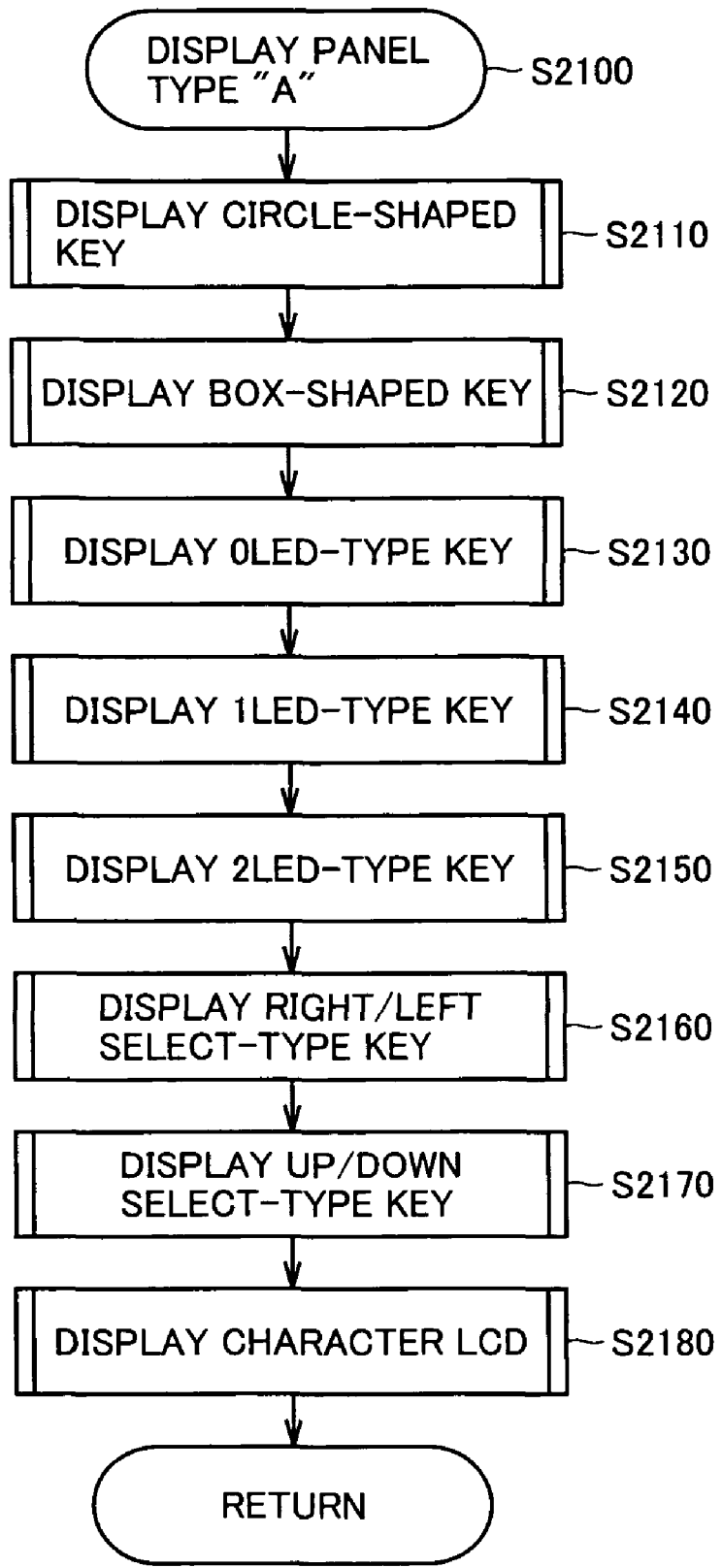
FIG. 21 is a flowchart illustrating a procedure of processing executed by panel CPU 210 for displaying a panel of type A.

Referring to FIG. 21, the control structure of image forming apparatus 100 will be further described. FIG. 21 is a flowchart illustrating the procedure of the processing executed by panel CPU 210 for displaying a panel of type A.

At step S2110, panel CPU 210 executes the circle-shaped key display processing based on the data stored in flash ROM 216. Upon execution of this processing, a circle-shaped key is displayed on touch panel LCD 202. At step S2120, panel CPU 210 executes the box-shaped key display processing based on the data stored in flash ROM 216. Upon execution of this processing, a box-shaped key is displayed on touch panel LCD 202.

At step S2130, panel CPU 210 executes the 0LED-type key display processing. Upon execution of this processing, display of a key not including display corresponding to LED display is realized. At step S2140, panel CPU 210 executes the 1LED-type key display processing. Upon execution of this processing, a key realizing display corresponding to one LED display is displayed. At step S2150, panel CPU 210 executes the two LED-type key display processing. Upon execution of this processing, a key realizing display corresponding to two LEDs display is displayed.

At step S2160, panel CPU 210 executes the right/left select-type key display processing. Upon execution of this processing, a key for successively switching the display rightward and leftward to allow selection of submenus is displayed. At step S2170, panel CPU 210 executes the up/down select-type key display processing. Upon execution of this processing, a key for switching the display upward and downward to allow selection of submenus is displayed.

At step S2180, panel CPU 210 executes the character LCD display processing. Upon execution of this processing, each character is displayed in an area allocated for display. Furthermore, it becomes possible for the user to input a character.

Figure 22:
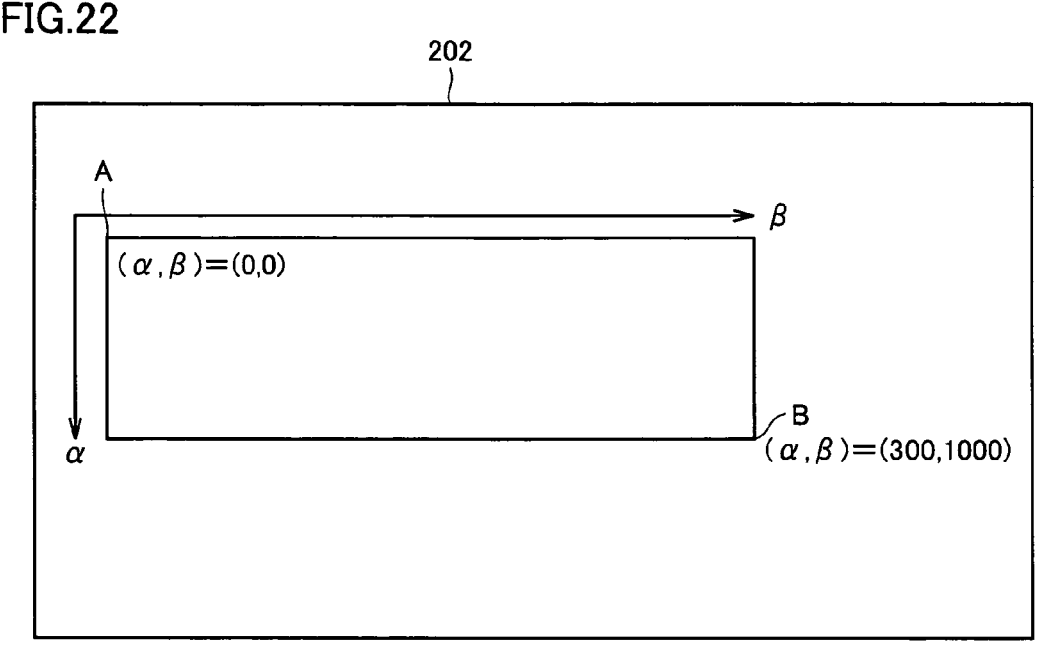
FIG. 22 is a diagram in which predetermined coordinate axes are displayed for specifying a position of an image displayed on touch-panel LCD 202.

Here, referring to FIG. 22, the manner of presenting display parts (key/LED/LCD display/each character string) in touch panel LCD 202 will be described. FIG. 22 is a diagram in which predetermined coordinate axes are displayed to specify a position of an image displayed on touch panel LCD 202.

An area of touch panel LCD 202 is specified by a point A and a point B. Specifically, point A corresponds to the origin of touch panel LCD 202. The coordinates $(\alpha, \beta)$ of point A are set, for example, as (0, 0). The coordinates of point B are set, for example, as (300, 1000). The coordinates in touch panel LCD 202 are specified in this way so that the position of each of the display parts can be set based on the coordinates. An area and the like can thus be displayed.

Figure 23:
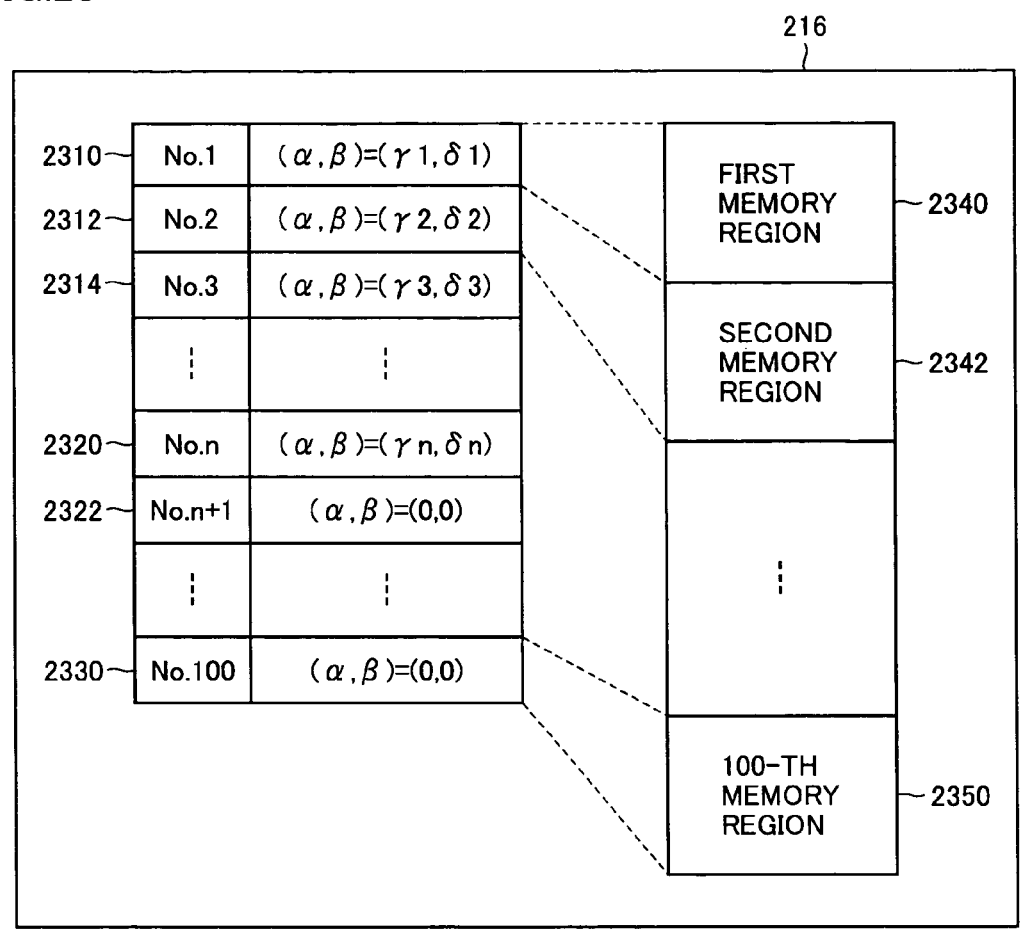
FIG. 23 is a diagram illustrating data storage in flash ROM 216.

Referring to FIG. 23, the data structure of image forming apparatus 100 will be described. FIG. 23 is a diagram illustrating data storage in flash ROM 216. Flash ROM 216 includes areas 2310-2330 for storing the coordinates of the parts displayed on touch panel LCD 202, and areas 2340-2350 for storing data representing each of the display parts.

In the example shown in FIG. 23, image forming apparatus 100 has 100 data records as coordinates information for arranging the parts. In addition, each coordinate is related to an area in which information of a part displayed at that position is stored. Therefore, a position of each part is specified based on the coordinates data, and a part that is actually displayed is specified based on the parts data.

Figure 24:
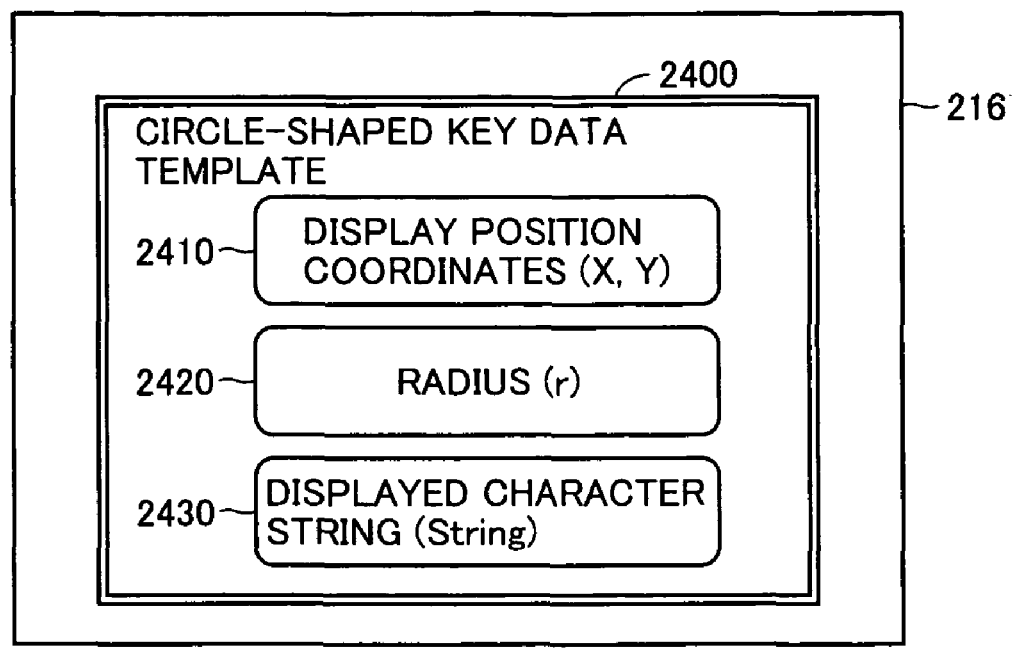
FIG. 24 is a diagram illustrating exemplary data storage in flash ROM 216.
Figure 25:
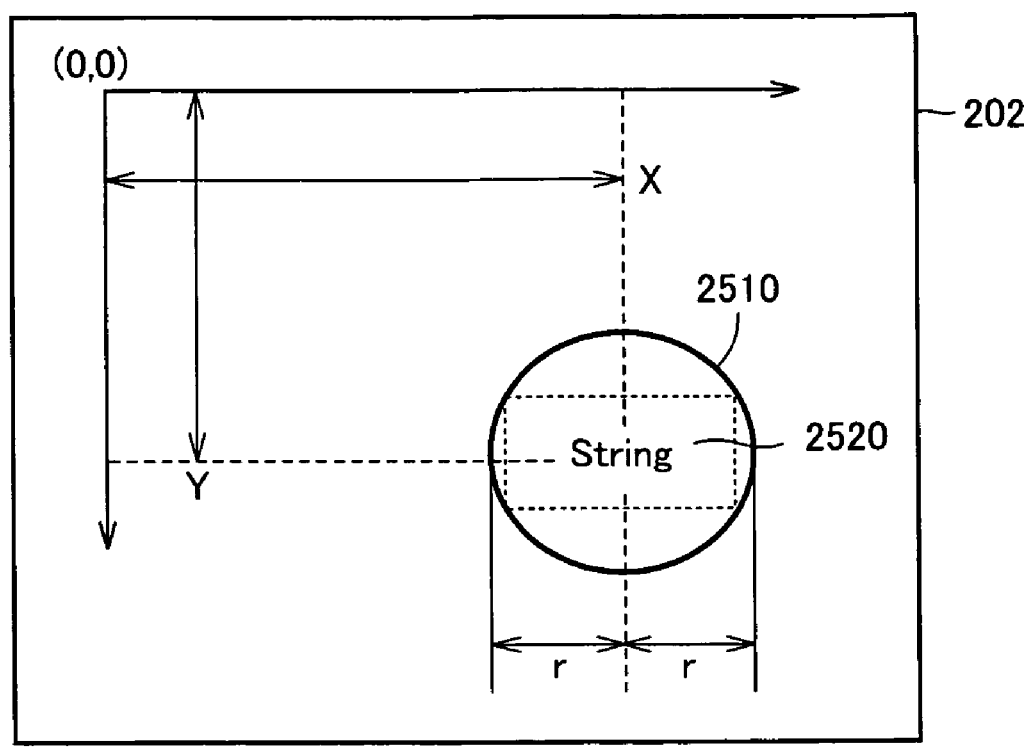
FIG. 25 is a view illustrating exemplary display of a circle-shaped key in touch-panel LCD 202.

Referring to FIGS. 24 and 25, display of a circle-shaped key will be described. FIG. 24 is a diagram illustrating exemplary data storage in flash ROM 216. FIG. 25 is a view illustrating exemplary display of a circle-shaped key on touch panel LCD 202.

As shown in FIG. 24, flash ROM 216 includes an area 2400 for storing a circle-shaped key data template. A template 2400 includes areas 2410-2430 for storing data. The coordinates (X, Y) of display position of the circle-shaped key are stored in area 2410. Data representing the radius of the circle-shaped key is stored in area 2420. A character string displayed inside the key is stored in area 2430.

As shown in FIG. 25, a circle-shaped key 2510 is displayed on touch panel LCD 202 based on template 2400 (FIG. 24). In other words, the coordinates of the center of the key are (X, Y), which position is based on the data stored in area 2410. The radius (r) of the key is based on the data stored in area 2420. A character string 2520 is displayed based on the data stored in area 2430.

Figure 26:
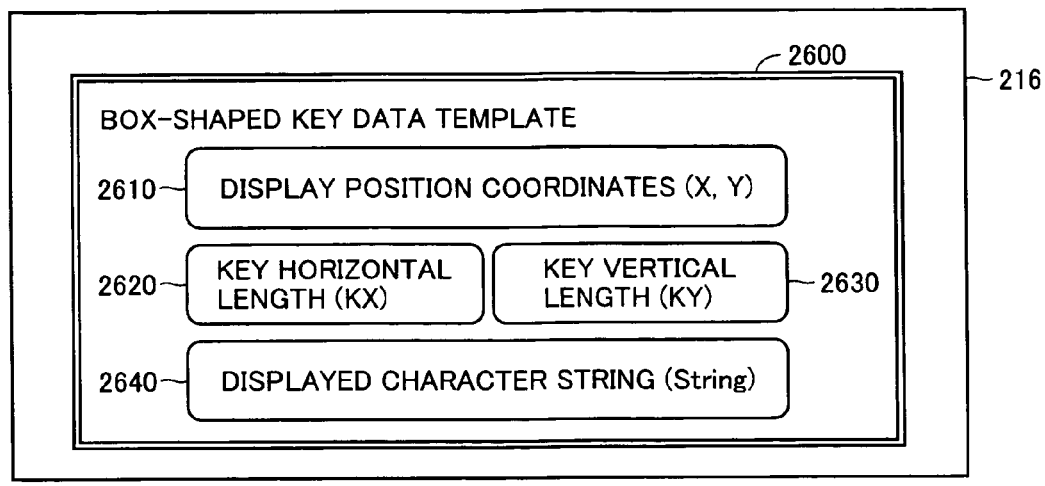
FIG. 26 is a diagram illustrating storage of a template 2600 in flash ROM 216.
Figure 27:
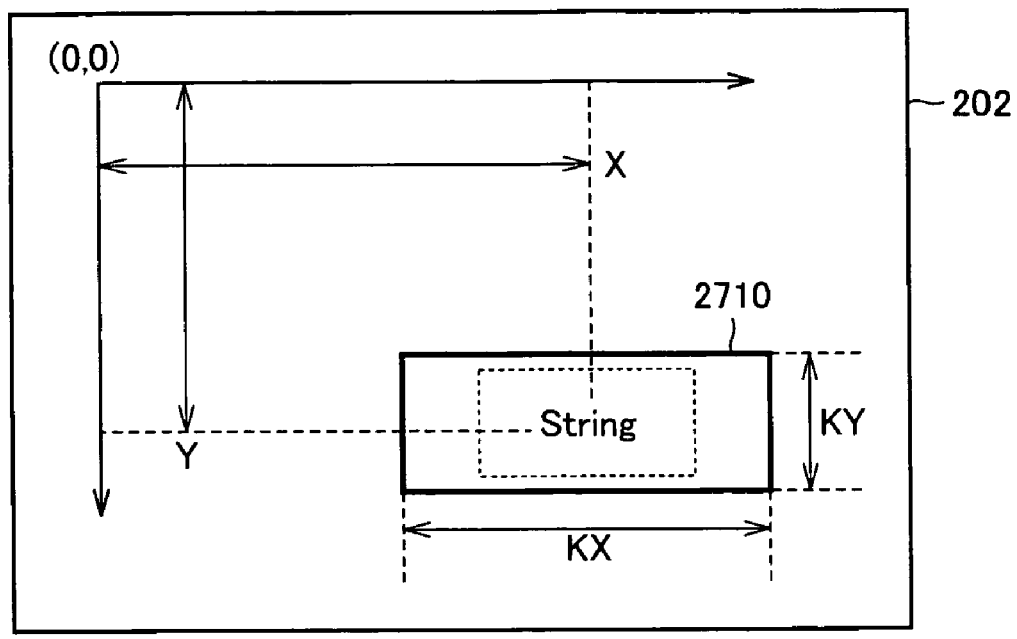
FIG. 27 is a view illustrating exemplary display of a box-shaped key in touch-panel LCD 202.

Referring to FIGS. 26 and 27, display of a box-shaped key will be described. FIG. 26 is a diagram illustrating exemplary storage of a template 2600 in flash ROM 216. FIG. 27 is a view illustrating exemplary display of a box-shaped key on touch panel LCD 202.

As shown in FIG. 26, flash ROM 216 includes data template 2600 for displaying a box-shaped key. Data template 2600 includes areas 2610-2640 for storing data. The coordinates (X, Y) of display position of the box-shaped key are stored in area 2610. These coordinates are those of barycenter of the key. Alternatively, the coordinates (X, Y) may be those of any predetermined one of four end points. The horizontal length (KX) of the key is stored in area 2620. The vertical length (KY) of the key is stored in area 2630. The character string displayed inside the key is stored in area 2640.

As shown in FIG. 27, a box-shaped key 2710 is displayed on touch panel LCD 202 based on data template 2600. Here, the origin coordinates (0, 0) in touch panel LCD 202 are common to the coordinates shown in FIG. 25. In addition, the relationship between the display and the coordinates in touch panel LCD 202 is also the same with that of FIG. 25.

Figure 28:
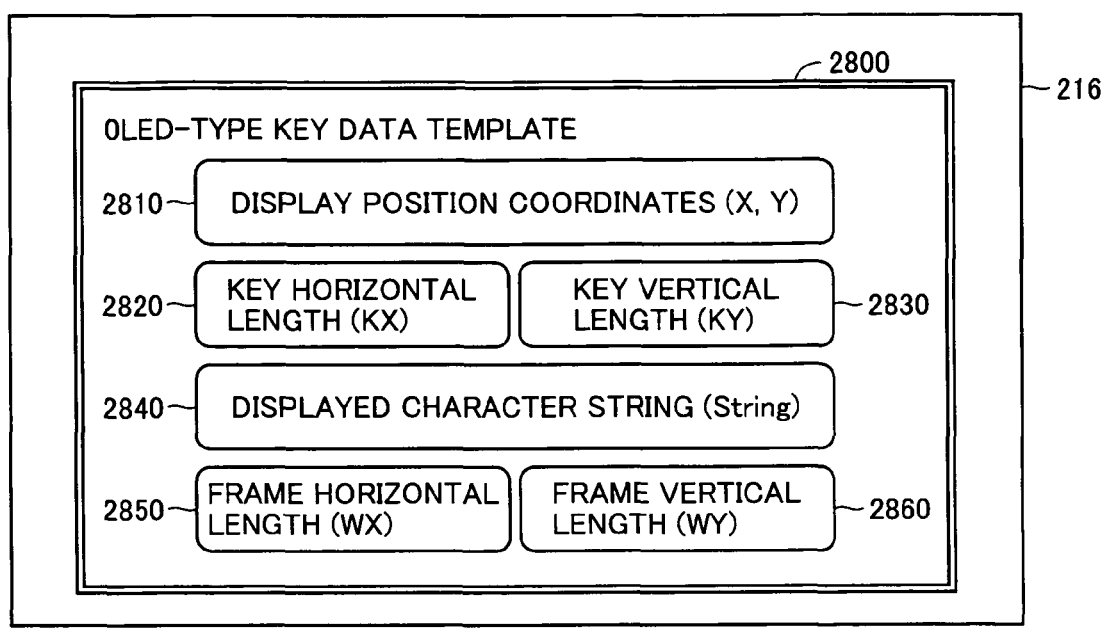
FIG. 28 is a diagram illustrating exemplary storage of a data template 2800 for displaying a 0LED-type key.
Figure 29:
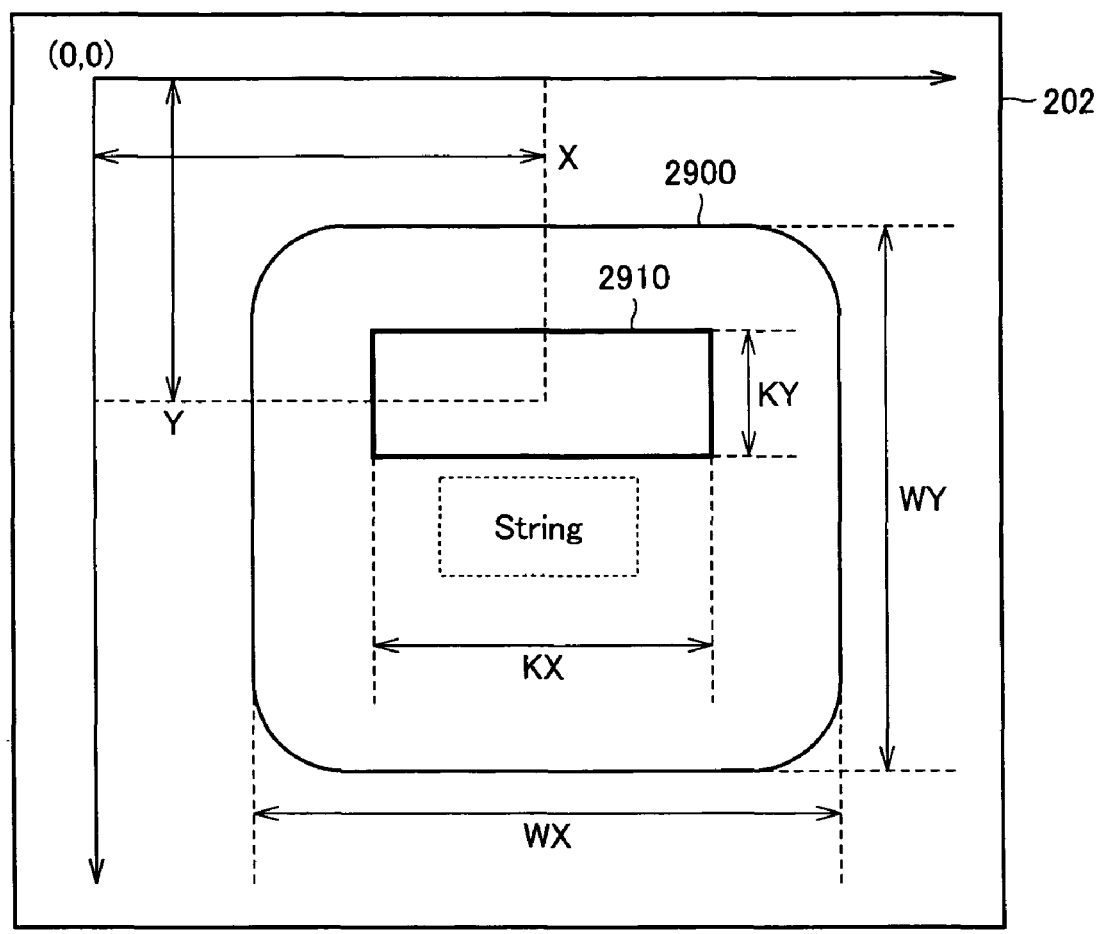
FIG. 29 is a view illustrating exemplary display of the 0LED-type key.

Referring to FIGS. 28 and 29, display of a 0LED-type key will be described. FIG. 28 is a diagram illustrating exemplary storage of a data template 2800 for displaying a 0LED-type key. FIG. 29 is a view illustrating exemplary display of the 0LED-type key.

As shown in FIG. 28, data template 2800 includes areas 2810-2860 for storing data. The coordinates (X, Y) of display position of the 0LED-type key are stored in area 2810. The horizontal length (KX) of the key is stored in area 2820. The vertical length (KY) of the key is stored in area 2830. The character string displayed inside the key is stored area 2840. The horizontal length (WX) of the frame enclosing the key is stored in area 2850. The vertical length (WY) of the frame is stored in area 2860.

Referring to FIG. 29, a 0LED-type key 2900 is displayed on touch panel LCD 202 based on data template 2800. A 0LED-type key 2910 is displayed on touch panel LCD 202 in a manner similar to the display of the box-shaped key as described above.

Figure 30:
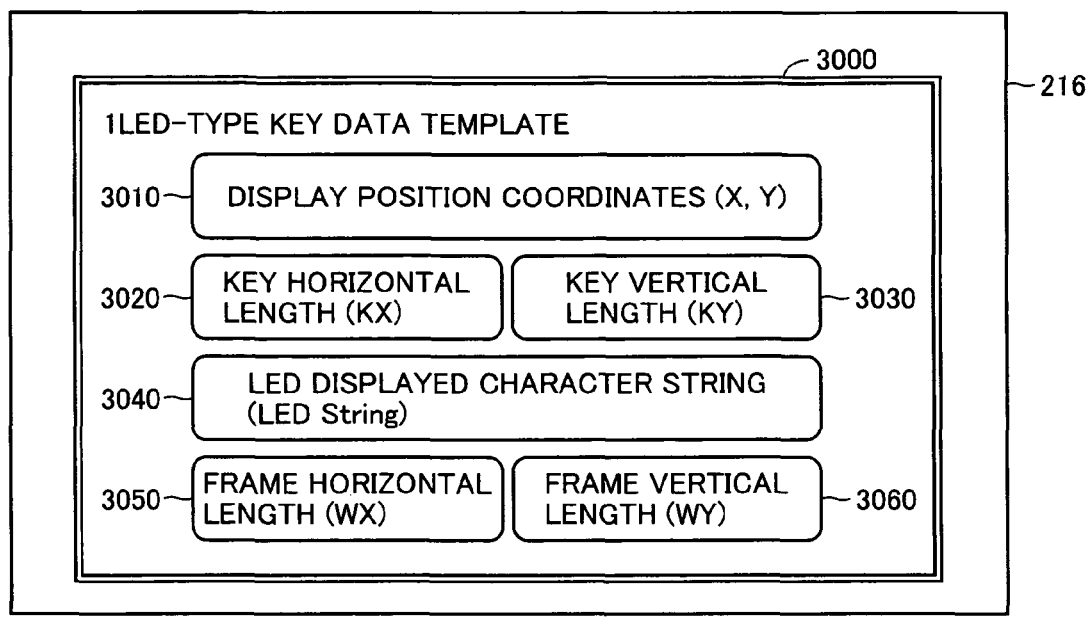
FIG. 30 is a diagram illustrating exemplary storage of data template 300 for displaying a 1LED-type key in flash ROM 216.
Figure 31:
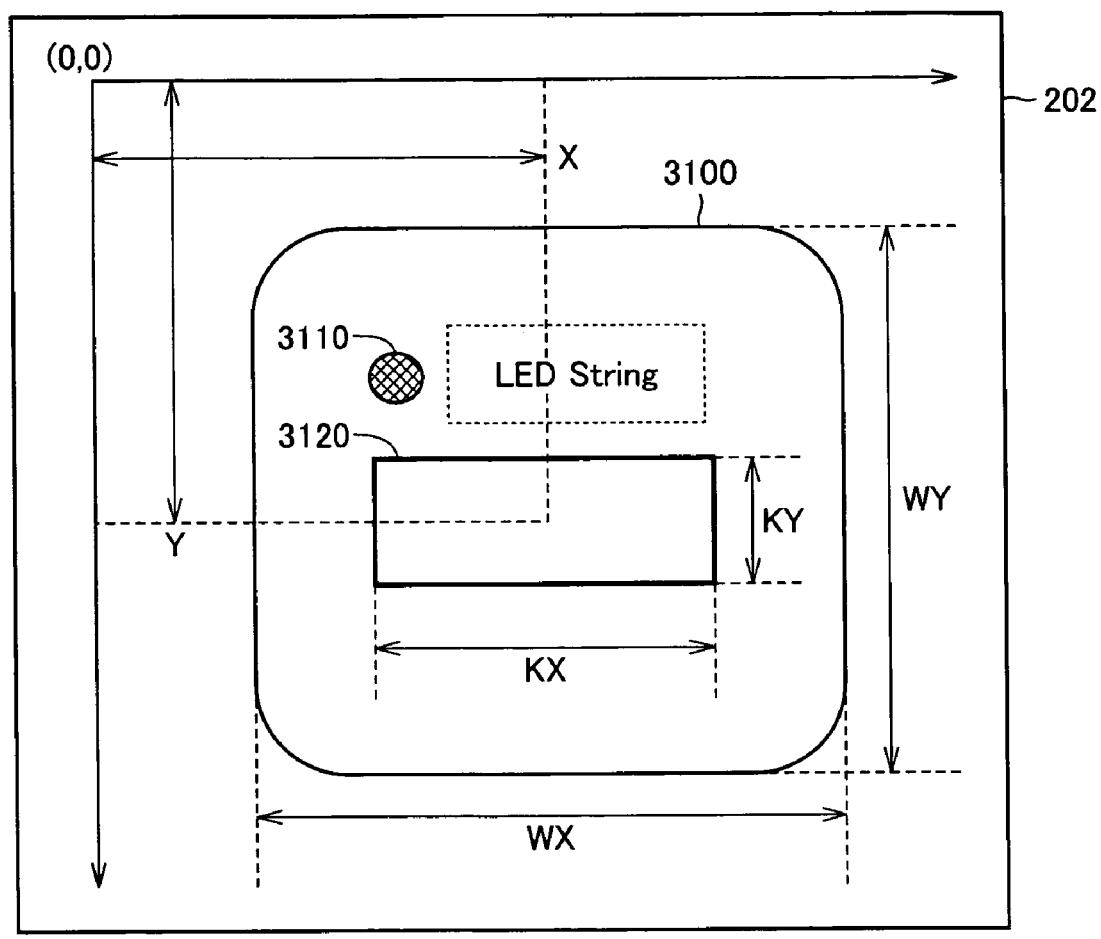
FIG. 31 is a view illustrating exemplary display of the 1LED-type key in touch-panel LCD 202

Referring to FIGS. 30 and 31, display of a 1LED-type key will be described. FIG. 30 is a diagram illustrating exemplary storage of a data template 3000 for displaying a 1LED-type key in flash ROM 216. FIG. 31 is a view illustrating exemplary display of the 1LED-type key on touch panel LCD 202.

As shown in FIG. 30, data template 3000 includes areas 3010-3060 for storing data. The position coordinates at which the 1LED-type key is displayed are stored in area 3010. The horizontal length (KX) of the key is stored in area 3020. The vertical length (KY) of the key is stored in area 3030. A character displayed in the vicinity of LED is stored in area 3040. The horizontal length (WX) of a frame enclosing LED and the key is stored in area 3050. The vertical length (WY) of the frame is stored in area 3060.

As shown in FIG. 31, a frame 3100 enclosing the 1LED-type key is displayed based on data template 3000. Frame 3100 includes an LED 3110 and a box-shaped key 3120. They are also displayed based on the data stored in data template 3000.

Figure 32:
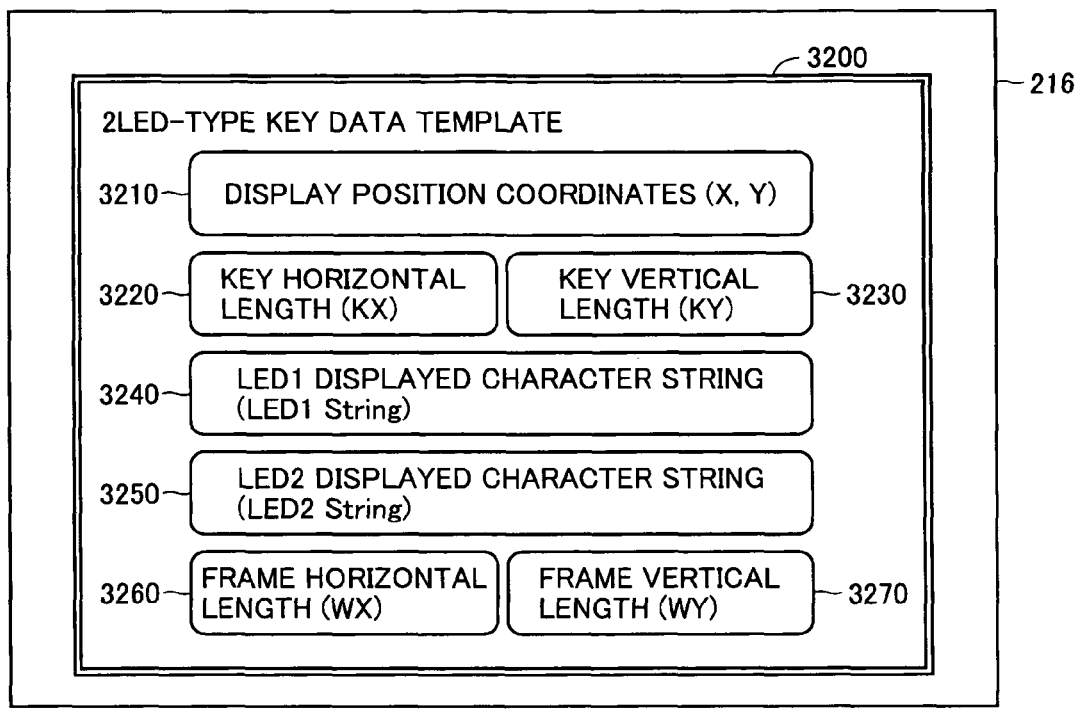
FIG. 32 is a diagram illustrating exemplary storage of a data template 2300 for displaying a 2LED-type key in flash ROM 216.
Figure 33:
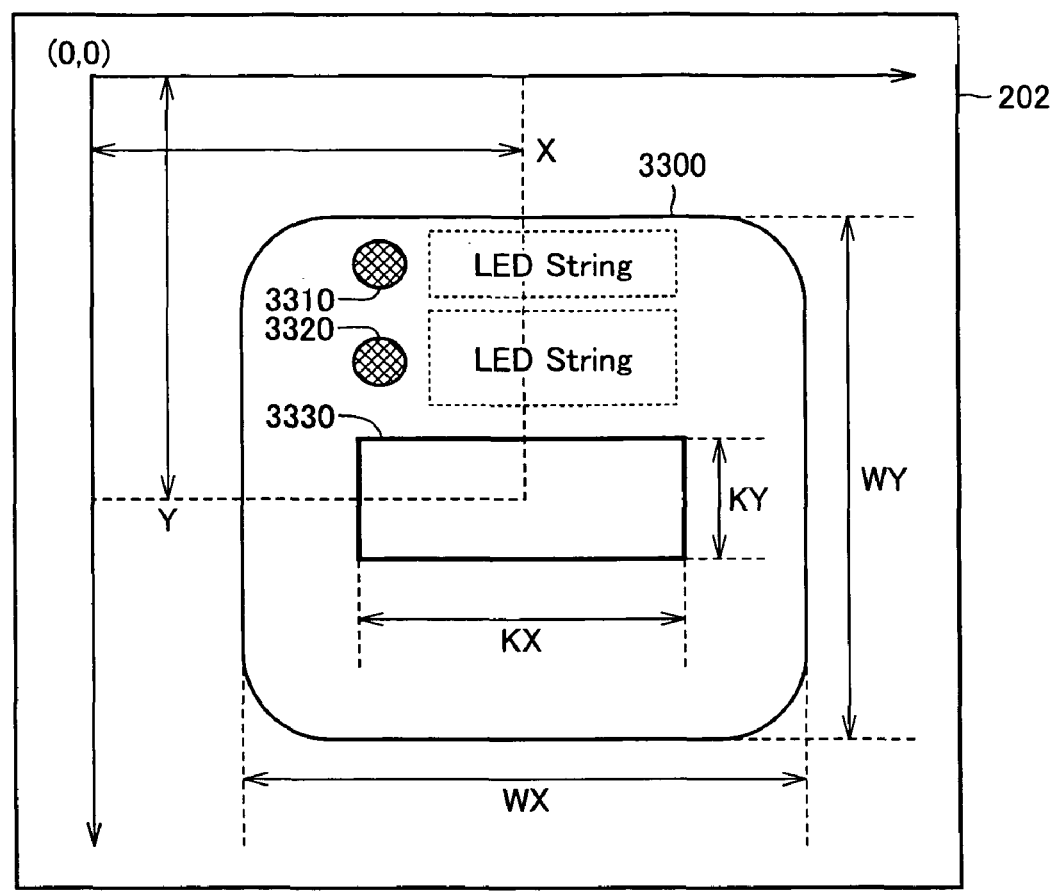
FIG. 33 is a view illustrating exemplary display of the 2LED-type key in touch-panel LCD 202.

Referring to FIGS. 32 and 33, display of a 2LED-type key will be described. FIG. 32 is a diagram illustrating exemplary storage of a data template 3200 for displaying a 2LED-type key in flash ROM 216. FIG. 33 is a view illustrating exemplary display of the key on touch panel LCD 202.

As shown in FIG. 32, data template 3200 includes areas 3210-3270 for storing data. The coordinates (X, Y) of display position of the 2LED-type key are stored in area 3210. The horizontal length (KX) of the key is stored in area 3220. The vertical length (KY) of the key is stored in area 3230. A character string displayed in the vicinity of an image displayed as a first LED is stored in area 3240. A character string displayed in the vicinity of an image displayed as a second LED is stored in area 3250. The horizontal length (WX) of a frame enclosing the display as these LEDs and a box-shaped key is stored in area 3260. The vertical length (WY) of the frame is stored in area 3270.

As shown in FIG. 33, a frame 3300 is displayed on touch panel LCD 202 based on the data stored in data template 3200. Frame 3300 includes a-first LED 3310, a second LED 3320, and a box-shaped key 3330. A character string as prepared beforehand is displayed in the vicinity of first LED 3310. A character string as prepared beforehand is also displayed in the vicinity of second LED 3320.

Figure 34:
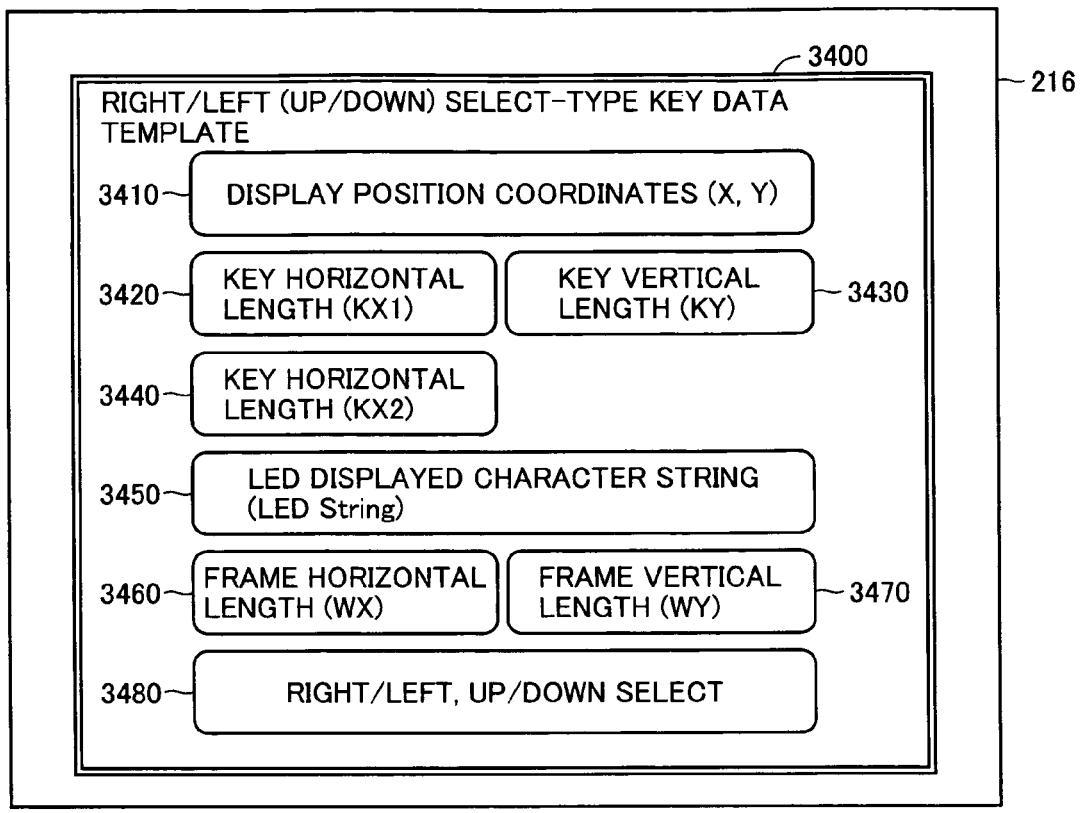
FIG. 34 is a diagram illustrating exemplary storage of a data template 3400 in flash ROM 216.
Figure 35:
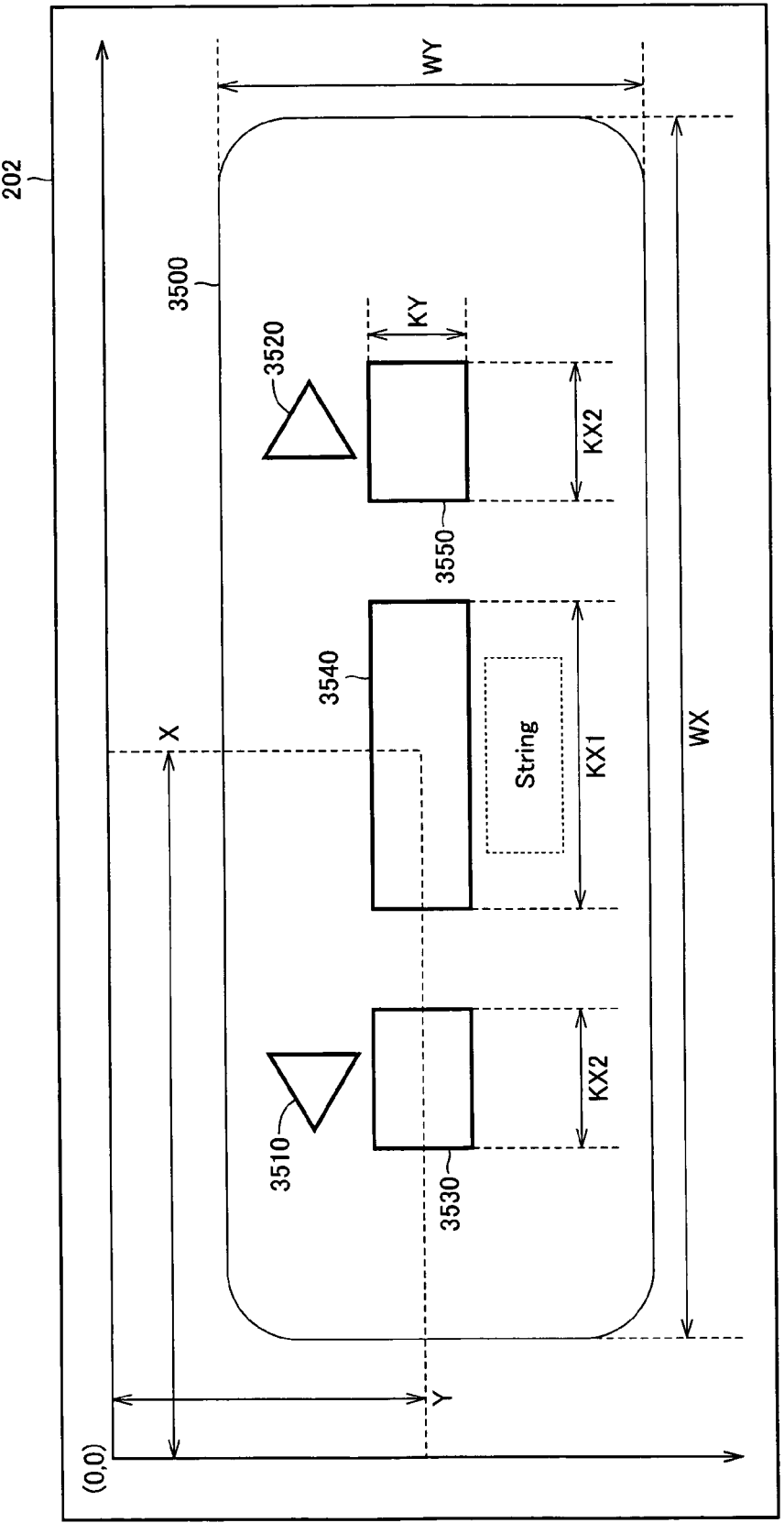
FIG. 35 is a view illustrating exemplary display of each key in touch panel LCD 202.

Referring to FIGS. 34 and 35, display of a right/left select-type key will be described. Here, the right/left select-type key is a key for realizing switching, of display of items to be selected based on an input of right/left selection instructions. FIG. 34 is a diagram illustrating exemplary storage of a data template 3400 in flash ROM 216. Data template 3400 is used to display the right/left select-type key. FIG. 35 is a view illustrating exemplary display of these keys in touch panel LCD 202.

As shown in FIG. 34, data template 3400 includes areas 3410-3480 for storing data. The coordinates (X, Y) for displaying a box-shaped key are stored in area 3410. The horizontal length (KX1) of a box-shaped key displayed in the middle is stored in area 3420. The vertical length (KY) of a box-shaped key is stored in area 3430. The horizontal lengths (KX2) of other box-shaped keys displayed on the right and the left of the key are stored in area 3440. A character string displayed in the vicinity of the box-shaped key is stored in area 3450. The horizontal length (WX) of a frame for enclosing these keys is stored in area 3460. The vertical length (WY) of the frame is stored in area 3470.

Data representing the types of the displayed keys (specifically, the right/left select-type or the up/down select-type) is stored in area 3480. The direction of the displayed key is switched between right/left and up/down according to the setting of the data. In this way, the common data is used to set the manner of selection to either of right/left and up/down.

As shown in FIG. 35, a frame 3500 is displayed on touch panel LCD 202. Frame 3500 includes a key 3510 for receiving an input of an instruction of a leftward selection, a key 3520 for receiving an input of an instruction of a rightward selection, and box-shaped keys 3530-3550. Box-shaped key 3540 is displayed based on the data stored in areas 3420 and 3430. Other box-shaped keys 3530, 3550 are displayed based on the data stored in areas 3430 and 3440.

It is noted that when the data stored in area 3470 is set to select the up/down keys, keys 3510, 3520 are displayed, for example, such that images facing upward and downward (for example, triangles or arrows) are displayed in place of images facing rightward and leftward.

Figure 36:
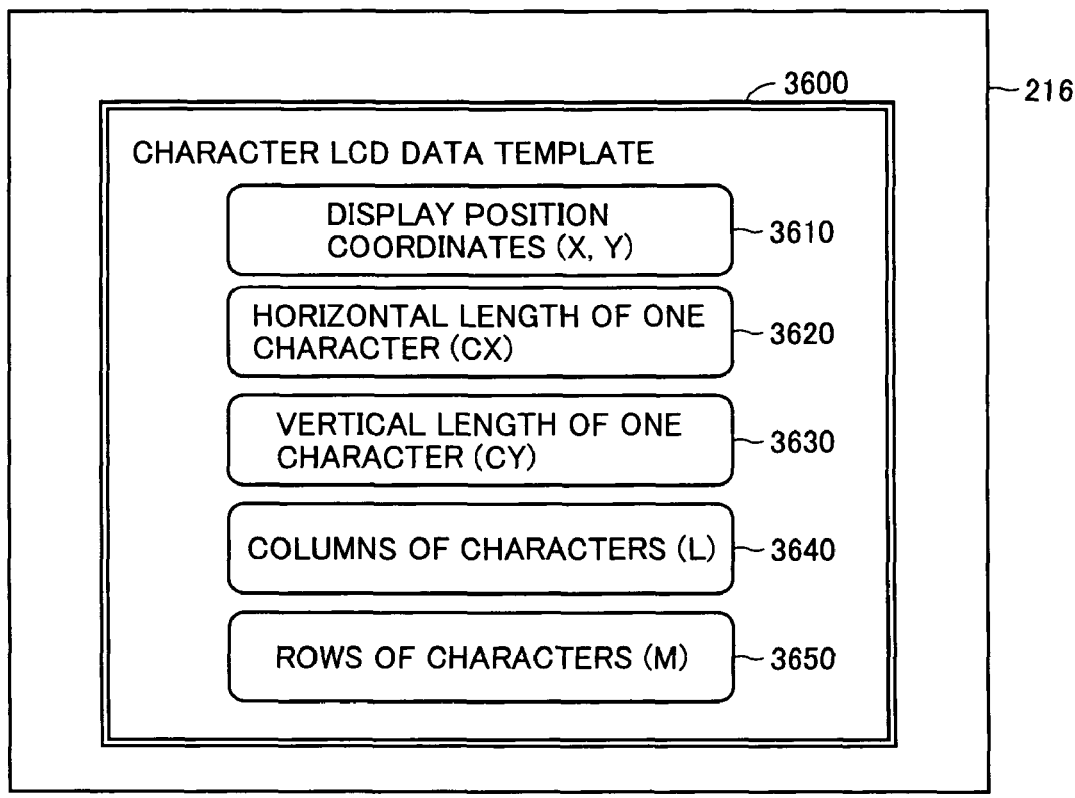
FIG. 36 is a diagram illustrating exemplary storage of a data template 3600 for displaying a character in flash ROM 216.
Figure 37:
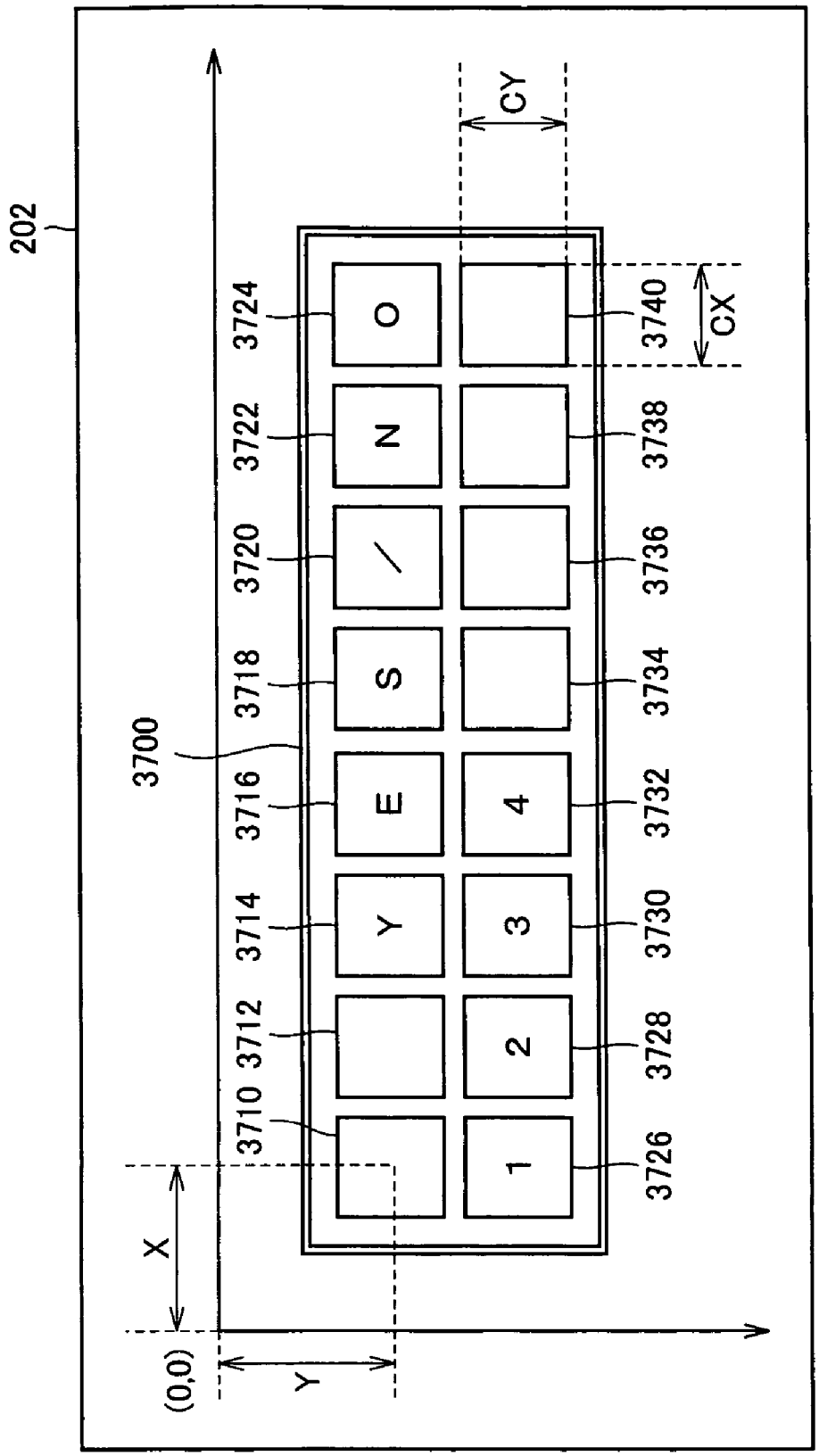
FIG. 37 is a view illustrating exemplary display of a character in touch panel LCD 202.

Referring to FIGS. 36 and 37, display of characters will be described. FIG. 36 is a diagram illustrating exemplary storage of a data template 3600 for displaying a character in flash ROM 216. FIG. 37 is a view illustrating exemplary display of a character in touch panel LCD 202.

As shown in FIG. 36, data template 3600 includes areas 3610-3650 for storing data for realizing display of characters. The coordinates (X, Y) of a predetermined position for displaying the first character are stored in area 3610. Here, placed in this position is, for example, a character displayed in an area at the upper-left corner. The horizontal length (CX) of one character is stored in area 3620. The vertical length (CY) of the character is stored in area 3630. The number (L) of columns of displayed characters is stored in area 3640. The number (M) of rows of characters is stored in area 3650.

As shown in FIG. 37, an area 3700 for displaying a character string is displayed on touch panel LCD 202 based on the data stored in data template 3600. Area 3700 includes subareas in each of which, for example, each of characters in 2 rows×8 columns can be displayed. Area 3710 is defined based on the data stored in area 3610. In the example shown in FIG. 37, no character is displayed in areas 3710, 3712. In this case, no character data is input in memory areas (for example, areas allocated in video RAM 206) corresponding to areas 3710, 3712. A character is displayed in each of areas 3714-3732 based on the data written in the memory areas.

Figure 38:
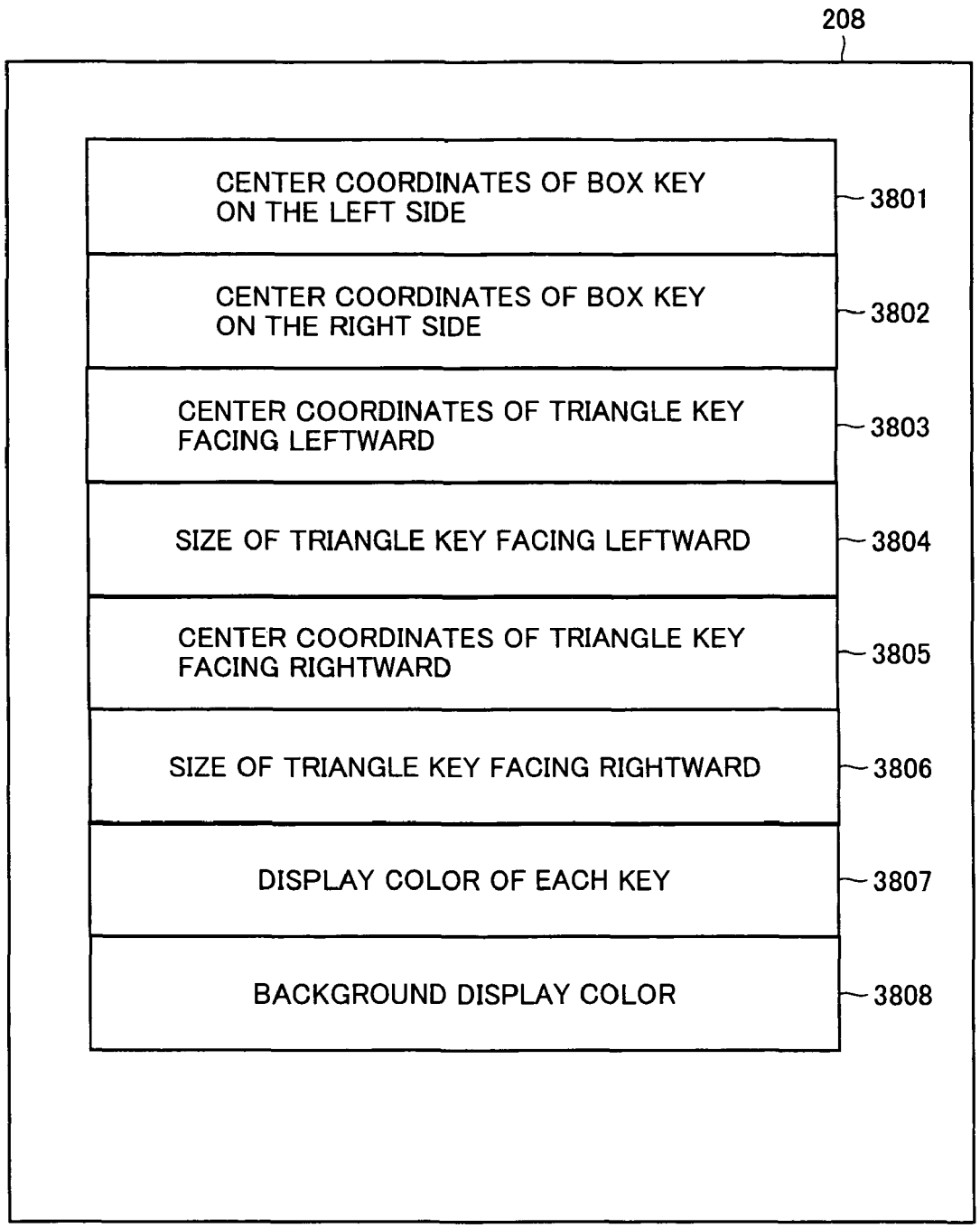

Now, referring to FIGS. 38 and 39, the data structure of image forming apparatus 100 will be described in which a panel is decided. FIGS. 38 and 39 are diagrams each illustrating exemplary data storage in control RAM 208.

As shown in FIG. 38, control RAM 208 includes areas 3801-3808 for storing data. The data representing a positional relationship of each key shown in FIG. 35 is stored in each area.

Data defining the center coordinates of box-shaped key 3530 on the left side is stored in area 3801. Data defining the center coordinates of box-shaped key 3550 on the right side is stored in area 3802. Data defining the center coordinates of triangle-shaped key 3510 facing leftward is stored in area 3803. Data defining the size of triangle-shaped key 3510 is stored in area 3804. Data defining the center coordinates of triangle-shaped key 3520 facing rightward is stored in area 3805. Data defining the size of triangle-shaped key 3520 is stored in area 3806. Data defining the display color of each key is stored in area 3807 in association with each key. Data defining the display color of frame 3500, that is the background color of each key is stored in area 3808. Data defining the positions based on which other keys, characters and the like are displayed is similarly stored in control RAM 208.

Data for displaying keys or characters on touch panel LCD 202 based on each template and each data as described above is stored in an executable format in control RAM 208. It is noted that the manner of storing data is not limited to that shown in FIG. 38.

As shown in FIG. 39, control RAM 208 further includes areas 3901-3903 for storing data. The areas are associated with each other. When a particular type of a panel is decided, and a key displayed on each window and a function associated with the key are decided, data as shown in FIG. 39 is generated. The data is referred to by panel CPU 210 when each window is displayed on touch panel LCD 202. The data structure shown in FIG. 39 represents data in which a panel of type A is selected.

More specifically, ID for identifying each window on the panel of type A is stored in area 3901. Data for specifying a key included in the window is stored in area 3902. Data defining the function of the image forming apparatus in association with the key is stored in area 3903.

For example, the box-shaped key with a key number "104" displayed on the first window is associated with a function of "magnification setting". This key is also used in the second window and is associated with a function of "single-sided copy". In this way, data defining the same key is associated with each function independently in different windows, so that the amount of data defining keys is less likely to increase as compared with the case where separate keys are defined for each window.

It is noted that, in place of the manner of storage shown in FIG. 39, data defining a key for each window can be associated with each function. In this way, data defining the same key is not referred to from each window, so that any inconvenience in the control of display of the window can be prevented.

Figure 40:
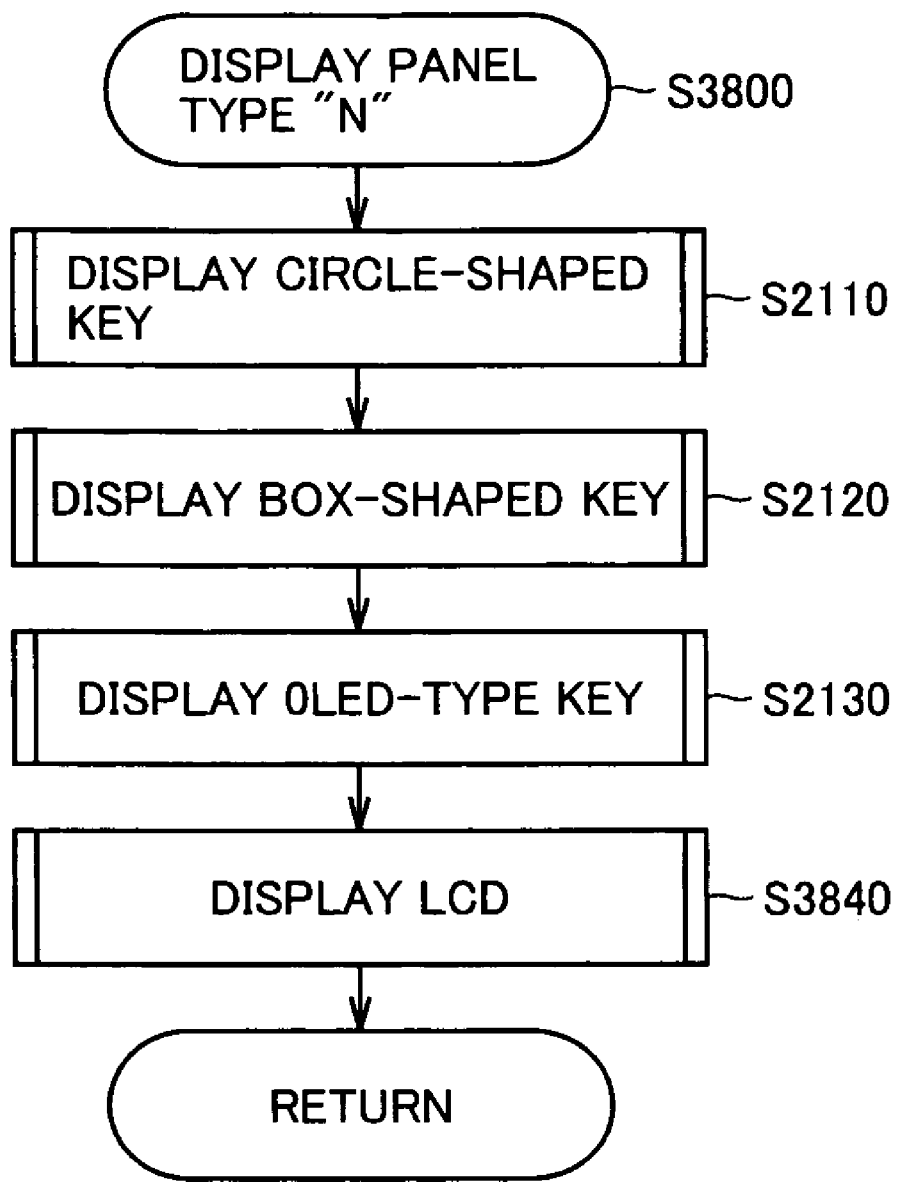
FIG. 40 is a flowchart illustrating a procedure of processing executed by panel CPU 210 for displaying a panel type N.

Referring to FIG. 40, the control structure of image forming apparatus 100 will be further described. FIG. 40 is a flowchart illustrating the procedure of the processing executed by panel CPU 210 for displaying the panel type N.

At step S2110, panel CPU 210 executes circle-shaped key display. At step S2120, panel CPU 210 executes box-shaped key display. At step S2130, panel CPU 210 executes 0LED-type key display. At step S3840, panel CPU 210 executes LCD display.

It is noted that the processing shown at steps S2110-S2130 is the same with the processing shown in FIG. 21, and the detailed description thereof will not be repeated.

Here, for the processing at step S3840, it is necessary to define beforehand how many areas are allocated in touch panel LCD 202. This definition is realized, for example, based on a data template for allocating areas.

Figure 41:
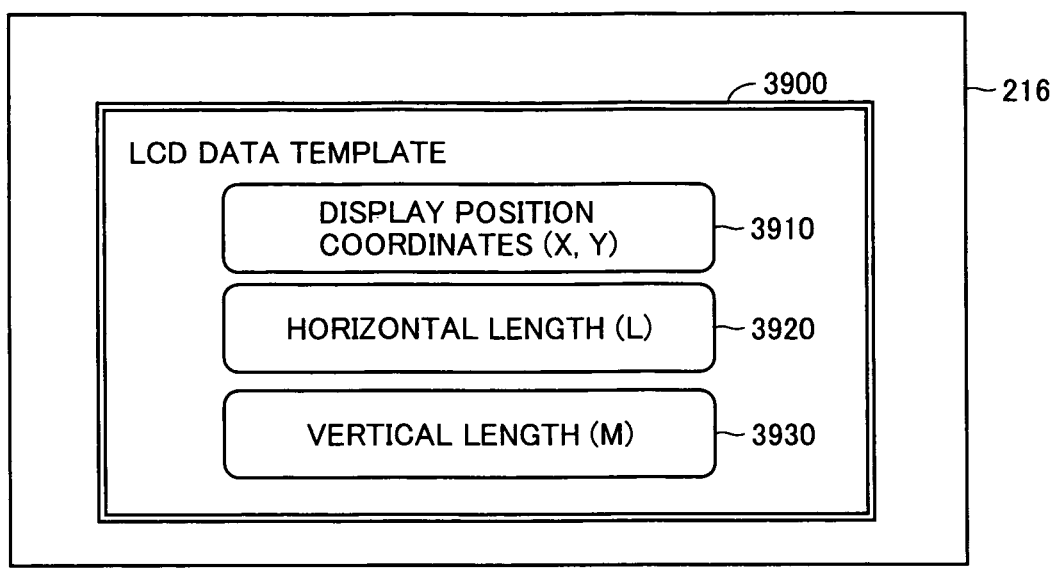
FIG. 41 is a diagram illustrating exemplary storage of a data template 3900 for displaying LCD in flash ROM 216.
Figure 42:
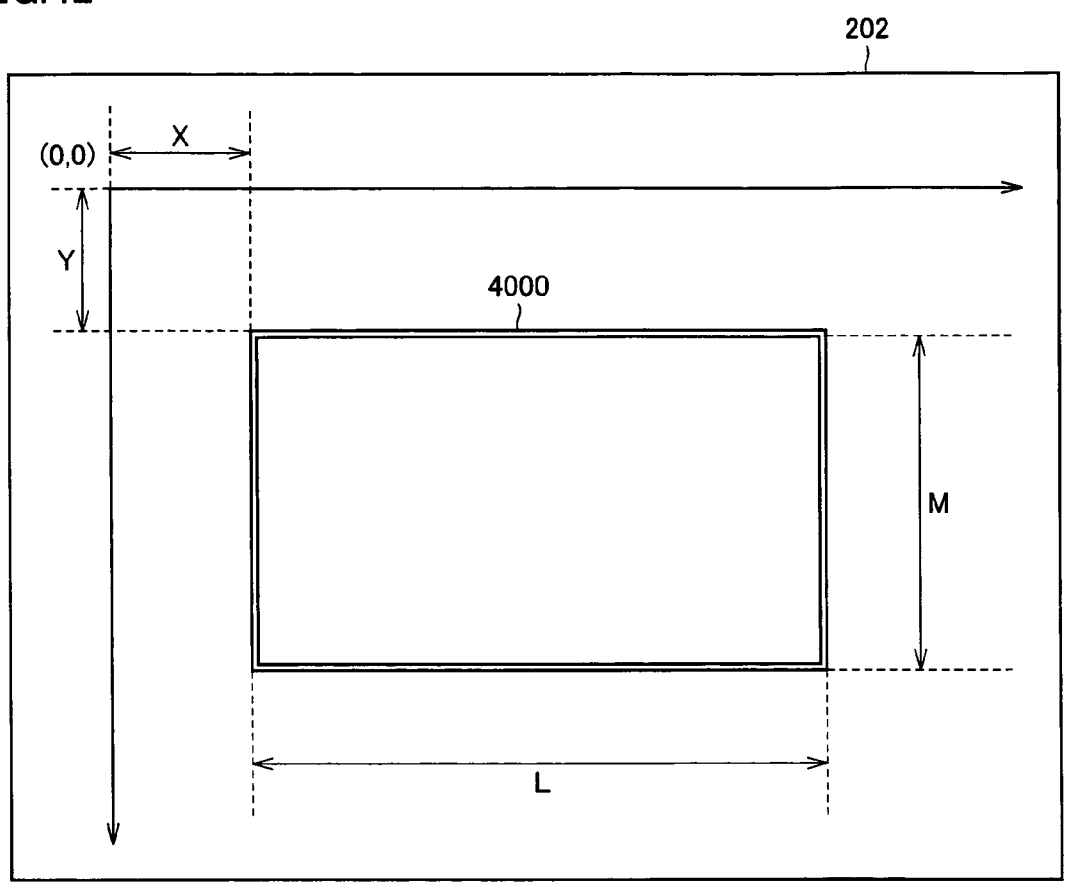
FIG. 42 is a view illustrating exemplary display of a large LCD 4000 in touch panel LCD 202.

Then, referring to FIGS. 41 and 42, display of a large LCD in touch panel LCD 202 will be described. FIG. 41 is a diagram illustrating exemplary storage of a data template 3900 for displaying LCD in flash ROM 216. FIG. 42 is a view illustrating exemplary display of a large LCD 4000 in touch panel LCD 202.

As shown in FIG. 41, data template 3900 includes an area for storing the position coordinates (X, Y) at which a large LCD is displayed, an area 3920 for storing the horizontal length (L) of the LCD, and an area 3930 for storing the vertical length (M).

As shown in FIG. 42, large LCD 4000 is displayed on touch panel LCD 202 based on the data stored in data template 3900. The relationship between the position in FIG. 42 and the data shown in FIG. 30 is the same as that of the display of each key as described above, and the description thereof will not be repeated here.

Figure 43:
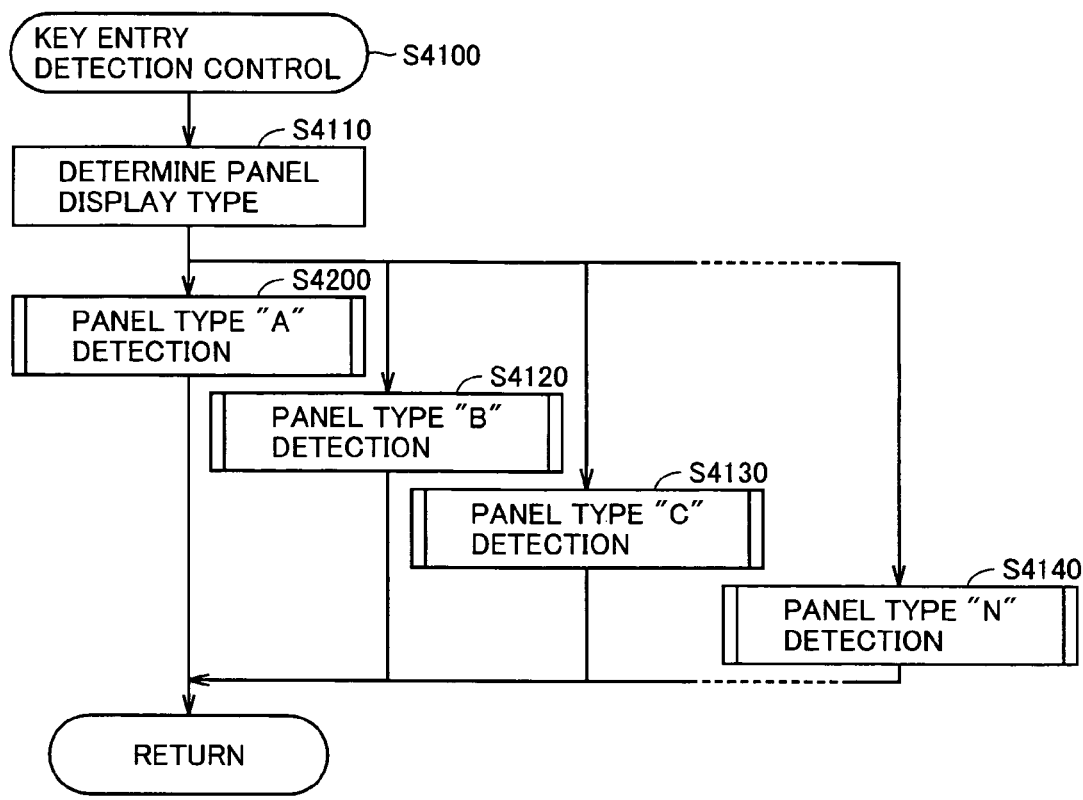
FIG. 43 is a flowchart illustrating a procedure of processing executed by panel CPU 210 for detecting a key entry.
Figure 44:
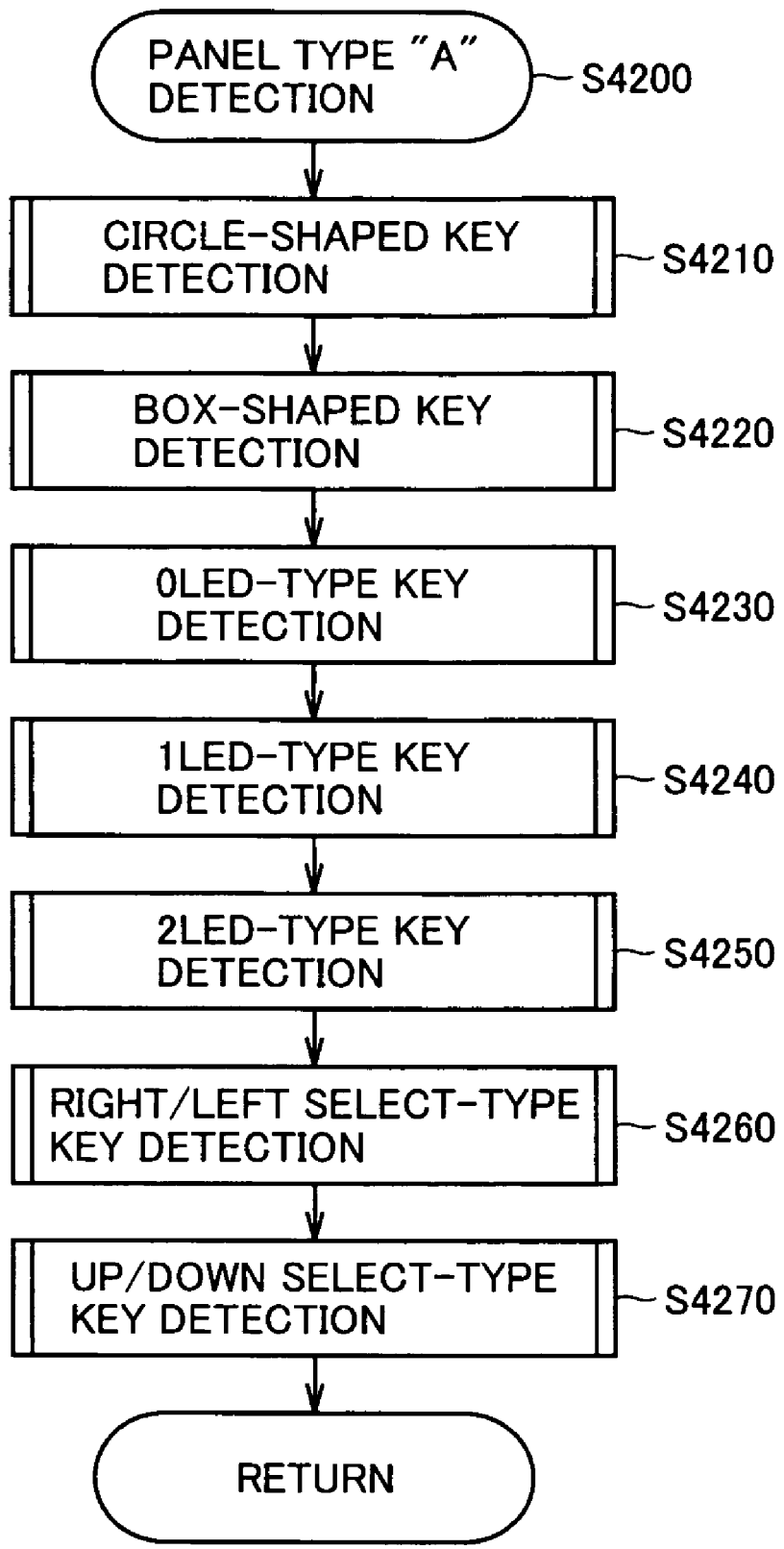
FIG. 44 is a flowchart illustrating a procedure of processing performed by panel CPU 210.
Figure 45:
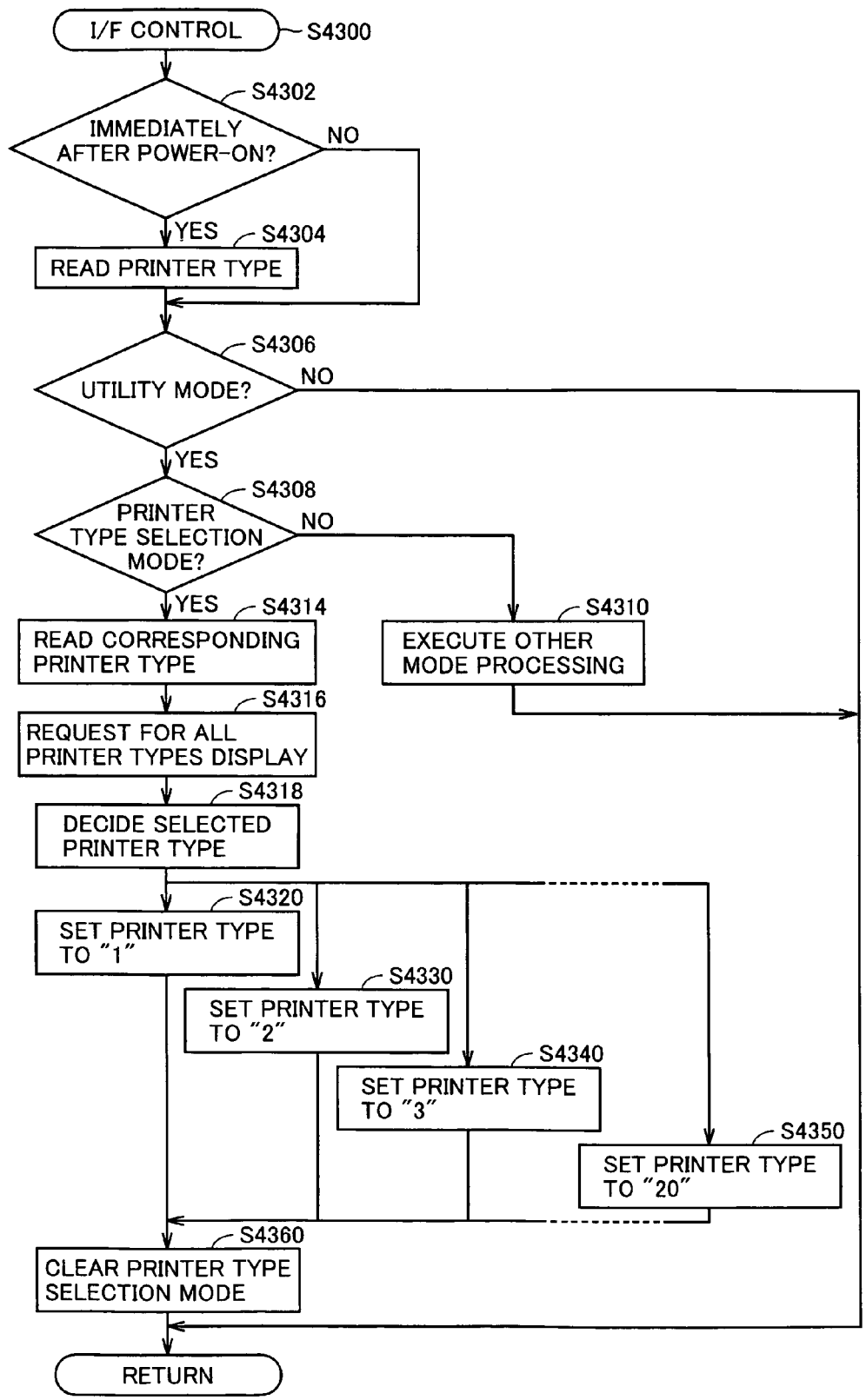
FIG. 45 is a flowchart illustrating a procedure of processing executed by panel CPU 210 for I/F control.

Referring to FIGS. 43-45, the control structure of image forming apparatus 100 will be further described. FIG. 43 is a flowchart illustrating the procedure of the processing executed by panel CPU 210 for detecting a key entry in the panel control basic processing (S1300). FIG. 44 is a flowchart illustrating the procedure of the processing performed by panel CPU 210 for executing the processing of detecting panel type A. FIG. 45 is a flowchart illustrating the procedure of the processing executed by panel CPU 210 for I/F control in the panel control basic processing.

As shown in FIG. 43, panel CPU 210 determines a presently-set panel type based on the data stored in nonvolatile RAM 212. According to the result of this determination, the process proceeds to steps S4200, S4120, S4130, S4140, and the like.

At step S4200, panel CPU 210 executes the processing of detecting panel type A. At step S4120, panel CPU 210 executes the processing of detecting panel type B. At step S4130, panel CPU 210 executes the processing of detecting panel type C. At step S4140, panel CPU 210 executes the processing of detecting panel type N.

As shown in FIG. 44, at step S4210, panel CPU 210 executes the circle-shaped key detection processing. At step S4220, panel CPU 210 executes the box-shaped key detection processing. At step S4230, panel CPU 210 executes the 0LED-type key detection processing. At step S4240, panel CPU 210 executes the 1LED-type key detection processing. At step S4250, panel CPU 210 executes the 2LED-type key detection processing. At step S4260, panel CPU 210 executes the right/left select-type key detection processing. At step S4270, panel CPU 210 executes the up/down select-type key detection processing.

As shown in FIG. 45, at step S4302, panel CPU 210 determines whether or not image forming apparatus 100 is in a state immediately after power-on. If in the state immediately after power-on (YES at step S4302), the process proceeds to step S4304. If not (NO at step S4302), the process proceeds to step S4306.

At step S4304, panel CPU 210 reads a printer type from the data stored in nonvolatile RAM 212. At step S4306, panel CPU 210 determines whether or not the state of image forming apparatus 100 is a utility mode. If the state is a utility mode (YES at S4306), the process proceeds to step S4308. If not (NO at S4306), the process ends and returns to the main processing.

At step S4308, panel CPU 210 determines whether or not the state of image forming apparatus 100 is a printer-type selection mode. If the state is a printer-type selection mode (YES at step S4308), the process proceeds to step S4314. If not (NO at step S4308), the process proceeds to step S4311.

At step S4310, panel CPU 210 executes the processing of other predetermined modes. At step S4314, panel CPU 210 reads data of a corresponding printer type from flash ROM 216. At step S4316, panel CPU 210 receives an input of a request for displaying all printer types. Panel CPU 210 outputs data for displaying all the types to LCD controller 204. Touch panel LCD 202 displays each type based on the output.

At step S4318, panel CPU 210 decides a printer type selected by the user based on an input through touch panel LCD 202 and LCD controller 204. The process proceeds to any of steps S4320-4350 according to the decided printer type.

At step S4320, panel CPU 210 sets the printer type to "1" based on the data stored in flash ROM 216. At step S4330, panel CPU 210 sets the printer type to "2" based on the data stored in flash ROM 216. At step S4340, panel CPU 210 sets the printer type to "3" based on the data stored in flash ROM 216. Similarly, at step S4350, panel CPU 210 sets the printer type to "20" based on the data stored in flash ROM 216.

At step S4360, panel CPU 210 clears the printer-type selection mode. The process thereafter returns to the main processing.

Figure 46:
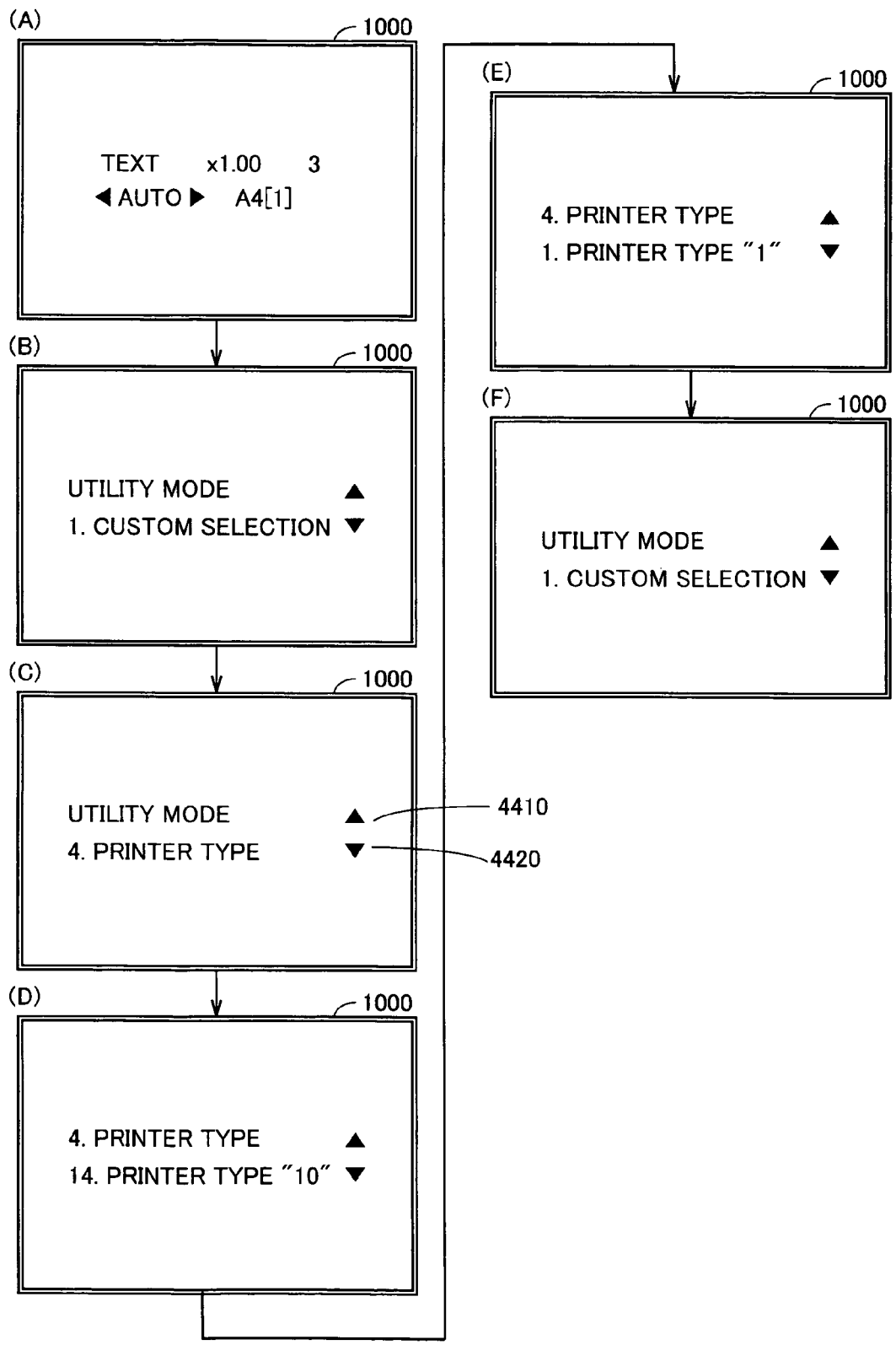
FIG. 46 is a view illustrating a state of changed display in an area 1000.

Referring to FIG. 46, exemplary display in touch panel LCD 202 will be described. FIG. 46 is a view illustrating transitions of windows in area 1000. Area 1000 has its display switched based on a press on utility button 1050 (FIG. 10).

Referring to window (A), touch panel LCD 202 displays in area 1000 a copy mode (text), a magnification ("1.00"), an operation mode ("auto"), and a paper size ("A4") as an initial window. Referring to window (B), touch panel LCD 202 displays in area 1000 the initial window of the utility mode. This display is performed based on a press on utility button 1050. When the user presses up/down selection buttons 4410, 4420 to change the submenu in the utility mode, touch panel LCD 202 displays, for example, "4. printer type" as a submenu (window (C)).

In this state, the user presses start button 1070 (FIG. 10), so that the selection of the displayed submenu is confirmed and the detail menu of the submenu is displayed (window (D)). In this state, the user presses up/down selection button 1060 to switch the display of the detail menu, so that, as shown in window (E), "1. printer type 1" is displayed as a detail menu. The user thereafter confirms the selection by pressing start button 1070, so that the data of printer type 1 is stored in an area allocated beforehand in nonvolatile RAM 216, and the display in area 1000 returns to the initial window of the submenu (window (F)).

Figure 48:
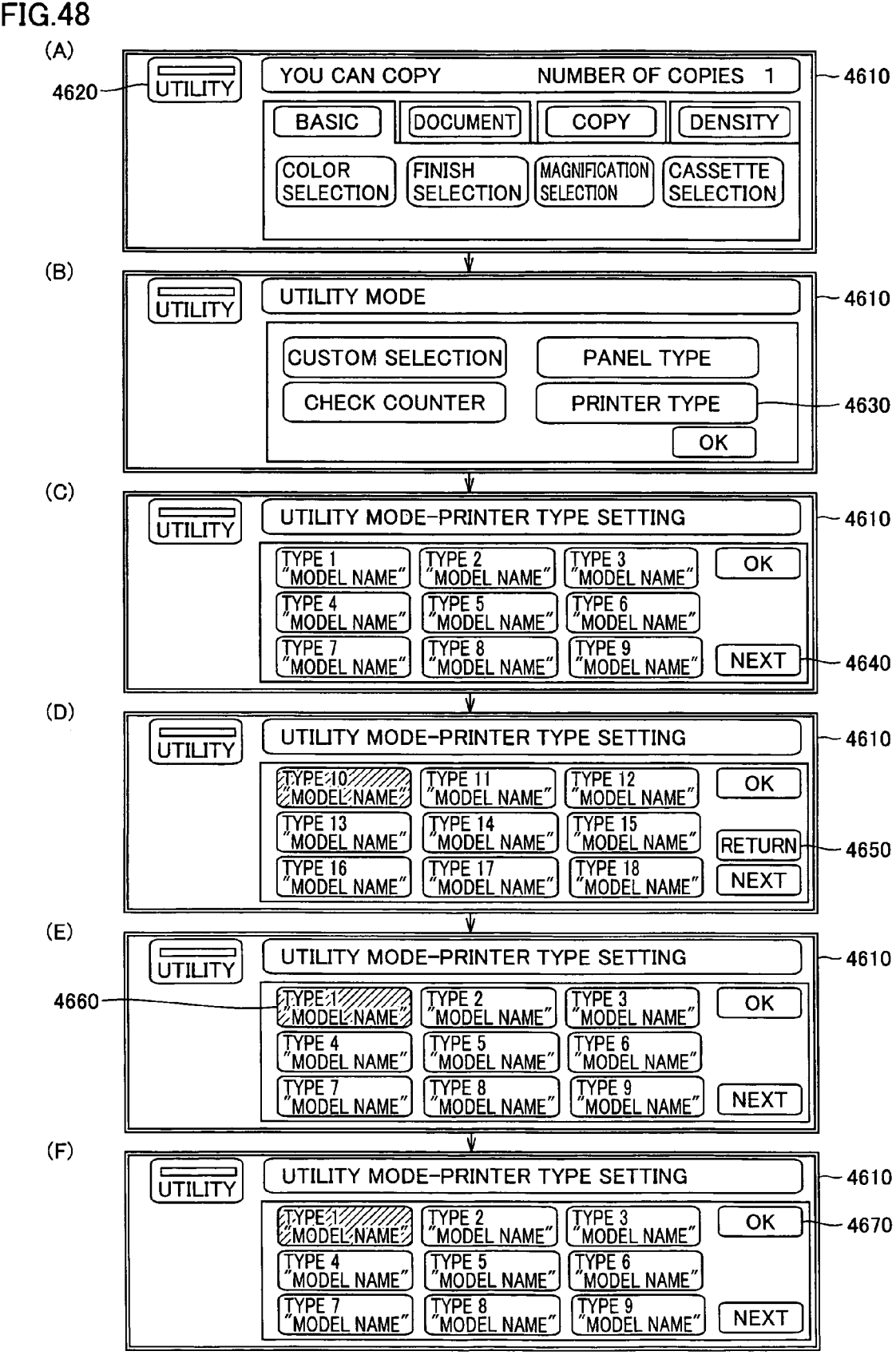
FIG. 48 is a view illustrating transition of windows appearing on touch-panel LCD 202.

Referring to FIGS. 47 and 48, another exemplary selection of a printer type in accordance with another aspect will be described. FIG. 47 is a diagram illustrating exemplary data storage in flash ROM 216. The data includes a printer type and a model name corresponding to that type. FIG. 48 is a view illustrating transitions of windows displayed on touch panel LCD 202.

As shown in FIG. 47, flash ROM 216 includes an area 4510 and an area 4520 for storing data. Data for specifying a printer type is stored in area 4510. The model name corresponding to each printer is stored in area 4520. When the processing of selecting a printer type is executed, the data stored in area 4510 is used. As described later, the data for facilitating recognition of a printer by the user is stored in area 4520. The model name is displayed on touch panel LCD 202 based on this data, so that the model of a printer can be recognized easily.

As shown in FIG. 48, touch panel LCD 202 displays window (A) as the initial window in an area 4610. Area 4610 includes a utility button 4620. When utility button 4620 is pressed, as described below, touch panel LCD 202 displays a window of a utility mode to allow reception of an input of an instruction to set a printer type. The input of the instruction is recognized by a detection function of touch panel LCD 202.

Specifically, when the user presses utility button 4620, the window in area 4610 is switched to window (B). This window corresponds to the initial window of the utility mode. The utility mode includes as its submenus, for example, "custom select", "panel type", "counter check", and "printer type".

When the user presses an area 4630 indicating "printer type" to set a printer type, the display in area 4610 is switched to window (C). More specifically, the printer type and the model name that are prepared beforehand to set a printer type are each displayed. Here, in the example shown in window (C), 9 (=3×3) printer types are displayed in one window, although more types can be displayed. Specifically, the area "4640" indicating "next" is pressed to switch to the next window, and the printer types that cannot be displayed fully in one window are further displayed. For example, when the user presses area 4640 to switch the window, the display in area 4610 is switched to window (D). By switching the display in this way, printer types exceeding the number of printer types that can be displayed in one window are displayed.

When the user presses an area 4650 for resetting the display of the window, the display in area 4610 is switched to window (D). Here, if the user presses area 4640 for selecting "type 1" as a printer type, the display in area 4610 is switched to window (F) representing that a printer type 1 is selected. Thereafter, the user presses an area 4670 indicating "OK", so that the selection of printer type 1 is confirmed.

Figure 49:
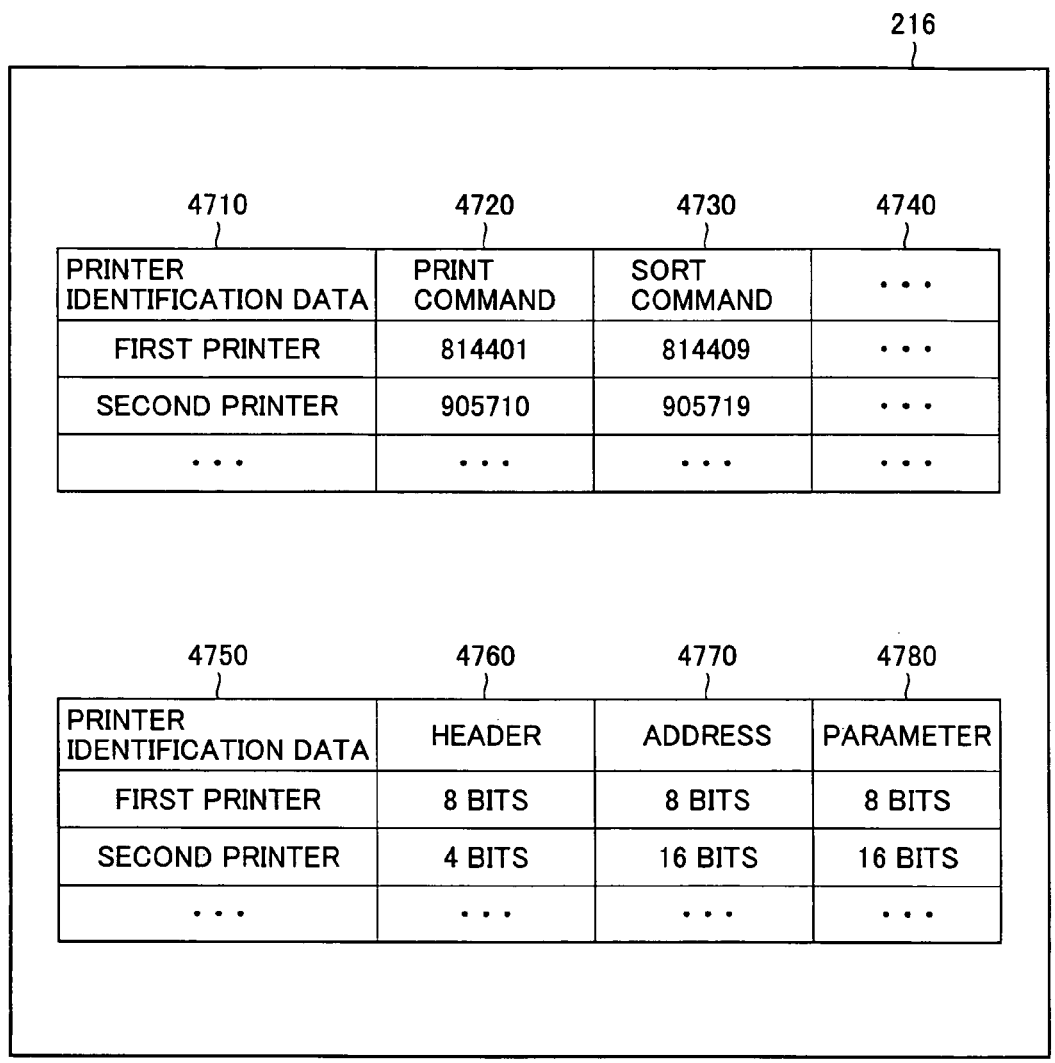
FIG. 49 is a diagram illustrating exemplary storage of command data prepared beforehand for each printer in flash ROM 216.

Next, referring to FIGS. 49-55, the conversion of the interface between panel control and printer control will be described. FIG. 49 is a diagram illustrating exemplary storage of command data prepared beforehand for each printer in flash ROM 216. Flash ROM 216 includes areas 4710-4740 for storing command data. Flash ROM 216 further includes areas 4750-4780 for storing data about a data length for each of different printers.

The command data is an internal signal that is used to realize image forming apparatus 100. Instructions of a particular operation, notifications of particular information, and other communications are effected by exchanging that signal.

Specifically, data for identifying a printer is stored in area 4710. Data representing a print command in the printer is stored in area 4720. Data representing a sort command in the printer is stored in area 4730. Data representing other commands in each printer is stored in area 4740. The configuration of the command data is not limited to that shown in FIG. 49. Any other command may be used.

Furthermore, data for identifying a printer is stored in area 4750. A header for use in communications by the printer is stored in area 4760. The size of an address for use in the communications is stored in area 4770. The size of a parameter is stored in area 4780. Since flash ROM 216 has the above data beforehand for each printer, even if a type of a printer in use is changed during an operation, it is possible to communicate with a printer of a changed type by changing a command based on the structure as described above.

Figure 50:
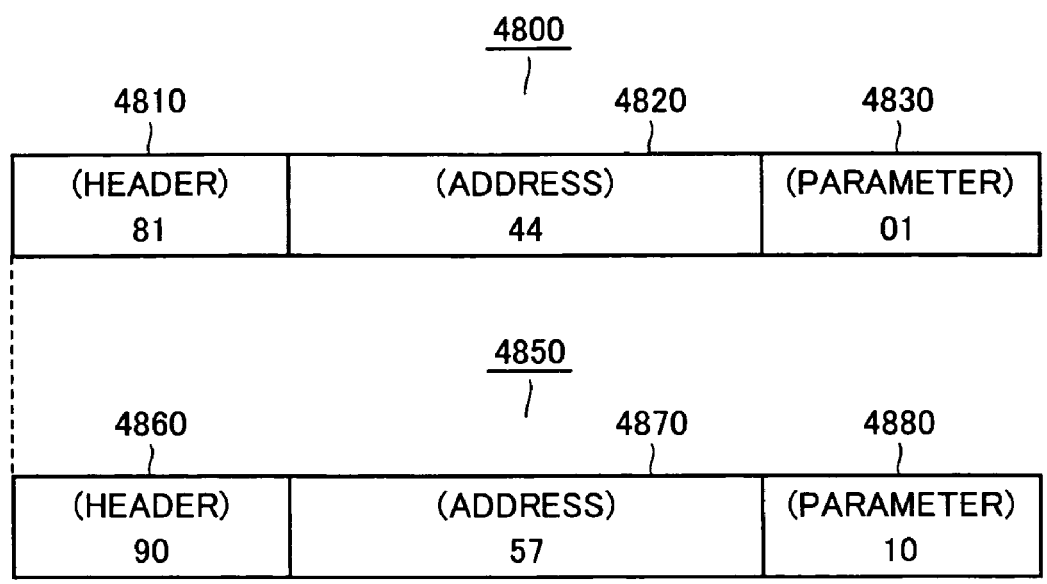
FIG. 50 is a diagram schematically illustrating a configuration of a print command.

FIG. 50 is a diagram schematically illustrating the configuration of the print command. A command 4800 includes a header 4810, an address 4820, and a parameter 4830. Header 4810 has, for example, a value of "81". Address 4820 has, for example, a value of "44". Similarly, the value of parameter 4830 is "01".

A command 4850 corresponds to a tenth printer. Command 4850 includes a header 4860, an address 4870, and a parameter 4880. The value of header 4860 is "90". The value of address 4870 is "57". The value of parameter 4880 is "10".

In this way, command 4800 differs from command 4850 in contents. This is because preset print commands are different among printers. However, flash ROM 216 has data shown in FIG. 49 beforehand, so that a print command corresponding to a connected printer type can be transmitted. Similarly, other commands can be transmitted according to each printer. This ensures the image forming processing in print unit 102 or the notice of the state of print unit 102 in image forming apparatus 100.

Figure 51:
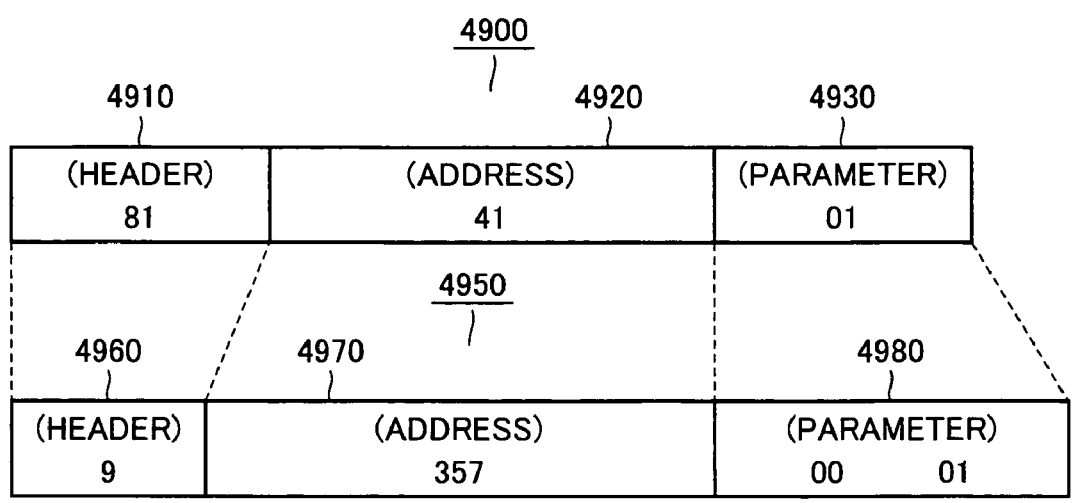
FIG. 51 is a diagram illustrating commands having data lengths different from each other.

Referring to FIG. 51, a difference of commands will be further described. FIG. 51 is a diagram illustrating commands having data lengths different from each other.

A command 4900 includes a header 4910, an address 4920, and a parameter 4930. A command 4950 includes a header 4960, an address 4970, and a parameter 4980. In this case, each command has a header having a different length. The length of each address is also different. The length of each parameter is also different. In this way, commands having different data lengths among printers may be used, so that flash ROM 216 has a predetermined data length for each printer, as shown in FIG. 49.

Panel CPU 210 and printer CPU 220 communicate a command through communication unit 218 using the data. In this case, either CPU knows beforehand a data size or a data type of a command to be used, so that the data conversion and processing can be performed according to the data length, thereby preventing an error resulting from inconsistency in commands.

Figure 52:
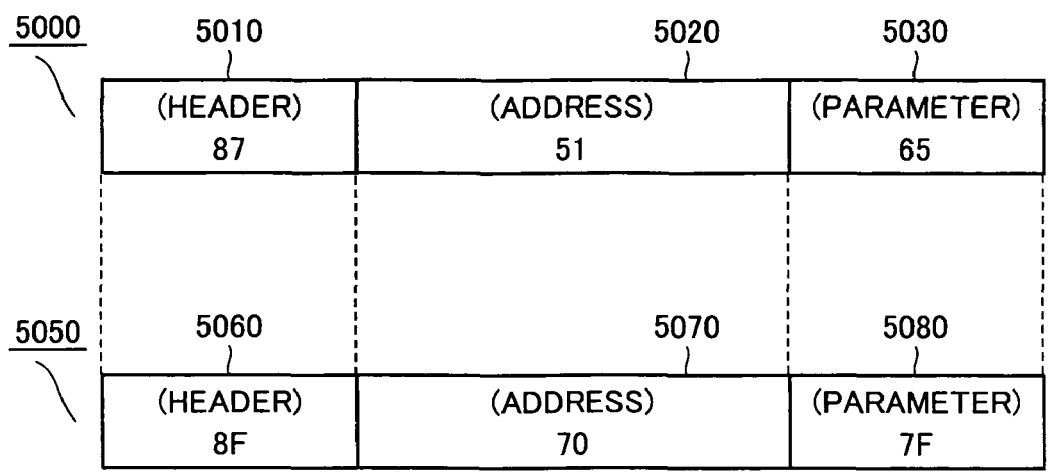
FIG. 52 is a diagram illustrating a general configuration of map data.

Now, referring to FIG. 52, map data for giving notice of the state of image forming apparatus 100 will be described. FIG. 52 includes packets 5000, 5050, each schematically illustrating the configuration of the map data. Packet 5000 includes a header 5010, an address 5020, and a parameter 5030 similar to the command described above. Packet 5050 includes a header 5060, an address 5070, and a parameter 5080.

Header 5010 includes data representing the start of packet 5000 and data representing the source of the data. Address 5020 represents a state of image forming apparatus 100. Parameter 5030 represents the detail of the state specified by address 5020.

Similarly, header 5060 represents information indicated by header 5010. Address 5070 indicates information represented by address 5020. Parameter 5080 represents the same information as the information represented by parameter 5030.

The data lengths of packets 5000 and 5050 are the same. However, in image forming apparatus 100 in accordance with the present embodiment, packets having different data lengths may be transmitted as map data.

Figure 53:
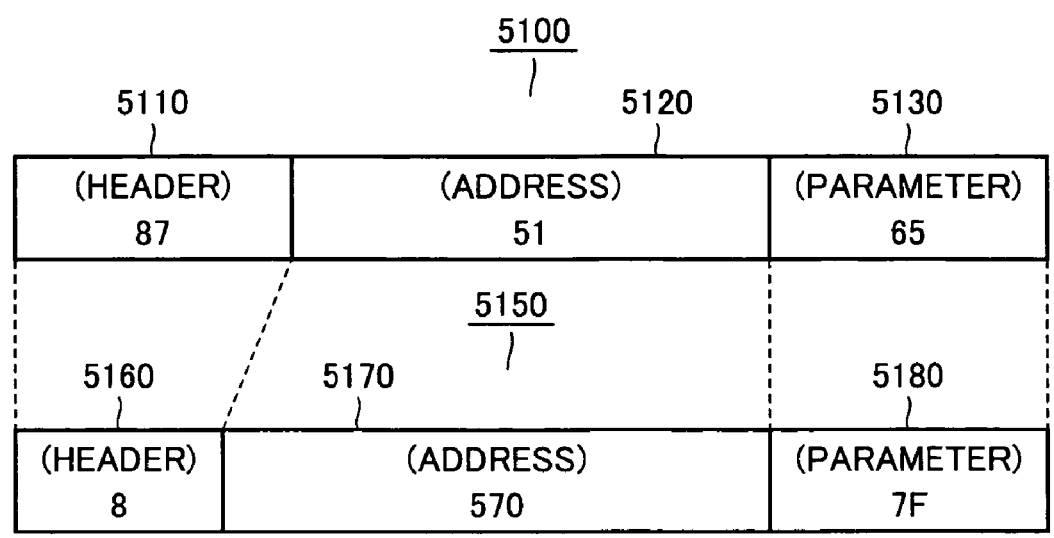
FIG. 53 is a diagram illustrating map data with items having different data lengths.

Now, referring to FIG. 53, map data having different data lengths will be described. FIG. 53 is a diagram illustrating packets 5100, 5150 as map data having different data lengths.

Packet 5100 includes a header 5110, an address 5120, and a parameter 5130. Packet 5150 includes a header 5160, an address 5170, and a parameter 5180.

Header 5110 differs from header 5160 in length. Address 5120 has a different data length from that of address 5170. However, panel CPU 210 and printer CPU 220 each have a data length of map data used for each printer beforehand. Therefore, even if map data having different data lengths is used for communications, a data length can be converted according to the destination. Consequently, it is possible to give notice of the state of image forming apparatus 100 accurately.

In the foregoing description, it is assumed that the amount of data included in map data is approximately equal to the amount of data included, for example, in a command or a report. However, the data representing the state of image forming apparatus 100 may have a lot of data items for representing the state, or the amount of the data itself may be large. Therefore, the map data may have many parameters.

Figure 54:
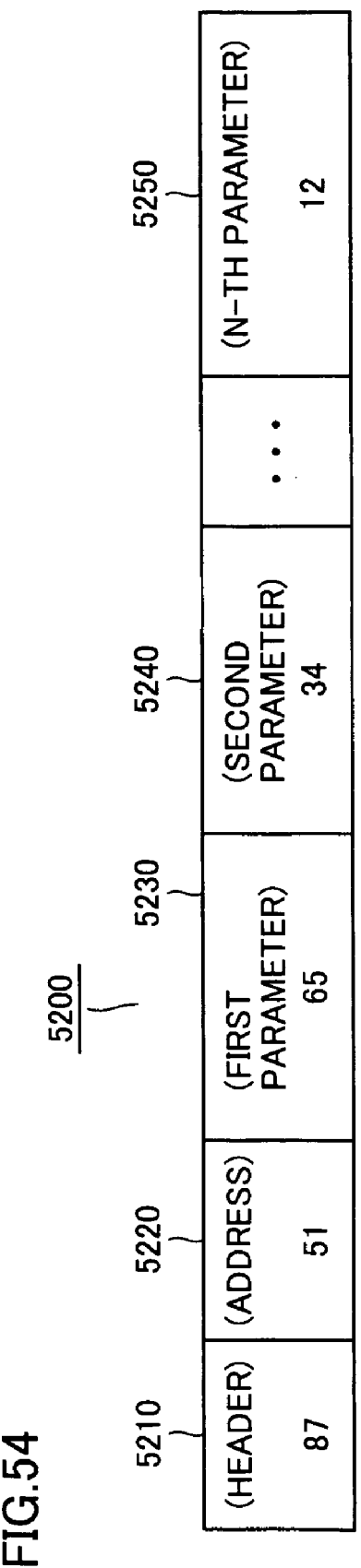
FIG. 54 is a diagram illustrating a general configuration of map data having a plurality of parameters.
Figure 55:
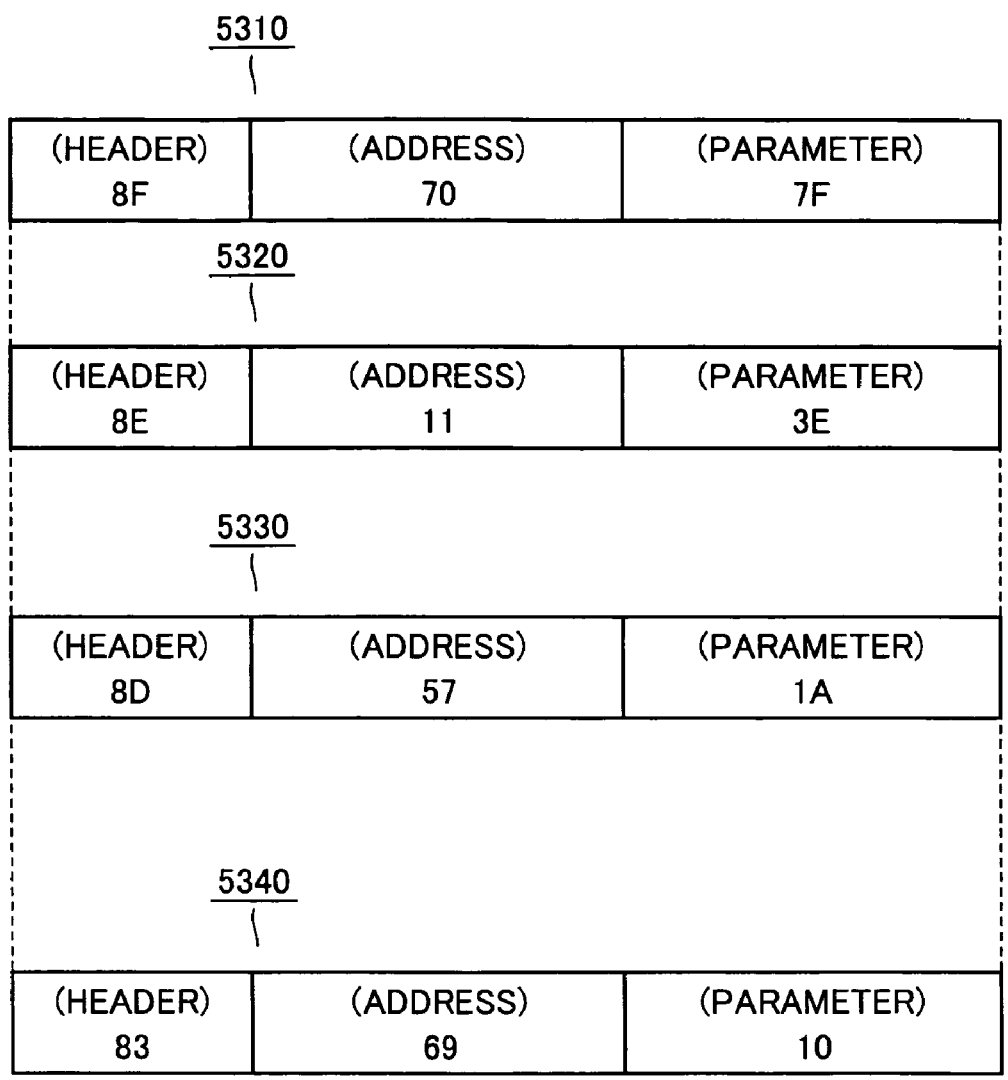
FIG. 55 is a diagram illustrating that map data is transmitted for each parameter for giving notice of a plurality of parameters.

Here, referring to FIGS. 54 and 55, a configuration of map data in another aspect will be described. FIG. 54 is a diagram schematically illustrating a configuration of map data having a plurality of parameters. FIG. 55 is a diagram illustrating that map data is transmitted for each parameter for giving notice of a plurality of parameters.

Referring to FIG. 54, map data 5200 includes a header 5210, an address 5220, a first parameter 5230, a second parameter 5240, and the N-th parameter 5250. In this case, the number of parameters in map data 5200 varies for each printer specified by address 5220. The destination of map data 5200 recognizes that each data subsequent to address 5220 is a parameter based on the printer information included in address 5220 and obtains information representing each state.

Referring to FIG. 55, map data may be successively transmitted each having a parameter for giving notice of the state of image forming apparatus 100. In this case, map data corresponding to the number of parameters will be transmitted.

In other words, in place of map data 5200 shown in FIG. 54, map data 5310, 5320, 5330, 5340 are each transmitted.

In this manner, notice of the state of image forming apparatus 100 is still given. In addition, as compared with simultaneous communication of all parameters, the data communications are immune to the state of communication unit 218, so that information free from noises can surely be transmitted. As a result, notice of the state of image forming apparatus 100 is given accurately.

Figure 56:
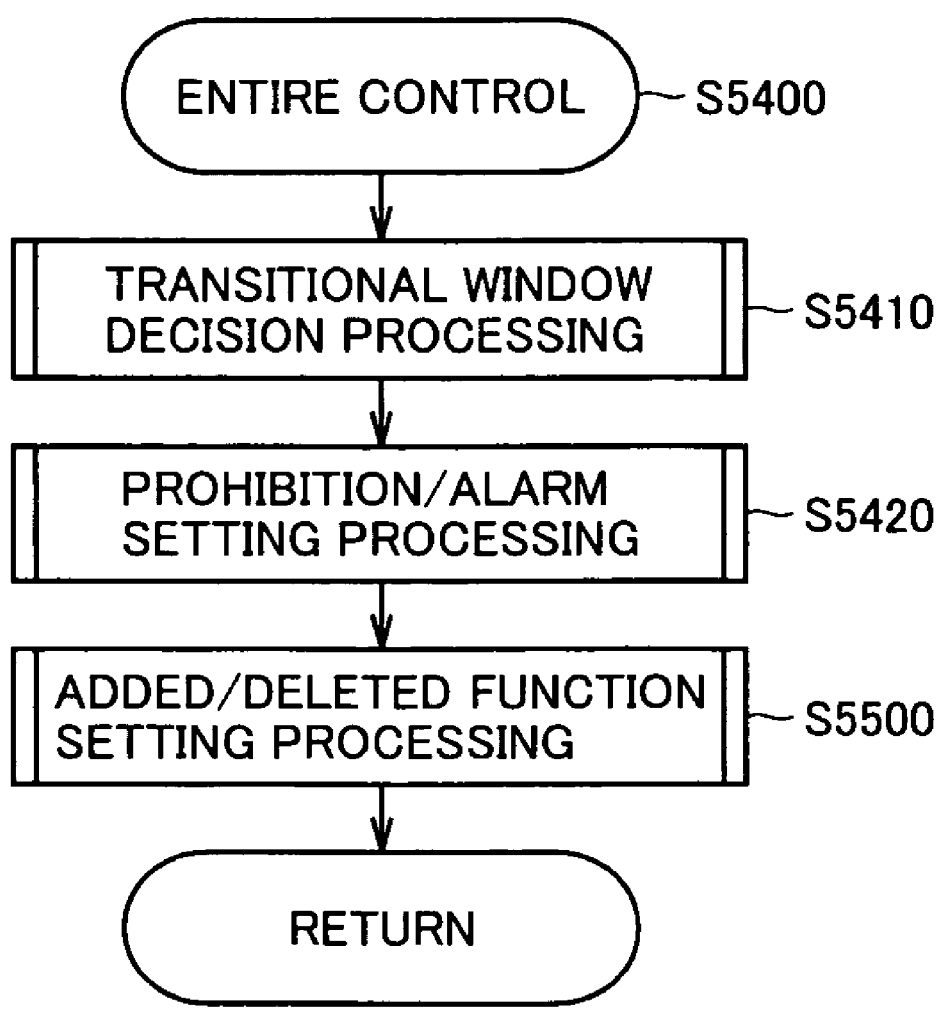
FIGS. 56 to 58 are flowcharts illustrating procedures of processing executed by panel CPU 210.
Figure 57:
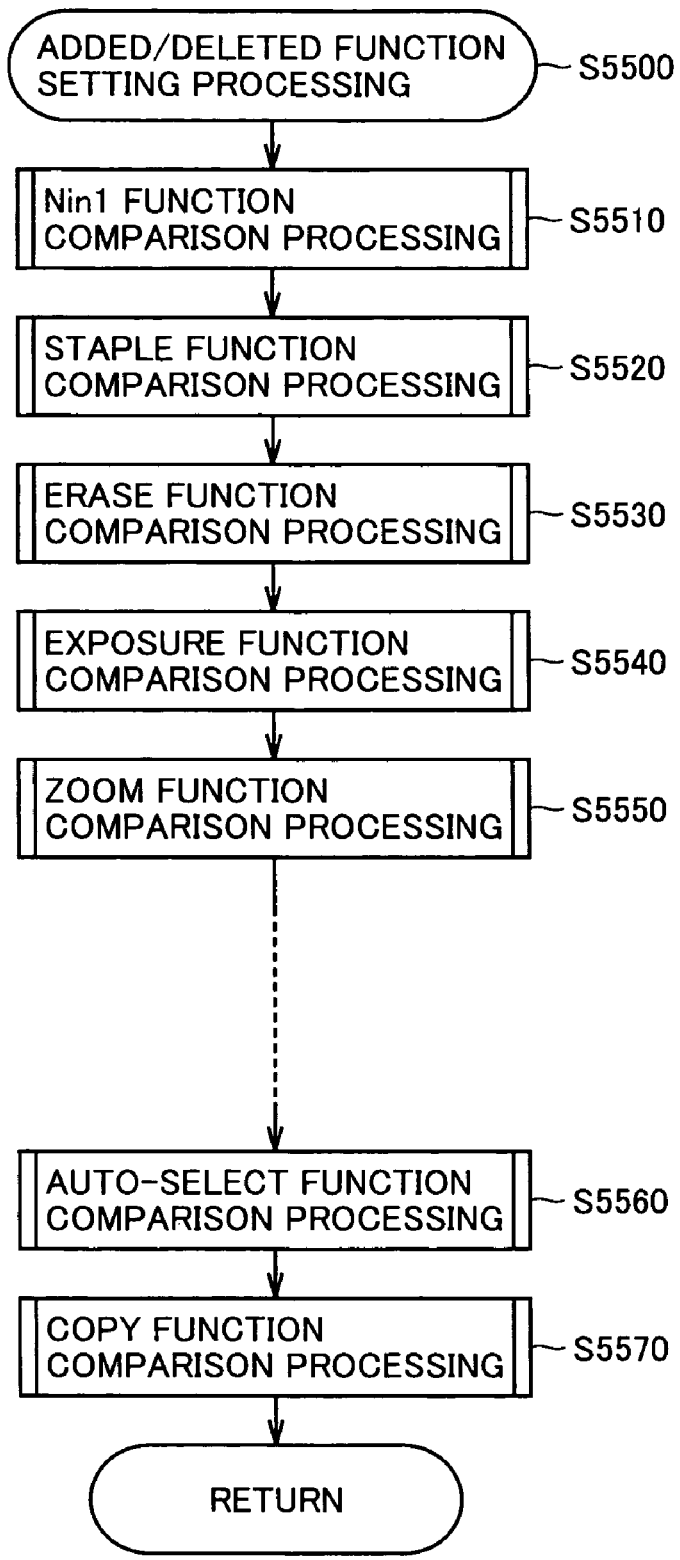
Figure 58:
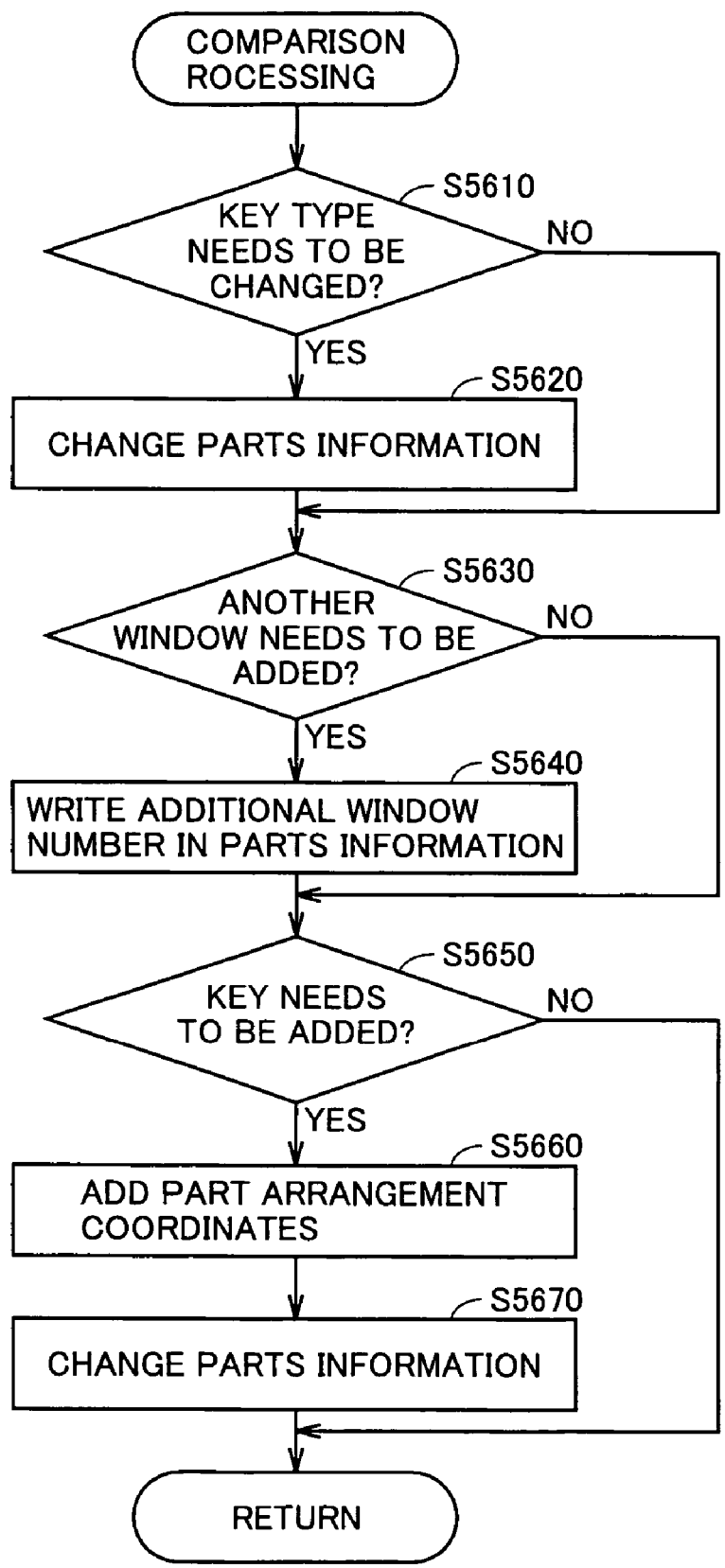

Referring to FIGS. 56-58, the control structure of image forming apparatus 100 will be further described. FIGS. 56-58 are flowcharts each illustrating the procedure of the processing executed by panel CPU 210.

Referring to FIG. 56, at step S5410, panel CPU 210 executes transitional window decision processing. Specifically, for example, when the panel includes a touch panel LCD, the next window to which a transition will be made is decided. When the panel includes a character-type LCD, the next window to which a transition will be made is decided similarly. When the panel includes an LED display unit, the on/off of the LED is decided.

At step S5420, panel CPU 210 executes prohibition/alarm setting processing. Here, the prohibition means that when a certain combination of processing with a key operation is prohibited, such an input is prohibited. The example is such that an interrupt key is pressed under circumstances where an interrupt copy is prohibited. In this case, it is displayed for a certain period of time that an interrupt is disabled and why it is disabled.

The alarm is output when particular modes are combined by key operations. For example, when "1×" and "2in1" are selected by key operations, any other magnification is appropriate rather than the magnification 1×, in view of the size of paper. In this case, it is displayed for a certain period of time that any other magnification is appropriate.

At step S5500, panel CPU 210 executes added/deleted function setting processing as described later. This processing is performed when there is any difference between the function that can be displayed by a panel of the selected type and the function provided by the printer. In other words, an object of the present invention is to provide an apparatus allowing the same panel operation with the old image forming apparatus when a new image forming apparatus is installed. Some functions provided by the new image forming apparatus are not provided by the old image forming apparatus. In such a case, the panel in the old image forming apparatus displays a function that is not actually included. Then, in order to prevent such inconvenience, the processing above is performed.

Referring to FIG. 57, at step S5510, panel CPU 210 executes Nin1 function comparison processing. At step S5520, panel CPU 210 executes staple function comparison processing. At step S5530, panel CPU 210 executes erase function comparison processing. At step S5540, panel CPU 210 executes exposure function comparison processing. At step S5550, panel CPU 210 executes zoom function comparison processing. At step S5560, panel CPU 210 executes auto-selection function comparison processing. At step S5570, panel CPU 210 executes copy function comparison processing. It is noted that the order of executing each processing is not limited to the order shown in FIG. 57.

FIG. 58 is a flowchart illustrating the procedure of the function comparison processing in detail. This procedure is carried out for each processing shown in FIG. 57.

Referring to FIG. 58, at step S5610, panel CPU 210 determines whether or not a key type needs to be changed. If a key type needs to be changed (YES at step S5610), the process proceeds to step S5620. If not (NO at step S5610), the process proceeds to step S5630. At step S5620, panel CPU 210 changes parts information. At step S5630, panel CPU 210 determines whether or not another window needs to be added. If it needs to be added (YES at step S5630), the process proceeds to step S5640. If not (NO at step S5630), the process proceeds to step S5650. At step S5640, panel CPU 210 adds the number of additional window to the parts information to be written in an area allocated in control RAM 208.

At step S5650, panel CPU 210 determines whether or not a key needs to be added. If it needs to be added (YES at step S5650), the process proceeds to step S5660. If not (NO at step S5650), the process ends and returns to the main processing.

At step S5660, panel CPU 210 adds the coordinates at which a part is arranged. At step S5670, panel CPU 210 changes the panel information.

Referring to FIG. 59, the data structure of image forming apparatus 100 will be further described. FIG. 59 is a diagram illustrating exemplary data storage for realizing an additional function in flash ROM 216. Flash ROM 216 includes areas 5710-5730 for storing data. Data stored in these areas are associated with each other.

Data for identifying an additional function is stored in area 5710. Data set for realizing that function is stored in area 5720. Data for display window is stored in area 5730. These data are extracted and stored in respective areas allocated in flash ROM 216 when a difference in function is detected.

Figure 60:
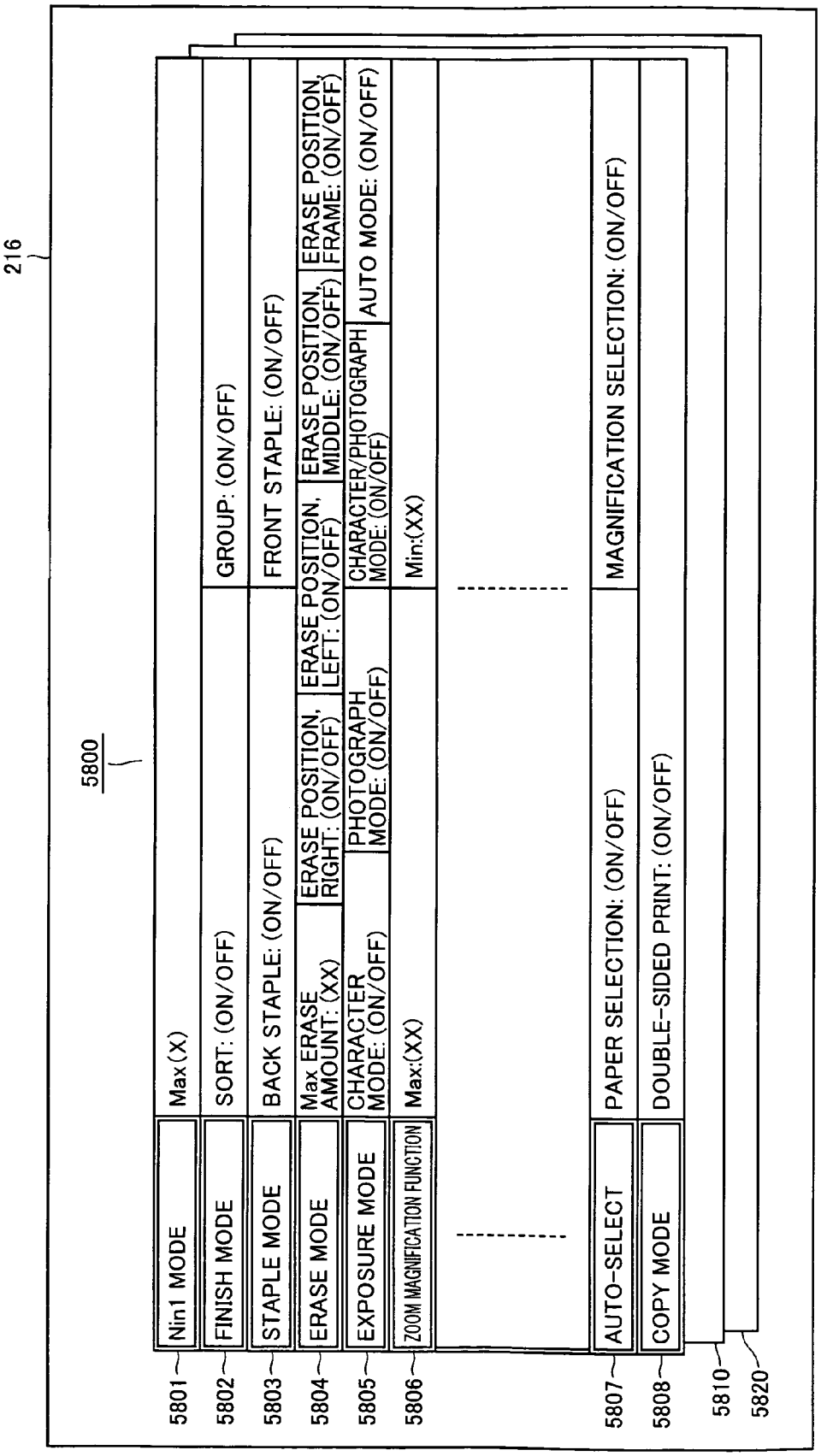
FIG. 60 is a diagram illustrating exemplary storage of functional information for each printer in flash ROM 216.

Referring to FIGS. 60-63, the added/deleted function setting processing (S5500) will be described in detail. FIG. 60 is a diagram illustrating exemplary storage of functional information for each printer in flash ROM 216.

Flash ROM 216 includes tables 5800, 5810, 5820 in which functions for each printer are stored beforehand. Data items of each table are the same. Therefore, in the following, the configuration of table 5800 will be described.

Table 5800 includes areas 5801-5808 for storing data for specifying operation modes or realized functions of a printer. Data defining the maximum value of "Nin1 mode" is stored in area 5801. Here, Nin1 mode refers to a mode for forming a plurality of images collectively in one sheet of paper. This mode is executed, for example, by pressing area 1030 in FIG. 10.

Data for specifying a finish mode is stored in area 5802. The finish mode includes, for example, sort/non-sort, group ejection/non-group ejection, and the like. Data for defining a staple mode is stored in area 5803. The data includes the one representing whether or not staple processing is executed at one of the back and the front of ejected paper. Here, "back" or "front" corresponds to the back or the front, for example, with respect to the front of image forming apparatus 100.

Data for defining an erase mode is stored in area 5804. This data includes the maximum erase amount (XX), data defining whether erase is set at the right side of paper and the position thereof, data defining whether erase is set at the left side of paper and the position thereof, data defining whether erase is set in the middle of paper and the position thereof, or data defining whether an erase frame is set.

Data for defining an exposure mode is stored in area 5805. The exposure mode includes whether or not a character mode, a photograph mode, a character/photograph mode, or an auto mode is set. Data for defining a zoom range is stored in area 5806. This data includes the maximum value "Max(XX)" and the minimum value "Min(XX)".

Data for defining auto-selection is stored in area 5807. The auto-selection includes, for example, whether or not paper selection or magnification selection is set. Data for defining a copy mode is stored in area 5808. The copy mode includes, for example, whether or not double-sided copy or single-sided copy is set.

FIG. 61 is a diagram illustrating exemplary storage of functional information of a printer in control RAM 208. The data is obtained by panel CPU 210 communicating with printer CPU 220 through communication unit 218 and stored in an area allocated beforehand in control RAM 208. In other words, when the processing for comparing the functions of a printer is started, the functional information of the printer is generated as a table 5900 in control RAM 208.

Table 5900 includes areas 5901-5908. Data for specifying an operation mode or function of the printer is stored in each area. Here, each area corresponds to each area in table 5800 shown in FIG. 60. Data included in each area may differ depending on printers. Therefore, table 5800 and table 5900 are compared in data in each area, so that any difference in functions of printers is detected.

FIG. 62 is a diagram illustrating an exemplary table 6000 storing functional information on a set panel in control RAM 208. Table 6000 includes functional information corresponding to the panel presently set in image forming apparatus 100. Specifically, table 6000 includes areas 6001-6008. Data for defining an operation mode or function of image forming apparatus 100 is stored as functional information in each area.

These areas also correspond to the areas shown in FIG. 60 or FIG. 61. Areas 6001, 6002, 6003, 6008 are shown in such a manner as distinguished from other areas 6004 to 6007. Areas 6001-6003 and 6008 are different from areas 5901-5903 and 5908 of table 5900 in data items. More specifically, the mode or function defined in these areas corresponds to the detected difference between the set panel and the selected panel function. Then, display necessary for eliminating the difference is realized in touch panel LCD 202.

Figure 63:
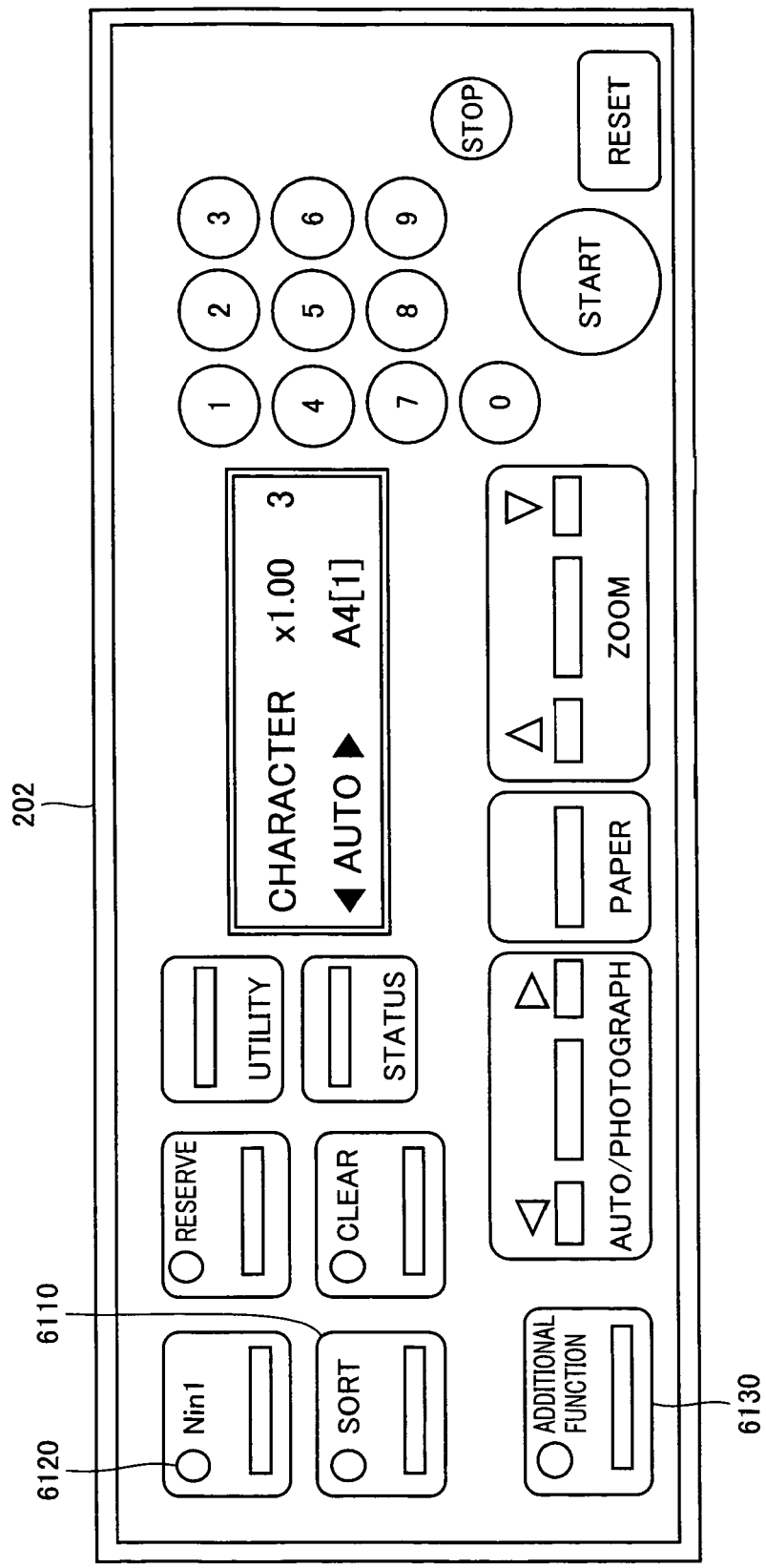
FIG. 63 is a view illustrating an exemplary display window in touch-panel LCD 202.
Figure 64:
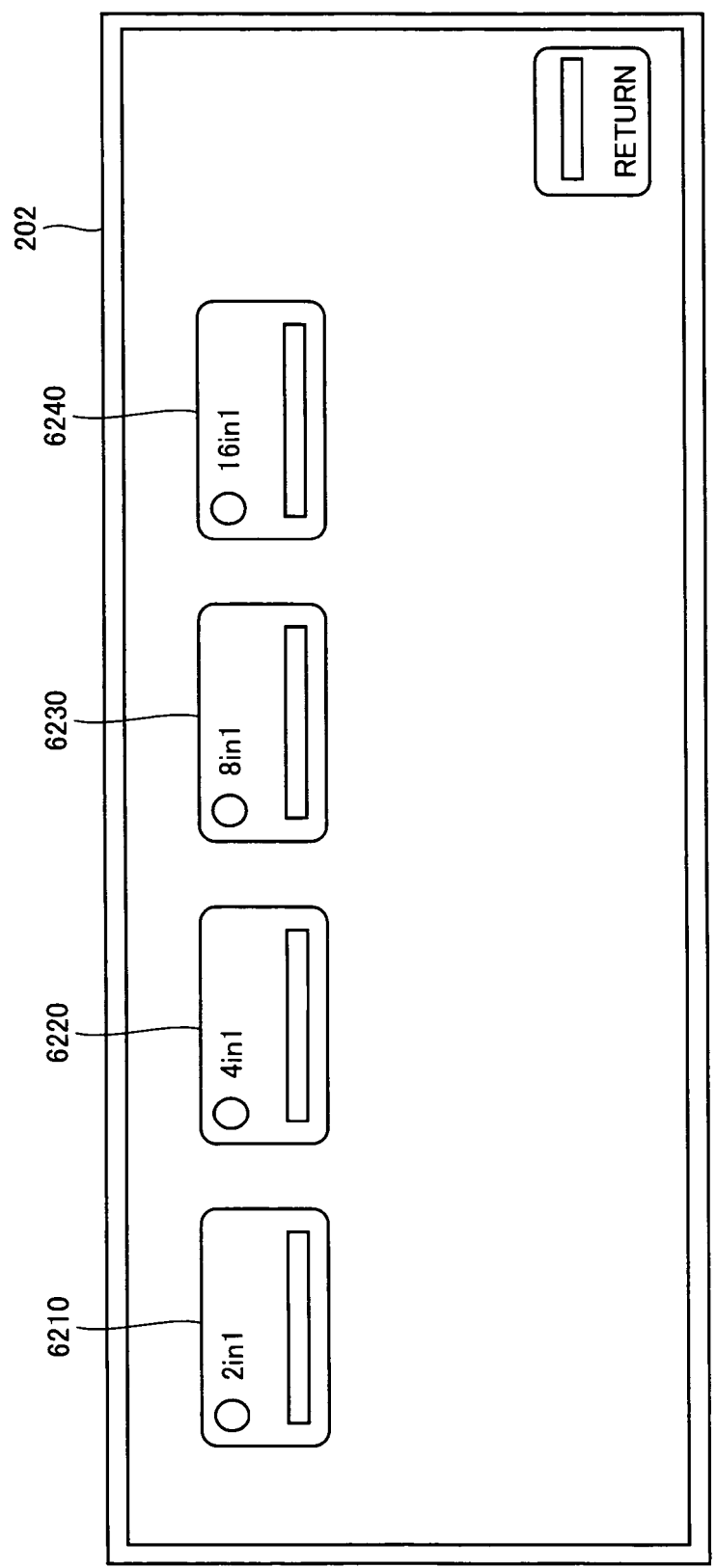
FIG. 64 is a view illustrating an exemplary display window in touch-panel LCD 202.
Figure 65:
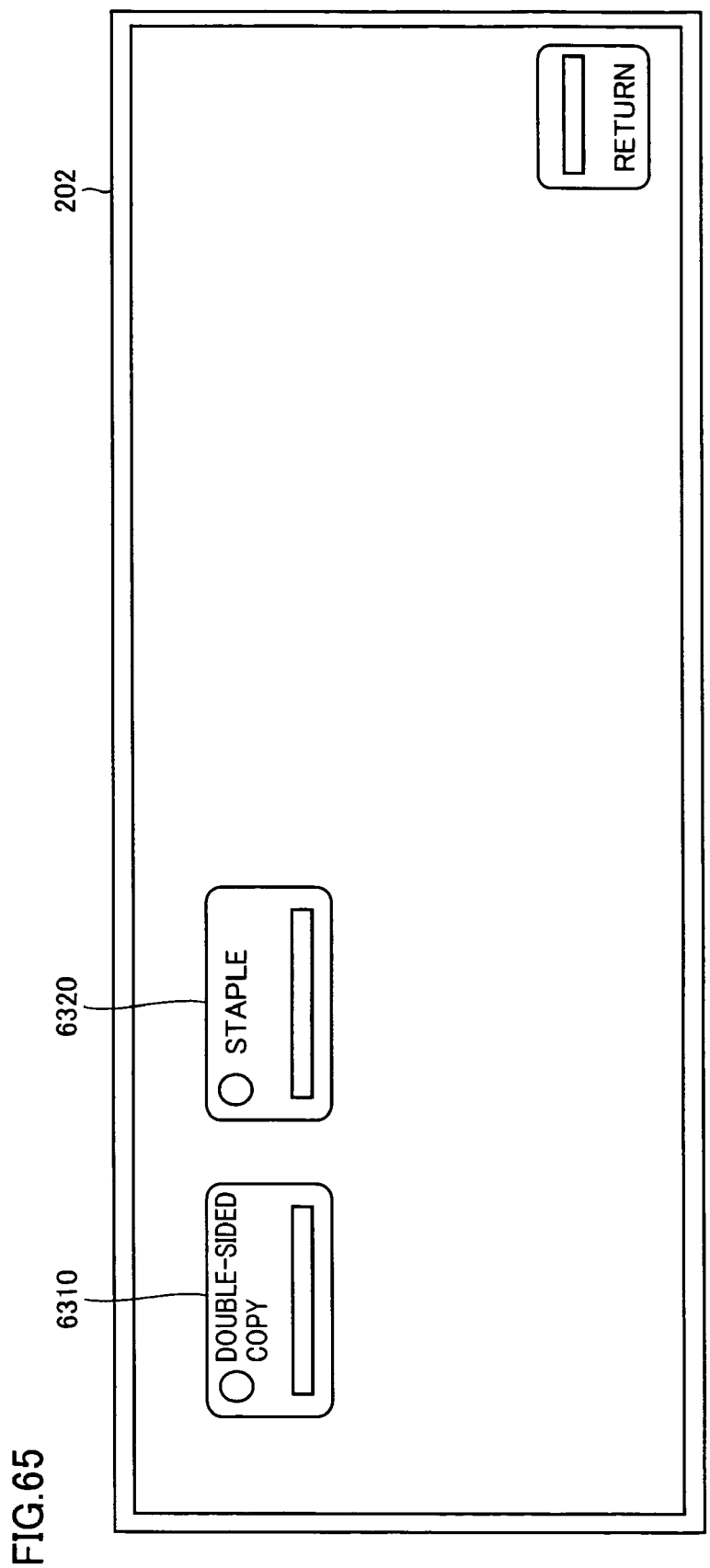
FIG. 65 is a view illustrating an exemplary display window in touch-panel LCD 202.

Referring to FIGS. 63-65, the elimination of the detected function difference will be described. FIGS. 63-65 are diagrams each illustrating an exemplary window in touch panel LCD 202.

Referring to FIG. 63, touch panel LCD 202 eliminates the detected function difference by changing a key type. For example, the sort key displayed as an area 6110 is displayed by changing the initial 2LED-type key to 1LED-type key. An area 6120 allows a displayed key type to be changed and also allows a detail image to be set on another window. In other words, when icon 6120 is pressed, touch panel LCD 202 has its display switched (FIG. 64).

Referring to FIG. 64, touch panel LCD 202 displays a window for setting "Nin1 mode". This window includes areas 6210-6240 receiving an input of an instruction to set the mode specifically. When each image is pressed, a signal for causing print unit 102 to execute the processing of forming an image according to the operation mode is output from panel CPU 210.

Returning to FIG. 63, in order to eliminate a function difference, a contact key to another window in which a key to be added is displayed may be displayed. For example, an area 6130 receives an input of an instruction for moving to a window in which an additional function is set. When area 6130 is pressed, the display of touch panel LCD 202 is switched, for example, to a window shown in FIG. 65.

Referring to FIG. 65, touch panel LCD 202 receives setting of double-sided copy and staple modes as additional functions. When an area 6310 is pressed, an operation of double-sided copy is enabled. When an area 6320 is pressed, staple processing is executed on a predetermined position in the ejected paper.

As described above, image forming apparatus 100 in accordance with an embodiment of the present invention realizes display of each operation panel of a plurality of image forming apparatuses based on panel data prepared beforehand. Each operation panel is related to printer type data prepared beforehand. In this way, an operation on an area displayed on an operation panel causes a signal to be generated as an instruction to a print unit associated with that panel and sent to the print unit.

In this way, even when a model of an image forming apparatus is changed, the operation panel of the earlier image forming apparatus is displayed, enabling an operation according to that operation panel. Therefore, the user familiar with the operation of the earlier image forming apparatus can also use a new image forming apparatus easily.

It is noted that the functions may be set for each user. For example, particular panel type and printer type are associated with a user name and stored in the memory of the image forming apparatus, so that when the use by the user is recognized, the image forming apparatus functions as the print unit set by the user. In this manner, one image forming apparatus is customized for each user, and therefore each user can set the image forming apparatus as the most usable apparatus of his/her own. As a result, the convenience of the image forming apparatus can be improved.

In addition, the parts other than particular operation parts are displayed in the form of LCD in this manner, so that the general versatility of the operation panel can be increased. Furthermore, the operation panel can be shared, thereby achieving the commonality of parts. Therefore, an increase in costs for manufacturing different kinds of image forming apparatuses can be prevented.

It is noted that a program for realizing the image forming apparatus in accordance with the present invention as detailed above can be provided as a program product. In this case, for example, the program is taken into image forming apparatus 100 through external I/F controller 230. In this case, the program is provided from a computer system connected to image forming apparatus 100 over a communication network (not shown). Alternatively, when the image forming apparatus has a drive for driving a removable recording medium, a recording medium having the program stored therein is mounted on the image forming apparatus so that the image forming apparatus reads and stores the program in a memory.

Figure 66:
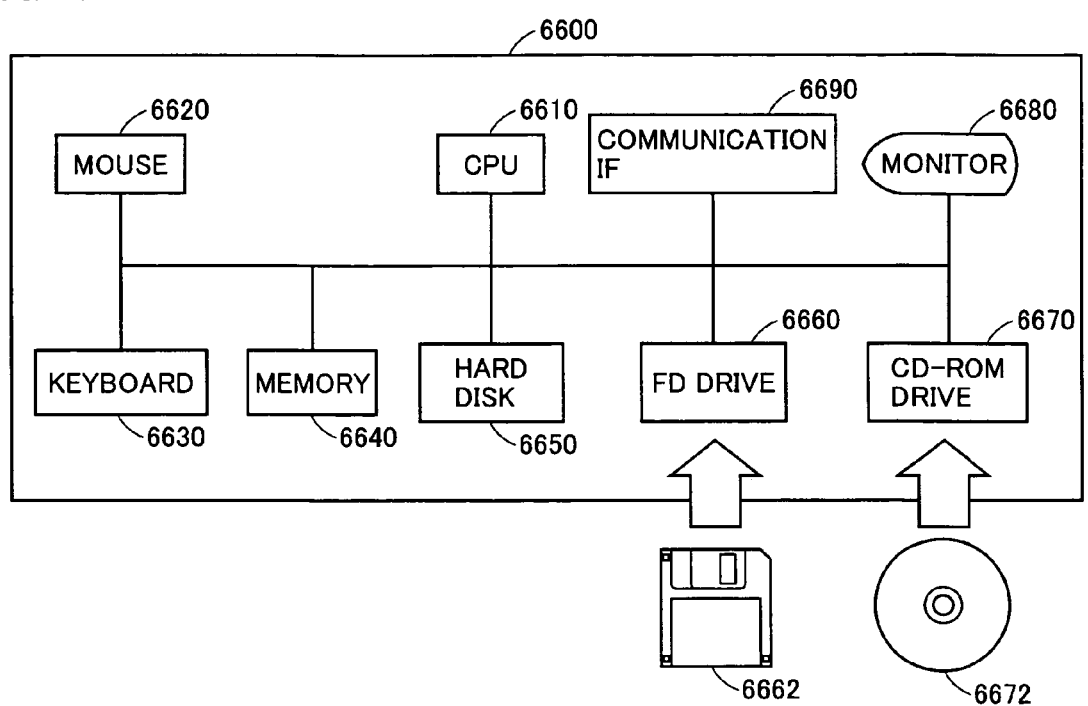
FIG. 66 is a block diagram illustrating a hardware configuration of a computer system 6600.

Now, referring to FIG. 66, an exemplary method of providing a program realizing the image forming apparatus in accordance with the present embodiment will be described. FIG. 66 is a block diagram illustrating a hardware configuration of a computer system 6600 for use to provide a program.

Computer system 6600 includes, as hardware, a CPU 6610, a mouse 6620 and a keyboard 6630 receiving an input of instructions by the user of computer system 6600, an RAM 6640 storing in a volatile manner data generated by execution of the program by CPU 6610 or data input through mouse 6620 or keyboard 6630, a hard disk 6650 storing data in a nonvolatile manner, an FD (Flexible Disk) drive 6660, a CD-ROM (Compact Disk-Read Only Memory) drive 6670, a monitor 6680, and a communication IF 6690. These pieces of hardware are connected to each other through data buses. An FD 6662 is mounted on FD drive 6660. A CD-ROM 6672 is mounted on CD-ROM drive 6670.

The program realizing image forming apparatus 100 is stored, for example, in CD-ROM 6662 as a program product. Such CD-ROM 6662 is mounted on computer system 6660, causing the program to be read and transmitted to the image forming apparatus. Image forming apparatus 100 in accordance with the present invention is thereby realized.

It is noted that the hardware of computer system 6600 shown in FIG. 66 is general and the operation of the hardware is well known. Therefore, the detailed description thereof will not be repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a data processing unit processing input image data;
   a display unit displaying a display image in a display area based on an input signal and detecting an operation on said display area;
   a first storage unit storing data for displaying display images of a plurality of operation units including a display image displayed on an operation unit of another image forming apparatus; and
   a control unit controlling an operation of own image forming apparatus based on an input instruction;
   said control unit including:
   a selection window display unit causing said display area to display a selection window for selection of a display image of each said operation unit based on data stored in said first storage unit,
   a selection unit receiving any selection of each said display image of said operation unit based on an instruction from a user,
   an operation window display unit causing said display area to display a display image of an operation unit selected by said selection unit,
   a detection unit detecting an operation performed on said display area to a range corresponding to the display image of said operation unit, and
   an instruction unit causing said data processing unit to execute processing corresponding to the operation to the range detected by said detection unit,
   wherein when said selection unit receives the selection of the operation unit of said another image forming apparatus by selecting information for identifying said another image forming apparatus through said operation window display unit of own image forming apparatus, said operation window display unit causes the display image of the selected operation unit of said another image forming apparatus to be displayed in said display area, said detection unit detects an operation to a region corresponding to the display image of the selected operation unit of said another image forming apparatus, said operation being provided to the display area where the display image of the selected operation unit of the another image forming apparatus is displayed, and said instruction unit causes said data processing unit to perform processing corresponding to the detected operation to said region corresponding to the display image of said selected operation unit of said another image forming apparatus.

2. The image forming apparatus according to claim 1, wherein said data processing unit includes an image forming unit executing a plurality of processing for forming an image in a medium.

3. The image forming apparatus according to claim 1, wherein
   a display image of each said operation unit is associated with data for specifying a position of said display image in said display area and with said processing,
   said detection unit detects a range specified by said user in said display area, and
   said instruction unit causes said data processing unit to execute processing associated with the data for specifying a range detected by said detection unit.

4. The image forming apparatus according to claim 1, further comprising:
   an input unit receiving an input of data; and
   an obtaining unit obtaining data displaying a display image of an operation unit from data received by said input unit.

5. The image forming apparatus according to claim 1, further comprising a second storage unit storing data for displaying a display image of an operation unit selected through said selection unit, wherein said operation window display unit causes said display area to display the display image of said operation unit based on data stored in said second storage unit.

6. The image forming apparatus according to claim 1, further comprising a display detection unit detecting that display of said selection window is performed, wherein said operation window display unit causes said display area to display a display image of an operation unit selected through said selection unit upon detection of display of said selection window.

7. The image forming apparatus according to claim 1, further comprising a third storage unit storing a plurality of communication control data for defining a plurality of communication protocols between said control unit and said data processing unit, wherein
   said control unit further includes a specifying unit specifying the data processing unit connected to said control unit,
   said image forming apparatus further comprising a communication control unit performing communications between said instruction unit and said data processing unit in accordance with said communication control data corresponding to a data processing unit specified by said specifying unit.

8. The image forming apparatus according to claim 7, wherein
   said communication control unit includes:
   a first conversion unit converting a format of data transmitted from said control unit to said data processing unit into a format corresponding to said data processing unit based on said communication control data, and
   a second conversion unit converting a format of data transmitted from said data processing unit to said control unit into a format corresponding to said control unit based on said communication control data.

9. The image forming apparatus according to claim 8, wherein said communication control unit communicates control data for controlling processing executed by said data processing unit.

10. The image forming apparatus according to claim 1, further comprising a fourth storage unit storing functional information representing a first function related to the operation unit selected through said selection unit, wherein
    said control unit further includes:
    a specifying unit specifying a data processing unit connected to said control unit, and
    a difference detection unit detecting a difference between said first function and a second function based on said functional information and information representing said second function realized by the data processing unit specified by said specifying unit.

11. The image forming apparatus according to claim 10, wherein
said difference detection unit detects a function not included in said first function from said second function, and
said control unit further includes a display control unit causing said display area to display a window for receiving an input of an operation corresponding to the function not included in said first function based on data stored in said first storage unit.

12. The image forming apparatus according to claim 10, wherein
said difference detection unit detects a function not included in said second function from said first function, and
said control unit further includes a display control unit causing said display area to display a display image of an operation unit from which an image receiving an input of an instruction corresponding to the function not included in said second function is removed based on data stored in said first storage unit.

13. The image forming apparatus according to claim 1, wherein
said first storage unit stores first identification data for first display for identifying each said operation unit and second identification data for second display for identifying the data processing unit corresponding to each said operation unit, and
said selection window display unit causes said display area to display said first display and said second display based on said first identification data and said second identification data.

14. The image forming apparatus according to claim 13, wherein said selection window display unit causes said display area to display said first display and said second display for an image forming apparatus different from said image forming apparatus.

15. The image forming apparatus according to claim 1, wherein
said display unit is a touch-panel type display, and
said first storage unit stores different types of said display and data for displaying a window corresponding to each said type.

16. The image forming apparatus according to claim 1, wherein
said first storage unit stores image data for displaying a thumbnail image of a display image displayed on said display area, and
said selection window display unit displays said thumbnail image based on said image data.

17. The image forming apparatus according to claim 1, wherein
said first storage unit stores functional data for displaying description of a function realized by the operation unit represented by said display image, and
said selection window display unit displays said description of a function based on said functional data.

18. The image forming apparatus according to claim 1, wherein
a display image of each of said plurality of operation units includes a plurality of sub-images for receiving inputs of a plurality of operations,
said first storage unit stores each first identification data for specifying each of said plurality of operation units, each second identification data for specifying each of said plurality of sub-images included in said operation unit, and each third identification data for specifying a function realized by an operation on each said sub-image, and
each said first identification data, each said second identification data, and each said third identification data are associated with each other.

19. A method of controlling an image forming apparatus, said image forming apparatus including a data processing unit and a display unit, said data processing unit processing input image data, said display unit displaying a display image in a display area based on an input signal and detecting an operation on said display area, said method comprising the steps of:
selecting information received for identifying another image forming apparatus through said display unit of said image forming apparatus;
preparing data for displaying display images of a plurality of operation units including a display image displayed on an operation unit of said another image forming apparatus;
causing said display area to display a selection window for selection of a display image of each said operation unit based on said prepared data;
receiving any selection of each said display image of said operation unit based on an instruction from a user;
causing said display area to display a display image of a selected operation unit;
detecting an operation performed on said display area to a range corresponding to the display image of said operation unit; and
causing said data processing unit to execute processing corresponding to said operation to the range as detected,
wherein when said selected operation unit is the operation unit of said another image forming apparatus, the display image of the selected operation unit of said another image forming apparatus is displayed in said display area, an operation is detected to a region corresponding to the display image of the selected operation unit of said another image forming apparatus, said operation being provided to the display area where the display image of the selected operation unit of the another image forming apparatus is displayed, and said data processing unit performs processing corresponding to the detected operation to said region corresponding to the display image of the selected operation unit of the another image forming apparatus.

20. A non-transitory computer readable medium encoded with a computer executable program for controlling an image forming apparatus, said image forming apparatus including a data processing unit and a display unit, said data processing unit processing input image data, said display unit displaying a display image in a display area based on an input signal and detecting an operation on said display area, said program causing said image forming apparatus to execute the steps of:
selecting information received for identifying another image forming apparatus through said display unit of said image forming apparatus;
preparing data for displaying display images of a plurality of operation units including a display image displayed on an operation unit of another image forming apparatus;
causing said display area to display a selection window for selection of a display image of each said operation unit based on said prepared data;
receiving any selection of each said display image of said operation unit based on an instruction from a user;

causing said display area to display a display image of a selected operation unit;
detecting an operation performed on said display area to a range corresponding to the display image of said operation unit; and
causing said data processing unit to execute processing corresponding to said operation to the range as detected,
wherein when said selected operation unit is the operation unit of said another image forming apparatus, the display image of the selected operation unit of said another image forming apparatus is displayed in said display area, an operation is detected to a region corresponding to the display image of the selected operation unit of said another image forming apparatus, said operation being provided to the display area where the display image of the selected operation unit of the another image forming apparatus is displayed, and said data processing unit performs processing corresponding to the detected operation to said region corresponding to the display image of the selected operation unit of the another image forming apparatus.

* * * * *